(12) United States Patent
Weston et al.

(10) Patent No.: US 10,724,361 B2
(45) Date of Patent: *Jul. 28, 2020

(54) METHOD AND APPARATUS FOR INITIALIZATION OF A WELLBORE SURVEY TOOL

(71) Applicant: Gyrodata, Incorporated, Houston, TX (US)

(72) Inventors: John Lionel Weston, Christchurch (GB); Adrián Guillermo Ledroz, Houston, TX (US)

(73) Assignee: Gyrodata Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,986

(22) Filed: Mar. 4, 2019

(65) Prior Publication Data

US 2019/0195063 A1    Jun. 27, 2019

Related U.S. Application Data

(63) Continuation-in-part of application No. 14/838,160, filed on Aug. 27, 2015, now Pat. No. 10,221,676, (Continued)

(51) Int. Cl.
    *G01V 3/00*      (2006.01)
    *E21B 47/02*      (2006.01)
    (Continued)

(52) U.S. Cl.
    CPC .............. *E21B 47/02* (2013.01); *E21B 19/00* (2013.01); *E21B 47/022* (2013.01);
    (Continued)

(58) Field of Classification Search
    CPC ................................. E21B 47/02; E21B 19/00
    (Continued)

(56) References Cited

U.S. PATENT DOCUMENTS

2017/0175517 A1    6/2017   Ledroz et al.
2018/0128101 A1    5/2018   Ledroz et al.
(Continued)

OTHER PUBLICATIONS

Johnson, et al.; U.S. Appl. No. 16/437,947, filed Jun. 11, 2019.

*Primary Examiner* — Peguy Jean Pierre
(74) *Attorney, Agent, or Firm* — Pramudji Law Group PLLC; Ari Pramudji

(57) ABSTRACT

Various implementations directed to a method and apparatus for initialization of a wellbore survey tool are provided. In one implementation, a method may include positioning a survey tool at a predetermined orientation relative to a directional reference system, where the survey tool is configured to acquire continuous survey data while disposed within a wellbore, and where the survey tool comprises a drop survey tool, a wireline survey tool, or a slickline survey tool. The method may also include using the directional reference system to generate a first signal indicative of an orientation of the directional reference system with respect to a reference direction. The method may further include using the first signal to determine an initial orientation of the survey tool with respect to the reference direction. The method may additionally include moving the survey tool after the initial orientation of the survey tool has been determined.

20 Claims, 34 Drawing Sheets

Related U.S. Application Data which is a continuation-in-part of application No. 13/625,763, filed on Sep. 24, 2012, now Pat. No. 9,267,370, which is a continuation of application No. 13/407,664, filed on Feb. 28, 2012, now Pat. No. 8,294,592, which is a continuation-in-part of application No. 12/555,737, filed on Sep. 8, 2009, now Pat. No. 8,305,230.

(60) Provisional application No. 61/450,073, filed on Mar. 7, 2011, provisional application No. 61/186,748, filed on Jun. 12, 2009, provisional application No. 61/180,779, filed on May 22, 2009.

(51) Int. Cl.
*G01C 21/16* (2006.01)
*E21B 47/024* (2006.01)
*E21B 19/00* (2006.01)
*G06F 17/00* (2019.01)
*E21B 47/022* (2012.01)

(52) U.S. Cl.
CPC ............ *E21B 47/024* (2013.01); *G01C 21/16* (2013.01); *G06F 17/00* (2013.01)

(58) Field of Classification Search
USPC .......................................................... 340/853
See application file for complete search history.

(56) References Cited

U.S. PATENT DOCUMENTS

| | | |
|---|---|---|
| 2018/0306025 A1 | 10/2018 | Ledroz |
| 2018/0306944 A1 | 10/2018 | Ledroz et al. |
| 2019/0330979 A1 | 10/2019 | Weston et al. |

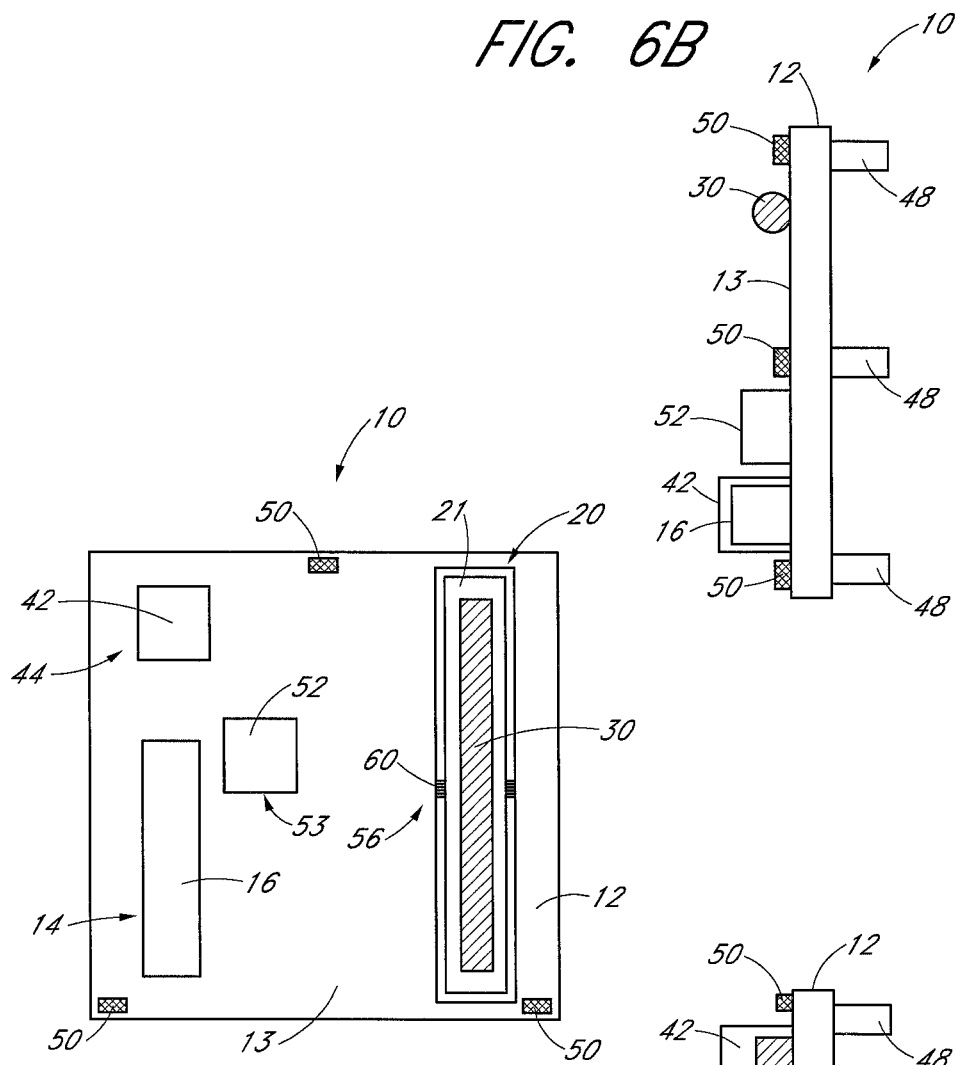
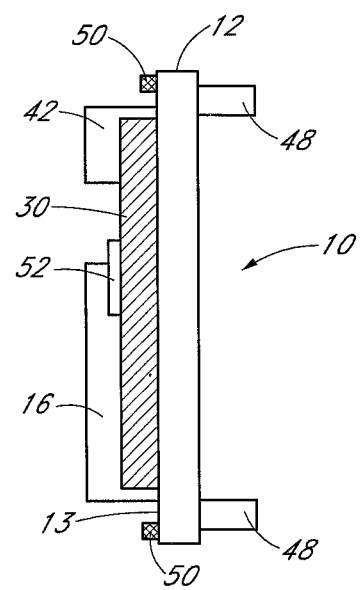

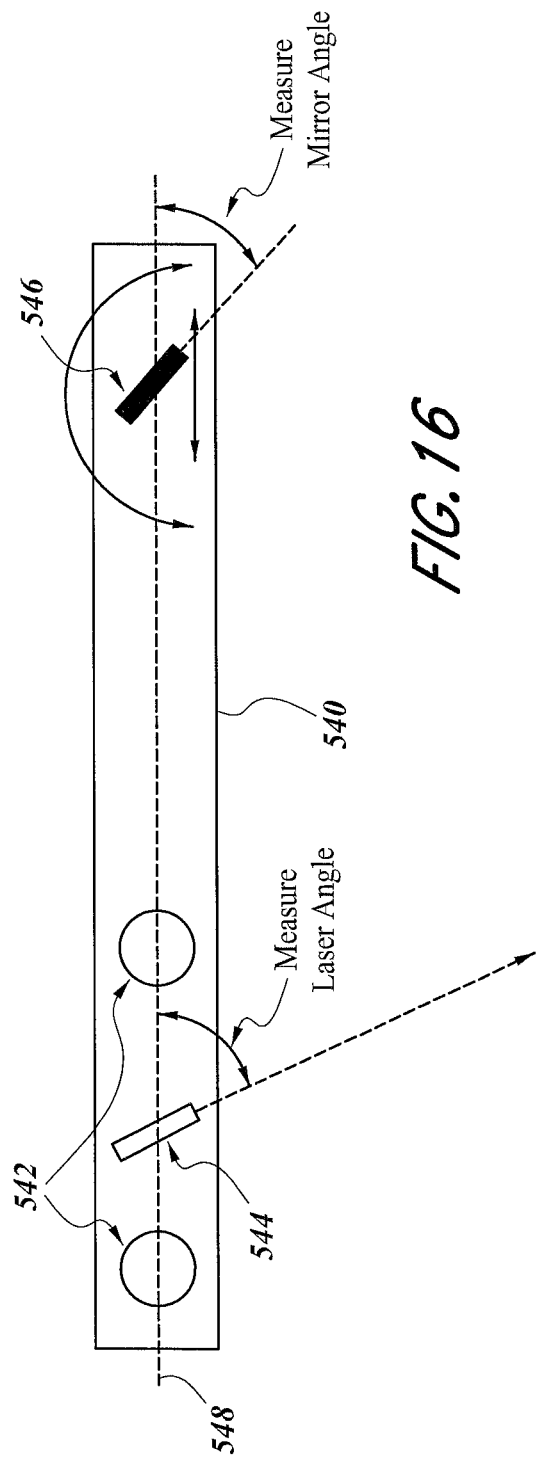

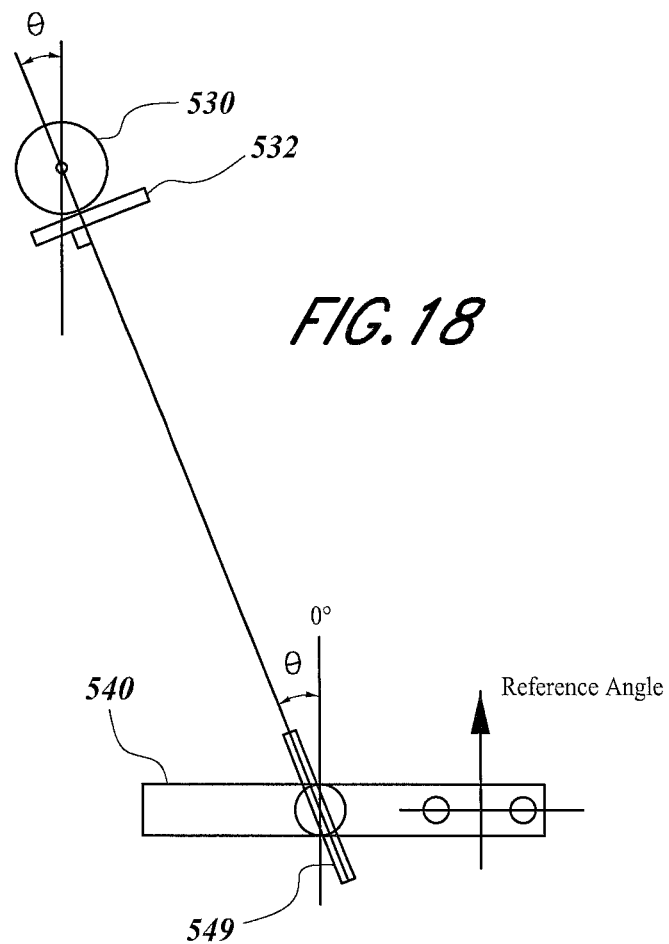

METHOD AND APPARATUS FOR INITIALIZATION OF A WELLBORE SURVEY TOOL

CROSS-REFERENCE TO RELATED APPLICATIONS

This application is a continuation-in-part of U.S. patent application Ser. No. 14/838,160, filed on Aug. 27, 2015 and incorporated in its entirety by reference herein, which is a continuation-in-part of U.S. patent application Ser. No. 13/625,763, filed on Sep. 24, 2012 and incorporated in its entirety by reference herein, which is a continuation of U.S. patent application Ser. No. 13/407,664, filed Feb. 28, 2012 and incorporated in its entirety by reference herein, which is a continuation-in-part of U.S. patent application Ser. No. 12/555,737, filed Sep. 8, 2009 and incorporated in its entirety by reference herein, which claims the benefit of priority from U.S. Provisional Appl. Nos. 61/180,779 filed May 22, 2009 and 61/186,748 filed Jun. 12, 2009, both of which are incorporated in their entirety by reference herein. U.S. patent application Ser. No. 13/407,664 also claims the benefit of priority from U.S. Provisional Appl. No. 61/450,073 filed Mar. 7, 2011, which is incorporated in its entirety by reference herein.

BACKGROUND

Field

The present application relates generally to methods and apparatus for initialization of a wellbore survey tool.

Description of the Related Art

There are typically two types of surveying by which wellbore survey tools conduct surveys (e.g., gyroscopic- or gyro-based surveys) of wellbores. The first type is static surveying, in which measurements of the Earth's rotation are taken at discrete depth intervals along the well trajectory. These measurements can be used to determine the orientation of the survey tool with respect to a reference vector, such as the vector defined by the horizontal component of the Earth's rate in the direction of the axis of the Earth's rotation; a process also referred to herein as gyro-compassing. The second type is continuous surveying, in which the gyroscopic or gyro measurements are used to determine the change in orientation of the survey tool as it traverses the well trajectory. This process uses the gyro measurements of turn rate with respect to a known start position. The start position may be derived, for example, by conducting a static survey prior to entering the continuous survey mode (which may also be referred to as an autonomous or autonomous/continuous survey mode).

Under certain circumstances, static surveying generally becomes less accurate than in other circumstances. For example, when operating at high latitudes on the Earth's surface the static survey process becomes less accurate than at low latitudes. At relatively high latitudes, the reference vector to which the survey tool aligns itself during the gyro-compassing procedure, the horizontal component of Earth's rate ($\Omega_H$), is small compared to the value in equatorial and mid-latitude regions, as indicated by the following equation:

$$\Omega_H = \Omega \cos L, \quad \text{(Eq. 1)}$$

where $\Omega$=Earth's rate and L=latitude. Generally, a satisfactory directional survey can be achieved using gyro-compassing at latitudes of up to about 60 degrees. However, the accuracy can degrade rapidly thereafter as the cosine of latitude reduces more rapidly and the magnitude of $\Omega_H$ thus becomes much smaller. FIG. 1 schematically illustrates the horizontal component $\Omega_H$ of the Earth's rate for changing latitude. As shown, at zero latitude $\Omega_H$ is at its maximum value and is equal to the Earth's rate (Q). $\Omega_H$ successively decreases to $\Omega_H=\Omega \cos L_1$ and $\Omega_H=\Omega \cos L_2$ for increasing latitudes $L_1$ and $L_2$, respectively, and $\Omega_H$ is zero at 90 degrees of latitude (i.e., at the North Pole). There is a significant amount of oil and gas exploration at relatively high latitudes (e.g., latitudes in excess of 70 degrees). At these latitudes, the accuracy of well surveys based on gyro-compassing can be degraded. Similar degradations in survey accuracy can also occur when using magnetic survey tools instead of, or in addition to, gyro-based survey tools. As such, survey accuracy may similarly decrease at locations close to the Earth's magnetic poles when using magnetic survey tools.

In addition, the accuracy of gyro-compassing can be degraded when conducted from a moving platform (e.g., an offshore platform), as compared to being conducted from a relatively static platform. For example, during operation from a moving platform, the survey tool will be subjected to platform rotational motion in addition to the Earth's rotation. Under such conditions, tool orientation with respect to the horizontal Earth's rate vector ($\Omega_H$) may be difficult to determine with the precision that is possible on a stationary platform since the directional reference, defined by $\Omega_H$, is effectively corrupted by the platform motion.

SUMMARY

Described herein are implementations of various technologies relating to a method and apparatus for initialization of a wellbore survey tool. In one implementation, a method may include positioning a survey tool at a predetermined orientation relative to a directional reference system, where the survey tool is configured to acquire continuous survey data while disposed within a wellbore, and where the survey tool comprises a drop survey tool, a wireline survey tool, or a slickline survey tool. The method may also include using the directional reference system to generate a first signal indicative of an orientation of the directional reference system with respect to a reference direction. The method may further include using the first signal to determine an initial orientation of the survey tool with respect to the reference direction. The method may additionally include moving the survey tool after the initial orientation of the survey tool has been determined.

In another implementation, an apparatus may include at least one directional reference system configured to provide data indicative of an orientation of the at least one directional reference system with respect to a reference direction. The apparatus may also include a mounting portion mechanically coupled to the at least one directional reference system, where the mounting portion may be configured to be mechanically coupled to a survey tool while the survey tool is outside of a wellbore such that the survey tool has a predetermined orientation with respect to the at least one directional reference system while the survey tool is outside of the wellbore. The mounting portion may also be configured to be mechanically decoupled from the survey tool while the survey tool is within the wellbore. The survey tool may be configured to acquire continuous survey data while disposed within the wellbore, and wherein the survey tool comprises a drop survey tool, a wireline survey tool, or a slickline survey tool.

In yet another implementation, a method may include positioning a drop survey tool at a predetermined orientation relative to a directional reference system, where the drop survey tool is configured to acquire continuous survey data while disposed within a wellbore using one or more Coriolis vibratory gyroscopic sensors. The method may also include using the directional reference system to generate a first signal indicative of an orientation of the directional reference system with respect to a reference direction. The method may further include using the first signal to determine an initial orientation of the drop survey tool with respect to the reference direction. The method may additionally include moving the drop survey tool after the initial orientation of the drop survey tool has been determined.

BRIEF DESCRIPTION OF THE DRAWINGS

FIGS. 6A-6C schematically illustrate top, front and right side views, respectively, of an apparatus including a tool positioning element in accordance with certain embodiments herein.

FIG. 16 illustrates an example survey tool initialization configuration in which a reference system is mounted on a platform along with one or more optical sighting instruments, according to certain embodiments described herein.

FIG. 18 illustrates an example initialization configuration in which an autocollimation device is mounted at a predetermined orientation with respect to a reference system and is used to determine the initial orientation of the survey tool.

DETAILED DESCRIPTION

Figure 1:
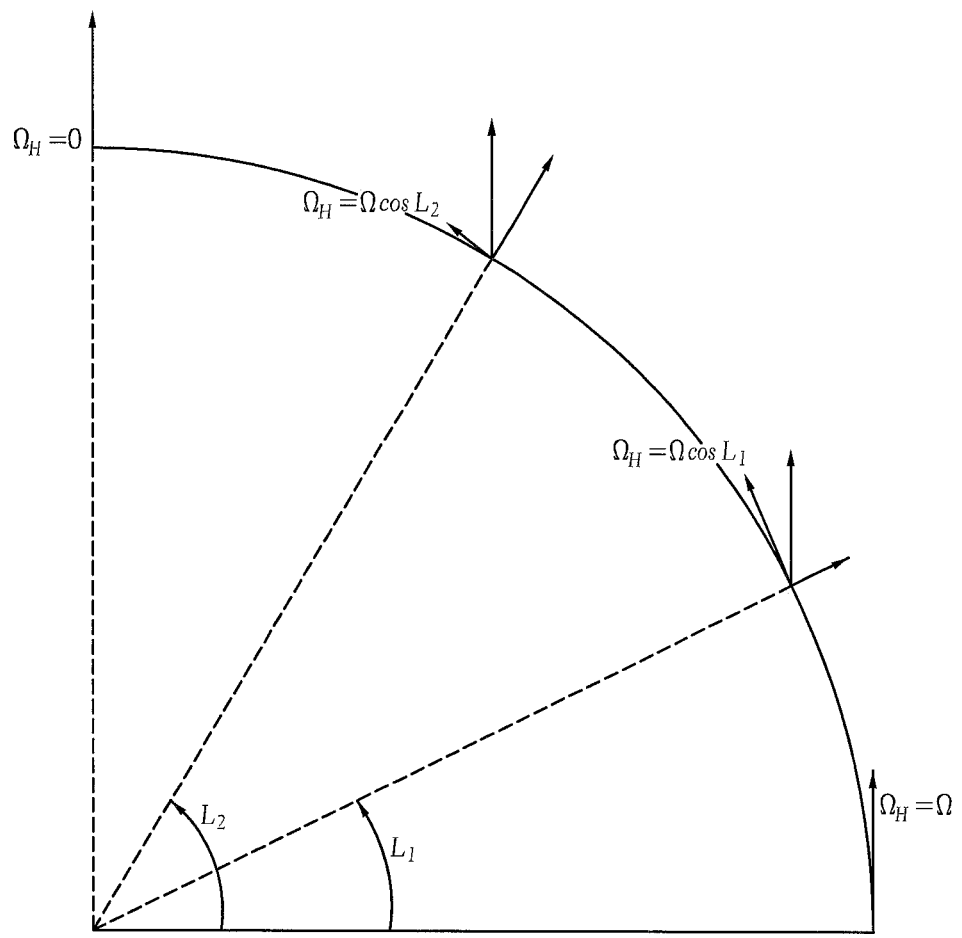
FIG. 1 schematically illustrates the horizontal component of the Earth's rate for changing latitude.

Embodiments described herein provide systems and methods which generally allow precision well surveys to be conducted at high latitude locations, from a moving surface (e.g., an off-shore moving platform), or both.

A. Overview

While underground, gyro survey tools generally rely upon gyro-compassing to conduct a static survey and/or to initiate a period of continuous surveying to determine the orientation of the survey tool with respect to a reference vector (e.g., the vector defined by the horizontal component of the Earth's rate). However, at the surface, there are other procedures which may be adopted. For example, land surveying techniques can be used to define a reference direction (which may also be referred to as a "benchmark direction") to which the tool can be aligned. This process may be referred to as fore-sighting.

Alternatively, measurements from a directional reference system, such as a satellite navigation system, may be used to determine the orientation (e.g., the attitude) of a survey tool with respect to a known geographic reference frame. The Global Positioning System (GPS) or the equivalent system developed by the former Soviet Union, the Global Navigation Satellite System (GLONASS), may be used, for example. Systems exist which use measurements of the differences in carrier wave phase between two or more receiving antennae spaced a known distance apart to determine the attitude of the body or vehicle on which the antennae are mounted. Examples of such systems are described, for example, in U.S. Pat. No. 5,534,875, entitled "Attitude Determining System for Use with Global Positioning System", which is incorporated in its entirety by reference herein. These systems provide world-wide measurement of position, velocity and attitude on and above the surface of the Earth and are substantially immune to magnetic deviations and anomalies.

Using such systems in accordance with certain embodiments described herein, the initial orientation (e.g., attitude) of a survey tool may thus be defined accurately while above ground (e.g., on the surface) and data indicative of the initial orientation (e.g., attitude data) can then be transferred to the tool. In certain circumstances, the survey tool may then be switched to continuous survey mode prior to being positioned for insertion into the wellbore and/or prior to insertion into the wellbore. For example, the initial orientation of the tool may be measured prior to pick-up of the survey tool (e.g., from horizontal to vertical with respect to the wellbore) to position the survey tool into the wellbore. In certain embodiments, this initial measurement may be made while the tool is positioned generally horizontally with respect to the wellbore (e.g., laying on a surface in the vicinity of the wellbore), for example. The survey tool may be switched to continuous mode such that its subsequent orientation (e.g., heading, trajectory, attitude, azimuth, etc.) can be measured with respect to the initial orientation. The survey tool may then be lifted from the horizontal position to another position, such as a vertical position. A continuous survey of the wellbore may then be conducted as the survey tool traverses the well trajectory.

Both land surveying techniques and methods using satellite navigation techniques for determining an initial orientation of the survey tool are susceptible to human errors under certain conditions. For example, the tool may be picked up relatively rapidly and one or more of the sensors keeping track of the orientation of the tool (e.g., in continuous survey mode) may become saturated or otherwise reach their rate limits. In addition, the tool may be dropped in some cases. Certain embodiments described herein address such problems by linking a survey/GPS reference with an inertial system in the survey tool through a semi-automated or automated process that can operate both at high latitude and on a moving surface (e.g., a moving off-shore drilling rig). For example, some embodiments enable the movement of a wellbore tool in a controlled manner (e.g., at a controlled rate) with respect to the wellbore (e.g., through an automated or semi-automated process) and while the tool is in continuous mode after determining an initial orientation (e.g., using a GPS system).

In general, a wellbore survey tool (e.g., a gyro survey tool) may be operated under at least the following categories of conditions:

(1) Operation from a fixed, non-moving platform at limited borehole inclination. In such conditions, for example, one approach is to use a two axis (xy) gyro system to conduct static gyro-compassing surveys. In addition, continuous surveys may be initiated (e.g., using gyro-compassing) and conducted over the whole, or sections, of the wellbore.

(2) Operation in high inclination boreholes from a fixed platform. Under these conditions, for example, one approach is to use a three axis (xyz) gyro system to conduct static gyro-compassing surveys. In addition, continuous surveys may be initiated (e.g., using gyro-compassing) and conducted over the whole, or sections, of the wellbore.

(3) Operation at high latitude from a fixed platform. Here, continuous surveys may be used as the survey tool passes along the wellbore. The survey may be initiated (e.g., an initial orientation may be determined), at the surface using techniques described herein (e.g., using satellite navigation such as GPS) in accordance with embodiments herein. In certain embodiments, satellite navigation techniques may be used in conjunction with an inertial navigation system (INS) (e.g., a joint GPS/INS system, or a stand alone inertial navigation system) which can address issues such as satellite signal non-availability or shielding described herein.

(4) Operation on or from a moving surface (e.g., on or from an off-shore drilling rig). In such conditions, and in accordance with embodiments described herein, continuous surveys may be used throughout the wellbore. The survey may be initiated (e.g., an initial orientation may be determined) at the surface using satellite navigation. In certain embodiments, satellite navigation techniques may be used in conjunction with an inertial navigation system (INS) (e.g., a joint GPS/INS system, or a stand alone inertial navigation system) which can address issues such as satellite signal non-availability or shielding as described herein, and to aid transfer of satellite reference data to the survey tool. Angular matching techniques described herein may also be used to improve the accuracy of the survey.

In certain embodiments, an apparatus (e.g., a rigid platform structure) is configured to be attached to a wellbore surveying tool and to be moved between multiple positions on a drilling rig. The apparatus can be configured to allow for accurate initialization of the survey measurement system within the wellbore survey tool. The apparatus may be configured to enable the transfer of relatively precise orientation (e.g., attitude and/or azimuth) data to a directional survey system in the wellbore survey tool for drilling operations, such as drilling operations at high latitude locations on the Earth, or when operating off-shore from a moving drilling rig.

Certain embodiments described herein provide a relatively precise determination of the orientation of a wellbore survey tool (e.g., attitude, azimuth and/or heading reference) at the surface which does not use gyro-compassing. In certain embodiments, this orientation information may be transferred to an inertial system in the survey tool. This technique can be performed by devices that generally operate independently of the instrumentation and equipment within the survey tool. This independent orientation determination may be performed, for example, based on established land surveying methods (e.g., fore-sighting) or the use of satellite based information (e.g., using GPS technology), and/or using inertial navigation systems (e.g., using an attitude and heading reference system (AHRS) unit). Once the orientation (e.g., attitude and/or azimuth) data is transmitted to the survey tool, a continuous survey procedure can be initiated which involves the integration of gyro measurements as the survey tool is placed in a bore-hole and as it traverses the well path. This continuous surveying process is generally initiated or initialized by the orientation data (e.g., attitude, azimuth, and/or heading data) derived at the surface.

To enable these functions while avoiding potential problems that can occur when surveying underground boreholes, apparatus (e.g., platform structures) as described herein can be moved to a drilling rig generally anywhere in the world where it can be set up to accommodate the various items of equipment used to perform the orientation determination (e.g., attitude, azimuth and/or heading reference determination). These apparatus may comprise rigid platform structures, be of relatively low weight, and may be capable of being mounted generally rigidly on the drilling rig at a location(s) alongside or close to the well head.

The apparatus described herein can include fixturing (e.g., one or more mounts) to allow both independent surface reference equipment (e.g., a directional reference system such as a GPS receiver with two or more antennae) and the survey tool to be mounted (e.g., relatively rigidly) on or within the apparatus. In certain embodiments, the apparatus can be levelled and the orientation of the survey tool can be aligned relatively precisely to a reference direction defined on the platform by the surface reference equipment (e.g., defined by the relative positioning of two or more antennae in the case of a GPS reference). In one embodiment, a GPS receiver is capable of determining the direction of the line joining two antennae of the GPS receiver with respect to true north. In this situation, the azimuth angle defined by the GPS (e.g., the angle of the line joining the two antennae with respect to true north) can be transferred to the survey tool. Inclination and tool-face angle of the survey tool can additionally be determined based on measurements provided by the survey tool (e.g., by one or more accelerometers within the survey tool). The initial orientation (e.g., azimuth, inclination and tool-face angles) can be thereby determined and used to initialize the subsequent integration process (e.g., during continuous surveying) that can be implemented within the tool for keeping track of bore-hole direction as the tool moves along its trajectory. In general, the orientation information can be made available independent or regardless of the latitude of the drilling platform.

B. Initialization of the Survey Tool at High Latitudes

Figure 2:
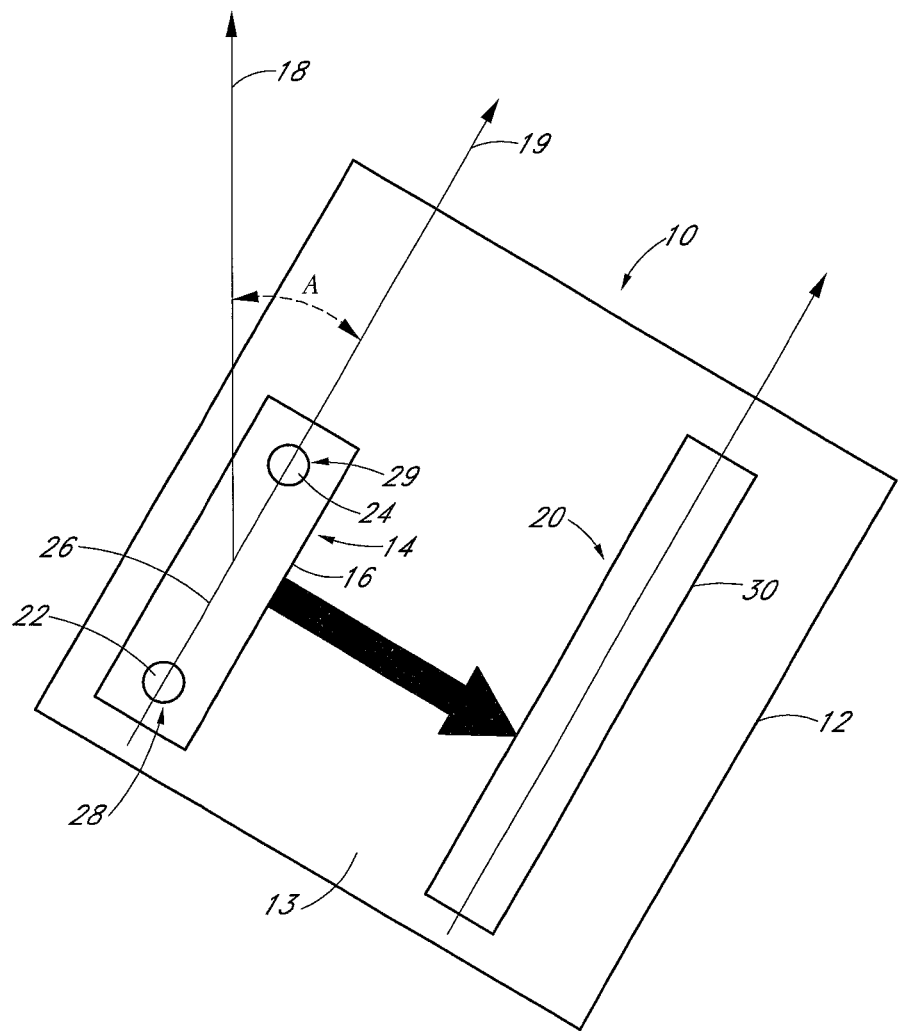
FIG. 2 schematically illustrates an example apparatus for initializing a wellbore survey tool in accordance with certain embodiments described herein.

FIG. 2 schematically illustrates an example apparatus 10 for initializing a wellbore survey tool 30 in accordance with certain embodiments described herein. In certain embodiments, the apparatus 10 comprises a base portion 12 and a first mounting portion 14 mechanically coupled to the base portion 12. The first mounting portion 14 of certain embodiments is adapted to be mechanically coupled to at least one directional reference system 16. The at least one directional reference system 16 can be configured to provide data indicative of an orientation (e.g., attitude and/or azimuth) of the at least one directional reference system 16 with respect to a reference direction 18. The reference direction 18 may be north (e.g., true or rotational north or magnetic north). In certain embodiments, the apparatus 10 further comprises a second mounting portion 20 mechanically coupled to the base portion 12. The second mounting portion 20 may be configured to be mechanically coupled to the wellbore survey tool 30 such that the wellbore survey tool 30 has a predetermined orientation with respect to the at least one directional reference system 16. For example, as shown in FIG. 2, the survey tool 30 may be substantially parallel to the directional reference system 16. In other embodiments, the survey tool 30 may be oriented at some predetermined angle relative to the directional reference system 16, or may be oriented in some other predetermined fashion with respect to the directional reference system 16.

As shown in FIG. 2, the base portion 12 may comprise a substantially rigid, generally rectangular platform structure including a generally planar surface 13. In other embodiments, the base portion 12 may have a different shape (e.g., circular, ovular, trapezoidal, etc.), may be somewhat flexible, and/or may include one or more inclined surfaces, declined surfaces, stepped portions, etc.

In certain embodiments, the base portion 12 comprises carbon fiber. In other configurations, the base portion 12 may comprise another material such as steel, other metal, or a polymer or plastic material. In certain embodiments, the first mounting portion 14 comprises an area of the base portion 12 on which the directional reference system 16 can be mounted. In some embodiments, the first mounting portion 14 comprises one or more fixtures (e.g., mounting faces or blocks) or cut-outs into which the directional reference system 16 may be fitted. In various embodiments, the directional reference system 16 is releasably secured to the first mounting portion 14. For example, the first mounting portion 14 may include one or more straps, clamps, snaps, latches, threaded posts or sockets, etc., for mounting the directional reference system 16. In addition, the directional reference system 16 may include one or more mounting features which are configured to be coupled to corresponding mating features on the first mounting portion 14. In other embodiments, the directional reference system 16 and the first mounting portion 14 may be generally permanently coupled (e.g., welded or glued together). In certain configurations, the first mounting portion 14 comprises or forms a part of a shelf structure which is mounted on or above the base portion 12.

The first mounting portion 14 may also include one or more ports (not shown) (e.g., electrical ports) for operatively coupling the directional reference system 16 to the apparatus 10. For example, the ports may enable electrical communication between the directional reference system 16 and the apparatus 10 or components thereof. In certain other embodiments, the directional reference system 16 is not in direct communication with or otherwise operatively coupled to the apparatus 10 but is in communication with one or more systems or subsystems physically separate from the apparatus 10. Such systems or subsystems may themselves be in communication with the apparatus 10 or components thereof.

In certain embodiments, the at least one directional reference system 16 comprises at least one signal receiver of a global positioning system (GPS). For example, the at least one signal receiver may comprise a first antenna 22 and a second antenna 24 spaced apart from the first antenna 22. In certain such embodiments, the first antenna 22 and the second antenna 24 define a line 26 from the first antenna 22 to the second antenna 24. In certain embodiments more than two antennae may be used. In certain embodiments, the at least one signal receiver further comprises a processor (not shown) configured to receive signals from the first and second antennae 22, 24 and to determine an orientation of the line 26 with respect to the reference direction 18. For example, the processor may be configured to determine an attitude or azimuth of the directional reference system 16 with respect to the reference direction 18. In certain embodiments, the attitude or azimuth determination is relatively precise. For example, the determination can be within about 0.2 degrees in some embodiments. In other embodiments the determination may be more or less precise. In certain embodiments, the first mounting portion 14 comprises a first antenna mount 28 to be mechanically coupled to the first antenna 22 and a second antenna mount 29 to be mechanically coupled to the second antenna 24.

In certain other embodiments, the at least one signal receiver may be a non-GPS signal receiver. For example, the at least one signal receiver may be a signal receiver of another satellite navigation system (e.g., GLONASS), or some non-satellite based navigation or positioning system. As shown, the directional reference system 16, the components thereof, and the base portion 12 may form one physically integral unit (e.g., the generally rectangular unit of FIG. 2). In certain other embodiments, the directional reference system 16 comprises one or more physically separate units, each independently mounted on the base portion 12. For example, in one embodiment, the first antenna 22 forms a first unit to be mounted to the first antenna mount 28 and the second antenna 24 forms a second unit to be mounted to the second antennae mount 29 and physically separate from the first unit.

In some embodiments, surveying methods (e.g., optical sighting methods such as fore-sighting) may be used an alternative method of defining determining or defining the orientation of the platform or a line on the platform with respect to the reference direction 18. In such embodiments, a directional reference system 16 may not be employed and another device, such as a sighting or other surveying device, for example, may be used to determine the orientation (e.g., the direction 19 of the apparatus 10) of the platform or a line thereon (e.g., a line corresponding to the direction 19 of the apparatus 10) with respect to the reference direction 18. Land-surveying techniques (e.g., fore-sighting) may thus be used to determine an initial orientation (e.g., attitude and/or azimuth) of the apparatus 10 or a portion thereof with respect to the reference direction 18. In certain embodiments, the orientation may be determined by optically sighting to a reference object or point at a known location with respect to the location of the apparatus 10 (e.g., an oil rig location). The first mounting portion 14 of such embodiments may be configured to receive and accommodate the surveying device (e.g., a sighting device). The first mounting portion 14 may comprise features described above with respect to FIG. 2, for example (e.g., one or more cut-outs, clamps, snaps, latches, threaded posts or sockets, etc.), but such features are generally configured to mount the surveying device instead of the directional reference system 16. Data indicative of the initial orientation of the platform (e.g., the direction 19 of the platform with respect to the reference direction 18) may then be transmitted to the survey tool 30. In one embodiment, the data may be manually entered by an operator into a computing system in communication with the survey tool 30 and then be transmitted to the tool 30 (e.g., wirelessly). Because the survey tool 30 of certain embodiments is mounted in a predetermined orientation with respect to the apparatus 10 (e.g., parallel with the apparatus 10), the orientation of the survey tool 30 can be determined in accordance with embodiments described herein.

The second mounting portion 20 of certain embodiments comprises an area of the base portion 12 on which the survey tool 30 is mounted. For example, the second mounting portion 20 may comprise the area or surface 21 of the base portion 12. In some embodiments, the second mounting portion 20 comprises one or more fixtures or cut-outs into which the survey tool 30 may be fitted. In various embodiments, the survey tool 30 is releasably secured to the second mounting portion 20. In certain embodiments, the second mounting portion 20 comprises one or more mounting faces or blocks. For example, the mounting faces may be similar to the mounting faces 46 and can extend from the base portion 12 and be positioned on the apparatus 10 such that the survey tool 30 abuts against one or more surfaces of the mounting faces, thereby securing and/or limiting the movement of the survey tool 30 along the base portion 12 in one or more directions. The mounting faces may comprise blocks (e.g., rectangular, cylindrical, triangular, etc. shaped blocks), sheets, and the like. In certain embodiments, the first mounting portion 14, the third mounting portion 44 (FIG. 4), and/or the fourth mounting portion 53 (FIG. 4) can comprise mounting faces similar to the mounting faces 46 of the second mounting portion 20 and which are configured to secure and/or limit the movement of the directional reference system 16, the inertial navigation system 42, and the computing system 52, respectively. The apparatus 10 of FIG. 4 includes mounting faces 46 on one side of the survey tool 30. Other configurations are possible. For example, in one embodiment, there are mounting faces 46 on the opposite side of the survey tool 30 and/or on each end of the survey tool 30.

In various embodiments, the second mounting portion 20 may include one or more straps, clamps, snaps, latches, threaded posts or sockets, etc., for mounting the survey tool 30. In addition, the survey tool 30 may include one or more mating features configured to be coupled to corresponding mating features on the second mounting portion 20. In some embodiments, the second mounting portion 20 comprises one or more securing elements (e.g., straps, clamps, etc.) positioned along the casing of the survey tool 30 when the survey tool 30 is mounted. In certain embodiments, the securing elements are positioned along one or both of the long sides of the casing of the survey tool 30, at one or both of the two ends of the casing of survey tool 30, or a combination thereof. In various other embodiments, the securing elements are positioned along only one side, along one or more of the ends of the casing of the survey tool 30, or beneath or above the casing of the survey tool 30. In certain embodiments, the second mounting portion 20 comprises or forms a part of a shelf structure which is mounted on or above the base portion 12. For example, in one embodiment, the first mounting portion 14 and the second mounting portion 20 each comprise separate shelf structures and form a multi-leveled shelf structure on or over the base portion 12.

The second mounting portion 20 may also include one or more ports (e.g., electrical ports) for operatively coupling the survey tool 30 to the apparatus 10. For example, the ports may enable electrical communication between the survey tool 30 and the apparatus 10 or components thereof. In certain other embodiments, the survey tool 30 is not in direct communication or otherwise operatively coupled to the apparatus 10, but is in communication with one or more systems or subsystems physically separate from the apparatus 10. Such systems or subsystems may themselves be in communication with the apparatus 10 or components thereof.

The survey tool 30 of certain embodiments can comprises various sensors and computing hardware such that it can make use of various measured quantities such as one or more of acceleration, magnetic field, and angular rate to determine the orientation of the survey tool 30 and of the wellbore with respect to a reference vector such as the Earth's gravitational field, magnetic field, or rotation vector. In certain embodiments, the survey tool 30 is a dedicated survey instrument while, in other embodiments, the survey tool 30 is a measurement while drilling (MWD) or logging while drilling (LWD) instrumentation pack which may be coupled to a rotary steerable drilling tool, for example.

Because the line 26 between the two antennae 22, 24 may be generally aligned with a direction 19 of the apparatus 10, or the orientation of the line 26 with respect to the apparatus 10 may otherwise be known, the line 26 may define, correspond to, or be used as the orientation (e.g., direction 19) of the apparatus 10 with respect to the reference direction 18. In FIG. 2, for example, the line 26 is shown rotated with respect to the reference direction 18 (e.g., true north) by angle A. The angle A may define or be characterized as the angle (e.g., azimuth angle) of the apparatus 10 with respect to the reference direction 18. Moreover, because the survey tool 30 can be aligned with respect to the line 26, the angle A can therefore also correspond to the direction (e.g., azimuth direction) of the survey tool 30 with respect to the reference direction 18. The angle A can thus be transmitted (e.g., as electronic data) to the survey tool 30 for the initialization of the survey tool 30.

Figure 3:
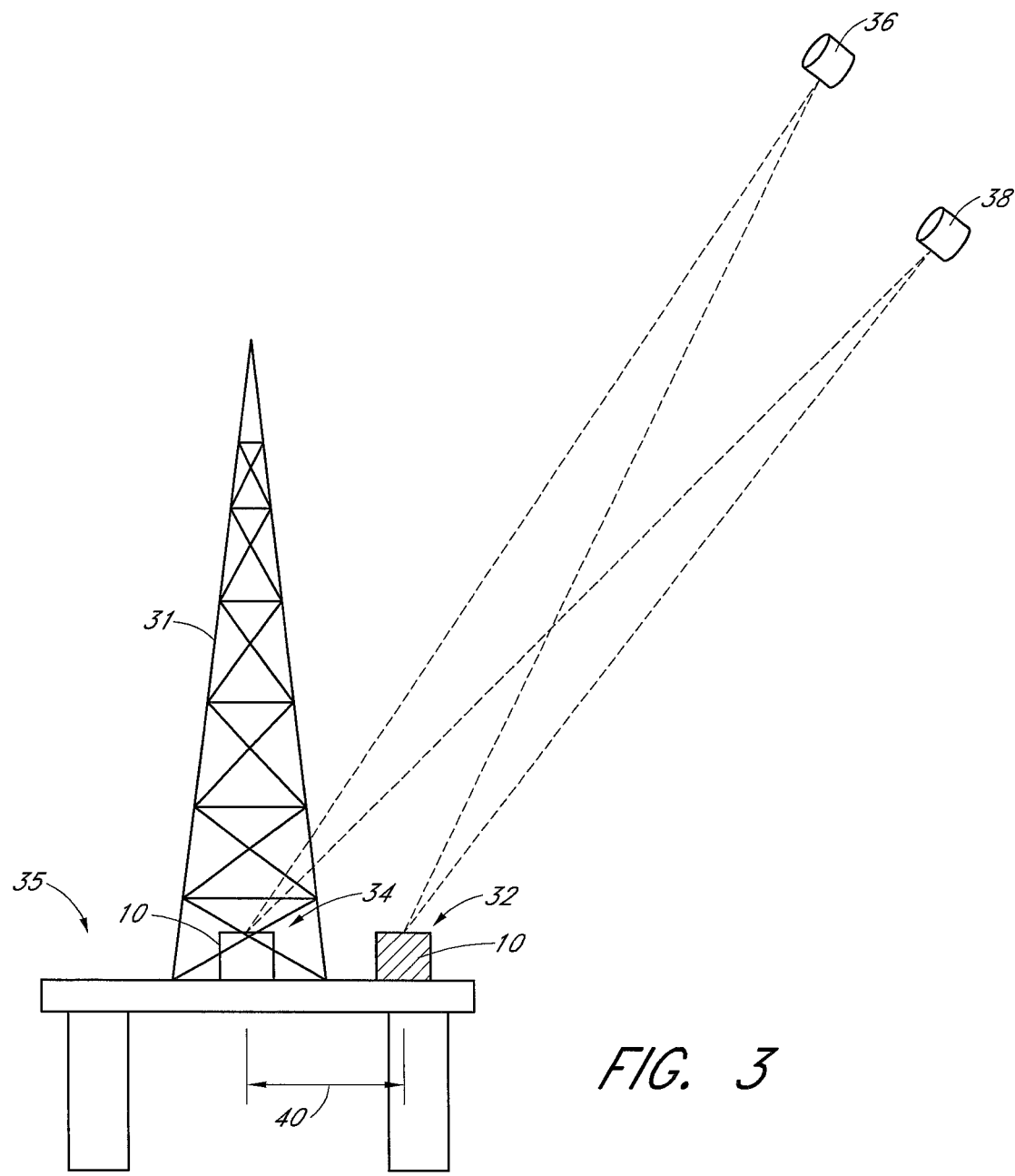
FIG. 3 schematically illustrates apparatus according to certain embodiments described herein in a first location in which a relatively clear communication path between GPS antennae of the apparatus and GPS satellites, and in a second location in which the GPS antennae are at least partially shielded from communication with GPS satellites by a derrick.

Loss of satellite telemetry to and/or detected by the directional reference system 16 can arise in some conditions. Such loss can occur, for example, due to shielding of one or more of the GPS antennae from one or more of the satellites by a derrick or other equipment on a rig. In addition, relatively unfavorable positioning of the satellites that are in view of the platform can lead to a loss of precision in the orientation (e.g., attitude and/or azimuth) determination process. This loss of precision may be referred to as the geometric dilution of precision, for example. FIG. 3 schematically illustrates the apparatus 10 according to certain embodiments described herein in a first location 32 on a drilling rig 35 having a relatively clear communication path between the antennae 22, 24 and the GPS satellites 36, 38, and in a second location 34 at which one or more of the antennae 22, 24 are shielded from communication with one or more GPS satellites 36, 38 by the derrick 31. As illustrated by the dotted lines, the apparatus 10 to which the survey tool 30 is to be mounted for initialization is in clear view of the satellites 36, 38 in the first location 32 when spaced from the derrick 31 by a first distance 40. As such, a relatively clear communication path may exist between the antennae 22, 24 and the satellites 36, 38. On the other hand, when located directly under the derrick 31 in the second position 34, the derrick 31 may block or otherwise interfere with communications from the satellites 36, 38 to the antennae 22, 24, and there may no longer be a relatively clear communication path between the antennae 22, 24 and the satellites 36, 38. As such, satellite telemetry to and/or detected by the directional reference system 16 may be interrupted. In the example configuration of FIG. 3, communications from the satellites 36, 38 to the antennae may be similarly interrupted when the apparatus 10 is in other positions, such as when the apparatus 10 is positioned to the left of the derrick 31. The distance 40 may generally be selected so as to ensure a relatively clear communication path between the antennae 22, 24 and the satellites 36, 38. For example, the distance 40 may range from 5 to 10 meters in certain embodiments. In other embodiments, the distance 40 can be less than 5 meters or greater than 10 meters.

It can be beneficial to have the capability to move the apparatus 10 (e.g., along the surface of a rig) between the first location 32 where the effect of signal shielding is small (e.g., where the apparatus 10 is spaced apart from the drilling derrick 31) and the second location 34, where the survey tool 30 may be inserted into the wellbore but where the satellite telemetry may be compromised. In certain embodiments, an orientation of the directional reference system 16 and/or survey tool 30 may be accurately obtained at the first location 32 without substantial obstruction or other interference from the derrick 31, or from other sources. In addition, it is desirable to be able to keep track of the relative orientation of the apparatus 10 or components thereof as it moves from the first location 32 to the second location 34. As such, deviations from the at the first location 32 may be tracked while the apparatus 10 is moved to the second location 34, thereby maintaining an up-to-date orientation (e.g., attitude, azimuth, and/or heading) of the apparatus and components thereof during movement. As described herein, an inertial navigation system may be used for such purposes.

Figure 4:
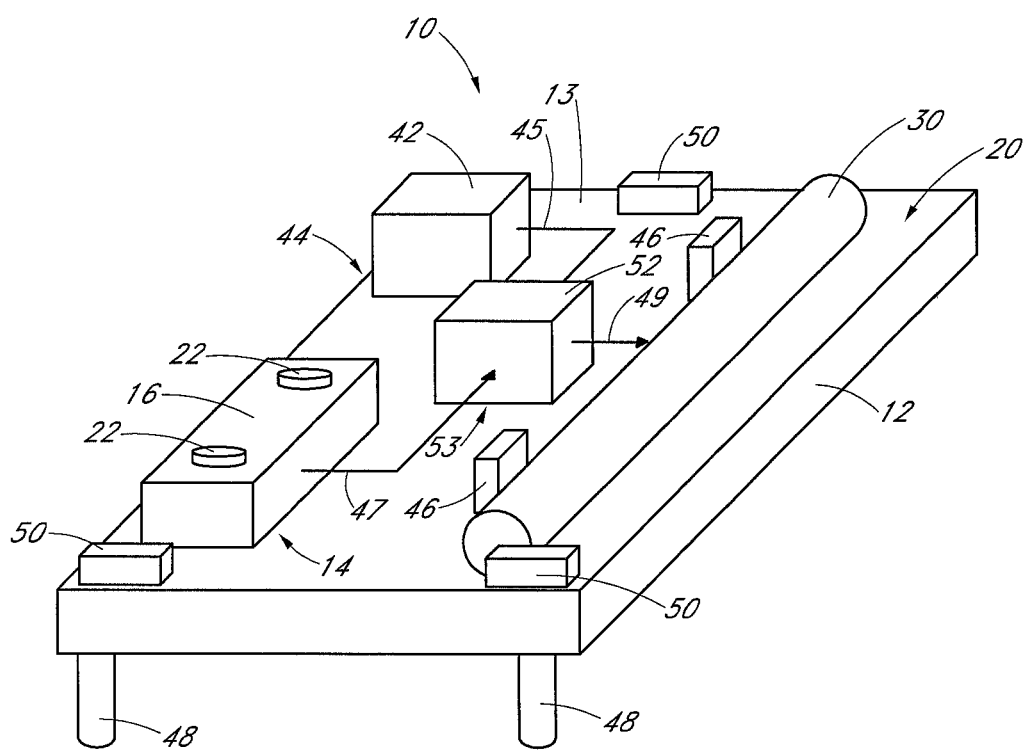
FIG. 4 schematically illustrates another example apparatus in accordance with certain embodiments described herein.

FIG. 4 schematically illustrates an example apparatus 10 in accordance with certain embodiments described herein. The apparatus 10 of certain embodiments includes a third mounting portion 44 mechanically coupled to the base portion 12. The third mounting portion 44 is configured to be mechanically coupled to at least one inertial navigation system 42. In certain embodiments, the third mounting portion 44 comprises an area of the base portion 12 on which the inertial navigation system 42 is mounted. In some embodiments, the third mounting portion 44 comprises one or more fixtures or cut-outs into which the inertial navigation system 42 may be fitted. In various embodiments, the inertial navigation system 42 is releasably secured to the third mounting portion 44. For example, the third mounting portion 44 may include one or more straps, clamps, snaps, latches, or threads, etc. for mounting the inertial navigation system 42. In addition, the inertial navigation system 42 may include one or more mating features configured to be coupled to corresponding mating features on the third mounting portion 44. In other embodiments, the inertial navigation system 42 and the third mounting portion 44 may be generally permanently coupled (e.g., welded or glued together). In certain embodiments, the third mounting portion 44 comprises or forms a part of a shelf structure which is mounted on or above the base portion 12. For example, in one embodiment, the third mounting portion 44 and one or more of the first mounting portion 14 and the second mounting portion 20 may each comprise separate shelves and form a multi-leveled shelf structure on or over the base portion 12.

The third mounting portion 44 may also include one or more ports (e.g., electrical ports) for operatively coupling the inertial navigation system 42 to the apparatus 10. For example, the ports may enable electrical communication between the inertial navigation system 42 and the apparatus 10 or components thereof. In certain other embodiments, the inertial navigation system 42 is not in direct communication or otherwise operatively coupled to the apparatus 10, but is in communication with one or more systems or subsystems physically separate from the apparatus 10. Such systems or subsystems may themselves be in communication with the apparatus 10 or components thereof.

The inertial navigation system 42 generally provides the capability of maintaining the heading or orientation information obtained at the first location 32 while the apparatus 10 is moved from the first location 32 (e.g., on a rig from the first location 32 to the second location 34). The inertial navigation system 42 may comprise an attitude and heading reference system (AHRS), for example, and may be used to keep track of the orientation of the apparatus 10 and components thereon (e.g., attitude and/or azimuth) during movement of the apparatus 10 (e.g., from the first location 32 to the second location 34 of FIG. 3). For example, the inertial navigation system 42 may keep track of the orientation (e.g., attitude, azimuth, and/or heading) during movement of the apparatus 10 should the performance of the directional reference system 16 become compromised (e.g., the antennae of a GPS system are obscured from the satellite by the derrick 31 on a rig) or cannot be used to determine the orientation of the apparatus at the well head of the wellbore. In other embodiments, other types of inertial navigation systems, such as a full inertial navigation system (INS) may be used. In some embodiments, the directional reference system 16 or components thereof and the inertial navigation system 42 may be integrated into a single unit (e.g., a GPS/AHRS unit).

Figure 5:
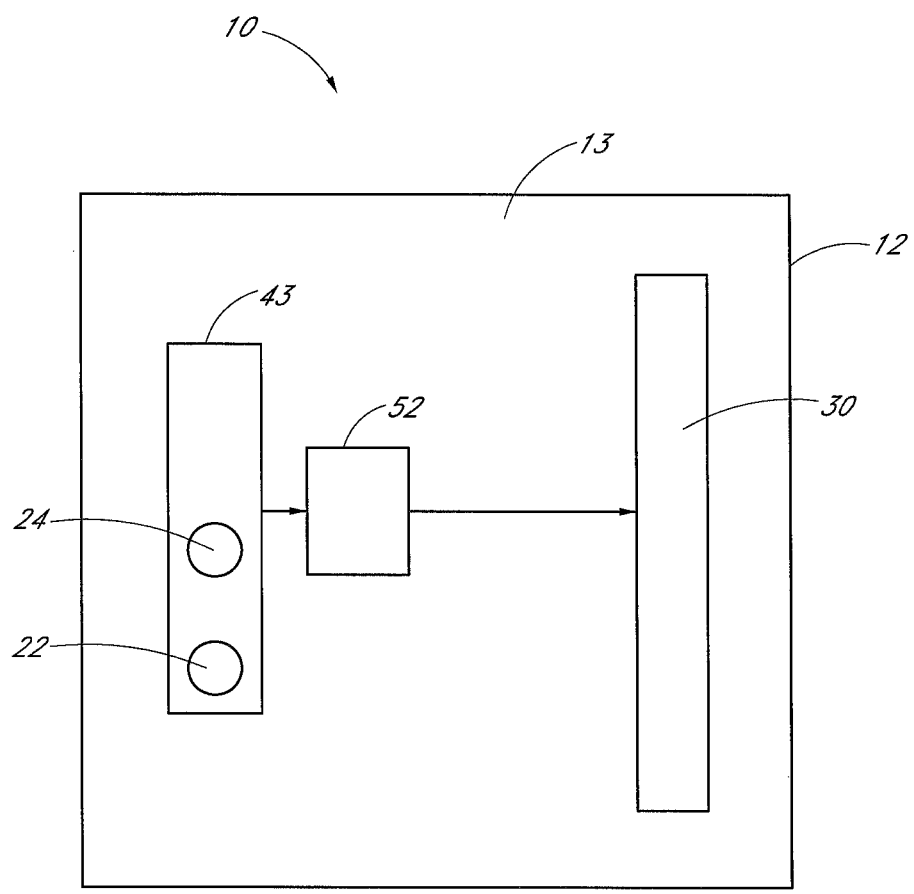
FIG. 5 schematically illustrates a top view of an apparatus including an integrated GPS/AHRS unit in accordance with certain embodiments described herein.

FIG. 5 schematically illustrates a top view of an apparatus 10 including an integrated GPS/AHRS unit 43 in accordance with certain embodiments described herein. Referring again to FIG. 4, the inertial navigation system 42 may comprise a processor and one or more motion sensors (e.g., accelerometers) positioned within the GPS/AHRS unit 43 and may be configured to generally continuously calculate the position, orientation, and/or velocity of the apparatus 10 as it is moved.

As shown in FIG. 4, the second mounting portion 20 of certain embodiments may comprise one or more mounting faces 46 which are described in detail above with respect to FIG. 2.

The apparatus 10 further comprises at least one leveler 48 configured to level the apparatus 10 with respect to the Earth (e.g., to be substantially perpendicular to the direction of gravity). The at least one leveler 48 may comprise a set of one or more adjustable supports, for example. Various adjustment mechanisms are possible. For example, in one embodiment, the leveler 48 comprised a retractable portion (e.g., a threaded rod) which can be used to lengthen or shorten the leveler 48 (e.g., by extending from and retracting into the base portion 12). In another embodiment, the leveler comprises an expandable portion (e.g., a balloon or other fillable member) which can be inflated and deflated to adjust the length of the leveler to level the apparatus 10 with respect to the Earth. The apparatus 10 of FIG. 4 comprises three levelers 48 (one of which is not shown) shaped as cylindrical support posts. One leveler 48 is attached to the underside of one corner of the base portion 12, one leveler 48 is attached to the underside of a neighboring corner of the base portion 12, and one leveler 48 (not shown) is attached to the center of a side between two other corners of the base portion 12. In some embodiments, the at least one leveler 48 comprises an elongate leg portion attached to the base portion 12 and a foot portion which contacts the surface beneath the apparatus 100. The foot portion of certain embodiments is generally widened with respect to the leg portion and may be attached to the bottom of the leg portion. In one embodiment, there are four levelers 48, each attached to the underside of one of the four corners of the base portion 12. In another embodiment, the levelers 48 comprise a set of elongate members each attached to and extending laterally from a side of the base portion 12, and extending downwards to make contact with the surface beneath the apparatus 10. In yet other embodiments, the at least one leveler comprises one or more rails extending along the underside of the base portion 12. In other embodiments, there may be one leveler 48, two levelers 48, or more than three levelers 48 and/or the levelers 48 may be shaped or configured differently (e.g., as rectangular posts, blocks, hemispherical protrusions, etc.).

In addition, the apparatus 10 may further comprise at least one level detector 50 configured to generate a signal indicative of the level or tilt of the apparatus 10 with respect to the Earth. In certain such embodiments, the at least one leveler 48 is configured to level the apparatus 10 with respect to the Earth in response to the signal from the at least one level detector 50. For example, the level detector 50 may comprise a bubble-type level detector, or some other type of level detector. In certain embodiments, the apparatus 10 may include one or more supports which are not adjustable. In certain other embodiments (e.g., where the apparatus 100 does not include a leveler 48), the signal from the at least one level detector 50 may be used to adjust computations, such as computations regarding the orientation of the apparatus 10, components thereof (e.g., the directional reference system 16), or the survey tool 30. For example, the signal may be used to compensate for any level differences between the apparatus 10 and the Earth in such computations. In general, the at least one level detector 50, in conjunction with the at least one leveler 48 can be configured to detect tilt of the apparatus 10 and physically level the apparatus 10 in response to such tilt.

In certain embodiments, the apparatus 10 further comprises at least one member (not shown) movably coupled to a portion of the apparatus 10 and configured to allow the apparatus 10 to move along a surface beneath the apparatus 10. The surface may be the Earth's surface, a rig surface, etc. In certain embodiments, the at least one member comprises at least one wheel configured to rotate about at least one axis. In other embodiments, the at least one member may comprise a tread, ski, or other mechanism configured to allow for movement of the apparatus 10 along the surface. For example, in one embodiment the apparatus 10 comprises four with each wheel positioned near a corresponding one of the four corners of the base portion 12. The at least one member may be extendable/retractable such that it can be extended towards the surface (e.g., away from the base portion 12) for use and can be retracted away from the surface (e.g., towards the base portion 12) when the at least one member is not in use. For example, in one embodiment, the at least one member comprises a set of wheels which can be extended from a first position in which the wheels are not in contact with the surface to a second position in which the wheels are in contact with the surface for moving the apparatus 10 along the surface. The wheels can then be raised from the second position back to the first position, such as when the apparatus 10 has reached the desired destination. The raising of the wheels can allow for relatively improved stability of the apparatus 10 on the surface in certain embodiments (e.g., while survey tool is being initialized). In other embodiments, the at least one member is not retractable and is in continuous contact with the surface. In various configurations, generally any number of members (e.g., 1, 2, 3, 4, 5, or more) may be employed.

In certain embodiments, the apparatus 10 further comprises a computing system 52. In certain embodiments, the computer may be in communication with the directional reference system 16 (e.g., as indicated by arrow 47), the inertial navigation system 42 (e.g., as indicated by arrow 45), and/or the survey tool 30 (e.g., as indicated by arrow 49). For example, the computing system 52 may receive data indicative of the orientation of the apparatus 10 with respect to the reference direction 18 from the directional reference system 16. The computing system 52 may also receive information from the inertial navigation system 42, such as information regarding the position, orientation, and/or velocity of the apparatus 10 as it moves along the surface beneath the apparatus 10. The computing system 52 may further be configured to process the information from the directional reference system 16 and/or the inertial navigation system 42 to determine an initial orientation of the survey tool 30. The computing system 52 may further be configured to transmit such information to the survey tool 30 in some embodiments. In other embodiments, the computing system 52 may transmit the data from the directional reference system 16 and/or the inertial navigation 42 directly to the survey tool 30 for at least some of the processing instead of performing the processing of the data itself. In some embodiments, there is no computing system 52, and the survey tool 30 receives the data directly from the directional reference system 16 and the inertial navigation system 42 and processes the data itself.

The apparatus 10 may further comprise a fourth mounting portion 53. The fourth mounting portion 53 comprises an area of the base portion 12 on which the computing system 52 is mounted. In some embodiments, the fourth mounting portion 53 comprises one or more cut-outs or fixtures onto which the computing system 52 may be fitted. In various embodiments, the computing system 52 is releasably secured to the fourth mounting portion 53. For example, the fourth mounting portion 53 may include one or more straps, clamps, snaps, latches, or threads, etc. for mounting the computing system 52. In addition, the computing system 52 may include one or more mating features configured to be coupled to corresponding mating features on the fourth mounting portion 53. In other embodiments, the computing system 52 and the fourth mounting portion 53 may be generally permanently coupled (e.g., welded or glued together). In certain embodiments, the fourth mounting portion 53 comprises or forms a part of a shelf structure which is mounted on or above the base portion 12. For example, in one embodiment, the fourth mounting portion 53 and one or more of the first mounting portion 14, the second mounting portion 20, and the third mounting portion 44 may each comprise separate shelves and form a multi-leveled shelf structure on or over the base portion 12.

The fourth mounting portion 53 may also include one or more ports (e.g., electrical ports) for operatively coupling the computing system 52 to the apparatus 10. For example, the ports may enable electrical communication between the computing system 52 and the apparatus 10 or components thereof.

In certain embodiments, the apparatus 10 further comprises a tool positioning element 56. FIGS. 6A-6C schematically illustrate top, front and right side views, respectively, of an apparatus 10 including a tool positioning element 56. The tool positioning element 56 can be configured to controllably move the wellbore survey tool 30 between a first position relative to the apparatus 10 and a second position relative to the apparatus 10. In certain embodiments, the first position is horizontal with respect to the base portion 12 and the second position is vertical with respect to the base portion 12. In other embodiments, the survey tool 30 may be positioned at an angle relative to the base portion 12 in one or more of the first and second positions. In certain embodiments, the tool positioning element 56 comprises a motorized system such as a motor drive 60. The tool positioning element 56 may be configured to rotate the surface 21 of the second mounting portion 20 to which the survey tool 30 can be coupled and which can be rotated (e.g., using the motorized drive 60 or another motorized system) with respect to the base portion 12 from horizontal to vertical so as to move the survey tool 30 between the first position and the second position. In other embodiments, the tool positioning element 56 comprises a pulley system (e.g., a motorized pulley system) for lifting and lowering the survey tool 30 between the first position and second position, or some other mechanism for moving the survey tool 30.

Figure 6D:
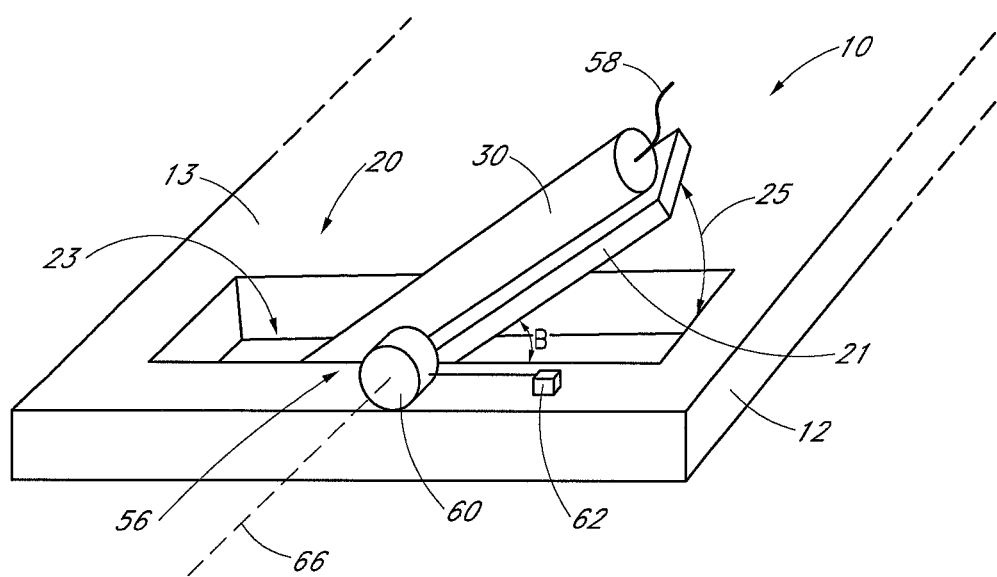
FIG. 6D schematically illustrates a partial perspective view of an apparatus including a tool positioning element during positioning of a survey tool in accordance with certain embodiments described herein.

FIG. 6D schematically illustrates a partial perspective view of an apparatus 10 including a tool positioning element 56 during positioning of a survey tool 30 in accordance with certain embodiments described herein. The drive motor 60 of the apparatus 10 of FIG. 6D is visible through the base portion 12 for the purposes of illustration. As indicated by the directional arrow 25, the tool positioning element 56 is movable between a first (e.g., horizontal) position and a second (e.g., vertical position). The tool positioning element 56 may, in certain embodiments, controllably move or rotate the survey tool 30 in inclination while it is attached or otherwise coupled to the apparatus 10. The survey tool 30 is shown in FIG. 6D during movement of the survey tool 30 by the positioning element 56 between the first and second positions such that the survey tool 30 is currently positioned at an angle B with respect to surface 13 of the apparatus 10. As shown, the drive motor 60 of the positioning element 56 is configured to controllably move the surface 21 to which the survey tool 30 can be generally rigidly attached about the axis 66 between the first and second position.

In one example scenario, the tool positioning element moves the survey tool 30 is mounted to the apparatus 10 in a generally vertical orientation, while the surface 21 is positioned by the tool positioning element 56 in a generally vertical orientation with respect to the surface 13 of the base portion 12. The surface 21 and survey tool 30 mounted thereon are then rotated by the positioning element 56 such that the surface 21 and survey tool 30 are generally horizontal or flush with respect to the surface 13 of the base portion 12. The survey tool 30 may be initialized using the initialization process described herein while in the horizontal position. The survey tool 30 may then be rotated back to the vertical position by the tool positioning element 56 and then disconnected or un-mounted from the apparatus 10 at which point the survey tool 30 may be supported by a wire line 58, for example and lowered into the well bore.

In other embodiments, the survey tool 30 is not rotated to horizontal, but is rotated to some other angle with respect to the apparatus 10 (e.g., 15 degrees, 30 degrees, 45 degrees, 60 degrees, etc.). In addition, the survey tool 30 may not be rotated to a complete vertical position, but to some other angle with respect to the apparatus 10. In other embodiments, the apparatus 10 does not include a positioning element 56. In such embodiments, the survey tool 30 may be mounted generally in the orientation (e.g., vertical with respect to the surface 13 of the apparatus 10) in which the apparatus 10 will be deployed to the well bore. In addition, the positioning element 56 may be positioned or mounted differently on the apparatus 10. For example, the motor drive 60 and corresponding axis 66 are shown positioned generally in the middle cut-out portion 23 in FIG. 6D. As such, when the survey tool 30 is positioned in the vertical position, half of the survey tool 30 is positioned substantially above the base portion 12 and the other half of the survey tool 30 is positioned above the base portion 12. In other embodiments, the corresponding motor drive 60 axis 66 may be positioned differently, such as generally at one end of the cut-out portion 23. In some such cases, the positioning element 56 may rotate the survey tool 30 generally from a horizontal position to a vertical position in which a survey tool 30 or a substantial portion thereof is rotated under the base portion 12. In other such cases, the positioning element may rotate the survey tool 30 generally from a horizontal position to a vertical position in which a survey tool 30 or a substantial portion thereof is rotated above the base portion 12.

It is desirable to move (e.g., rotate) the tool at a relatively low rate (e.g., within the rate limits of the gyroscopes on the survey tool 30). Certain embodiments advantageously avoid turning of the survey tool 30 undesirably high turn rates which exceed the maximum rates which can be measured by one or more rotation sensors (e.g., gyroscopes) of the survey tool 30. Under such undesirable conditions, the orientation data (e.g., directional reference data) stored in the survey tool 30 can be lost and subsequent orientation (e.g., attitude and/or azimuth) processing will be in error. By controllably moving the survey tool 30 (e.g., using the drive motor 60 about the axis 66), the tool positioning element 56 may, in certain embodiments, avoid saturation of sensors of the survey tool 30 and thereby allow the survey tool 30 to continue to keep track of its rotation as it is moved.

In an example use scenario, the apparatus 10 can be location at a position at which the directional reference system 16 is operational and the reference direction 18 may be determined using the directional reference system 16 (e.g., a GPS signal receiver). The apparatus 10 may then be moved physically to the well head of the wellbore (e.g., using the at least one member movably coupled to a portion of the apparatus 10) with the orientation or directional reference being maintained, monitored, or detected by the inertial navigation system 42 (e.g., an AHRS unit) while the apparatus 10 is moved. In certain embodiments, this movement occurs over a relatively short period of time (e.g., on the order of several minutes). Once positioned at the well head, the survey tool 30 may be placed into a designated position (e.g., to the second mounting portion 20) and clamped to the apparatus 10. The orientation data (e.g., attitude, azimuth and/or heading data) may then be transmitted from the inertial navigation system 42 (e.g., an AHRS) to the wellbore survey tool 30 to initialize the survey tool 30. For example, the orientation data may be transmitted to an inertial system within the survey tool 30 via the computing system 52 or, alternatively, directly to the wellbore survey tool 30. In certain other embodiments, the survey tool 30 is mounted on to the apparatus 10 while the apparatus 10 is moved from the first position to the second position.

Figure 7:
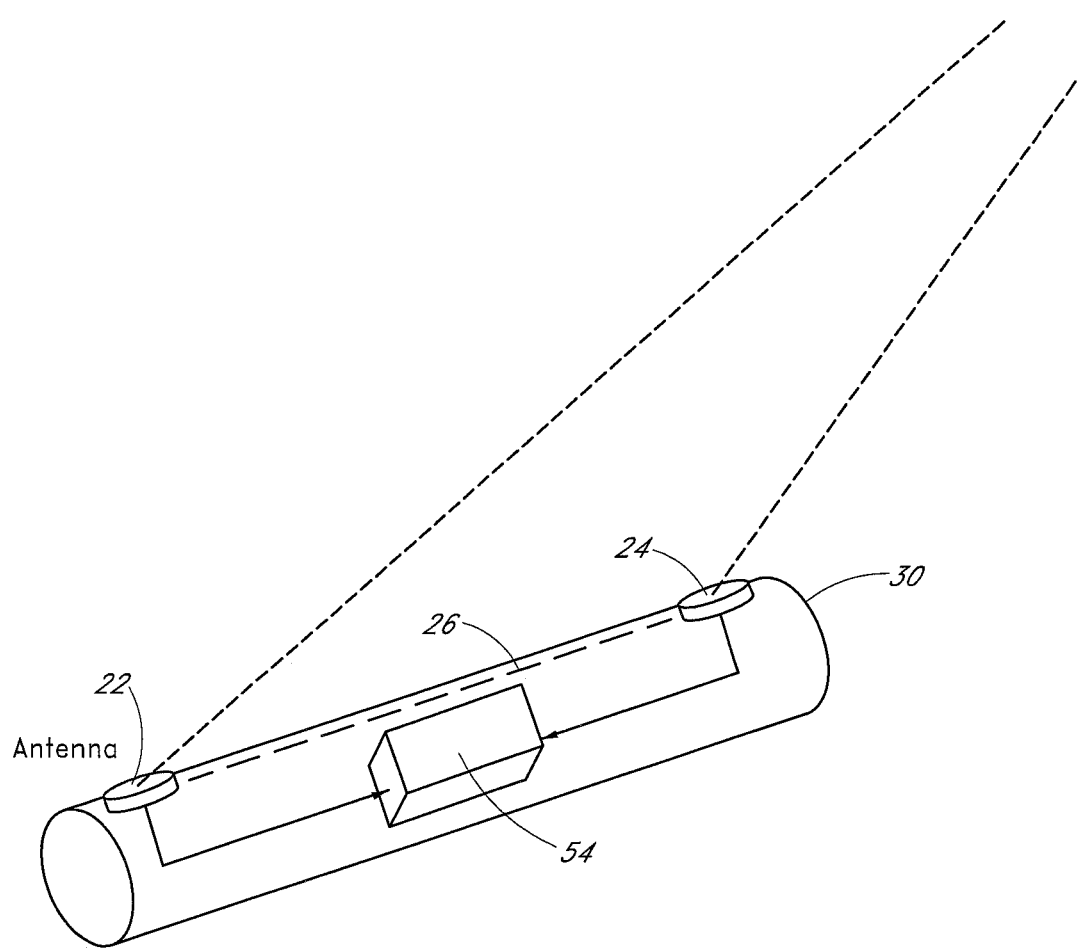
FIG. 7 schematically illustrates an example wellbore survey tool on which a directional reference system is directly mounted in accordance with certain embodiments described herein.

FIG. 7 schematically illustrates an embodiment in which the directional reference system 16 is mounted directly on the wellbore survey tool 30 in accordance with certain embodiments described herein. The directional reference system 16 comprises at least one signal receiver of a global positioning system (GPS) which can include a first antenna 22 and a second antenna 24 spaced apart and defining a line 26 from the first antenna 22 to the second antenna 24. In certain embodiments, the survey tool 30 comprises a processor 54 configured to receive signals from the first and second antennae 22, 24 and to determine an orientation of the line 26 with respect to the reference direction in response to the signals. Because a processor 54 of the survey tool 30 may be used instead of a dedicated processor of the directional reference system 16, hardware costs may thereby be reduced. In addition, because the directional reference system 16 may be directly mounted on the survey tool 30, there may be less calibration inaccuracy due to possible misalignments in the orientation of the directional reference system 16 with respect to the survey tool 30. In other embodiments, the directional reference system 16 comprises a processor which is used to determine the orientation and a processor of the survey tool 30 is not used. For example, the processor 53 may be configured to determine an orientation (e.g., attitude and/or azimuth) of the directional reference system with respect to the reference direction.

Where the directional reference system 16 (e.g., a GPS signal receiver comprising the two or more antennae 22, 24) is mounted on or within the survey tool 30 itself, as illustrated in FIG. 7, the survey tool 30 itself can be mounted relatively rigidly on the drilling rig (e.g., in a horizontal or other non-vertical orientation) to conduct the initialization process (e.g., initial attitude and heading determination). For example, the orientation (e.g., attitude) determination may be made using measurements of the phase difference in the satellite carrier signals (e.g., between the antennae 22, 24). Such a determination may be made by computation by the processor 54 within the survey tool 30, for example. This information may again be used to define the initial attitude of the survey tool 30 prior to engaging or initializing a continuous survey mode. The attitude data (e.g., data derived from GPS data from the directional reference system 16) can form the initial conditions for the gyro measurement integration process, which allows for tracking of the attitude of the survey tool 30 after the initialization.

In certain embodiments, the apparatus 10 further comprises at least one of the at least one directional reference system 16 and the at least one inertial navigation system 42. In certain embodiments in which the apparatus comprises the at least one directional reference system 16, the apparatus 10 further comprises a mounting portion (e.g., one or more portions of the base portion 12, the first mounting portion 14, the second mounting portion 20, the third mounting portion 44, and the fourth mounting portion 53) mechanically coupled to the at least one directional reference system 16 and configured to be mechanically coupled to the wellbore survey tool 30 while the wellbore survey tool 30 is outside a wellbore such that the wellbore survey tool 30 has a predetermined orientation with respect to the at least one directional reference system 16 while the wellbore survey tool 30 is outside the wellbore. The mounting portion may be further configured to be mechanically decoupled from the wellbore survey tool 30 while the wellbore survey tool 30 is within the wellbore. The apparatus 10 may further comprise a support structure configured to allow the apparatus to move along a surface beneath the apparatus while the wellbore survey tool 30 is transported outside the wellbore. For example, in certain embodiments, the support structure may comprise one or more of the base portion 12, the at least one member movably coupled to a portion of the apparatus 10, the at least one leveler 48, or portions thereof, as described herein.

Embodiments described herein may further be used to provide a relatively long term attitude reference on the drilling rig. As discussed, after initialization of the survey tool 30 according to embodiments described herein, the survey tool 30 may be deployed into the wellbore and used to conduct a survey (e.g., in continuous survey mode). In certain cases, the survey tool 30 may have been initialized accurately according to embodiments described herein prior to deployment, but calibration errors may accumulate during operation, thereby causing "drift." Such calibration errors may be acceptable under certain circumstances (e.g., where the drift of less than about 10%). However, relatively large calibration errors can be problematic and it can be desirable to measure such errors. In certain embodiments, after withdrawal of the survey tool 30 from the wellbore, the survey tool 30 orientation (e.g., attitude) determined by the survey tool 30 can be compared to a reference orientation (e.g., attitude) determined by the apparatus 10 to can provide a post-survey check on the calibration or amount of drift of the survey tool 30. For example, the survey tool 30 may be mounted to the apparatus 10 following its withdrawal from the wellbore and readings of the orientation (e.g., attitude) of the survey tool 30 from the survey tool 30 may be compared to readings of the orientation (e.g., attitude) from the directional reference system 16. In certain other embodiments, the orientation readings from the survey tool 30 may be compared to readings from the orientation of the inertial navigation system 42, or from an integrated device such as the GPS/AHRS 43 of FIG. 5. Differences in orientation determined from such a comparison may correspond to calibration errors or "drift." This general process may be described as a quality control (QC) check on the 'health' of the survey tool 30, for example.

Figure 8:
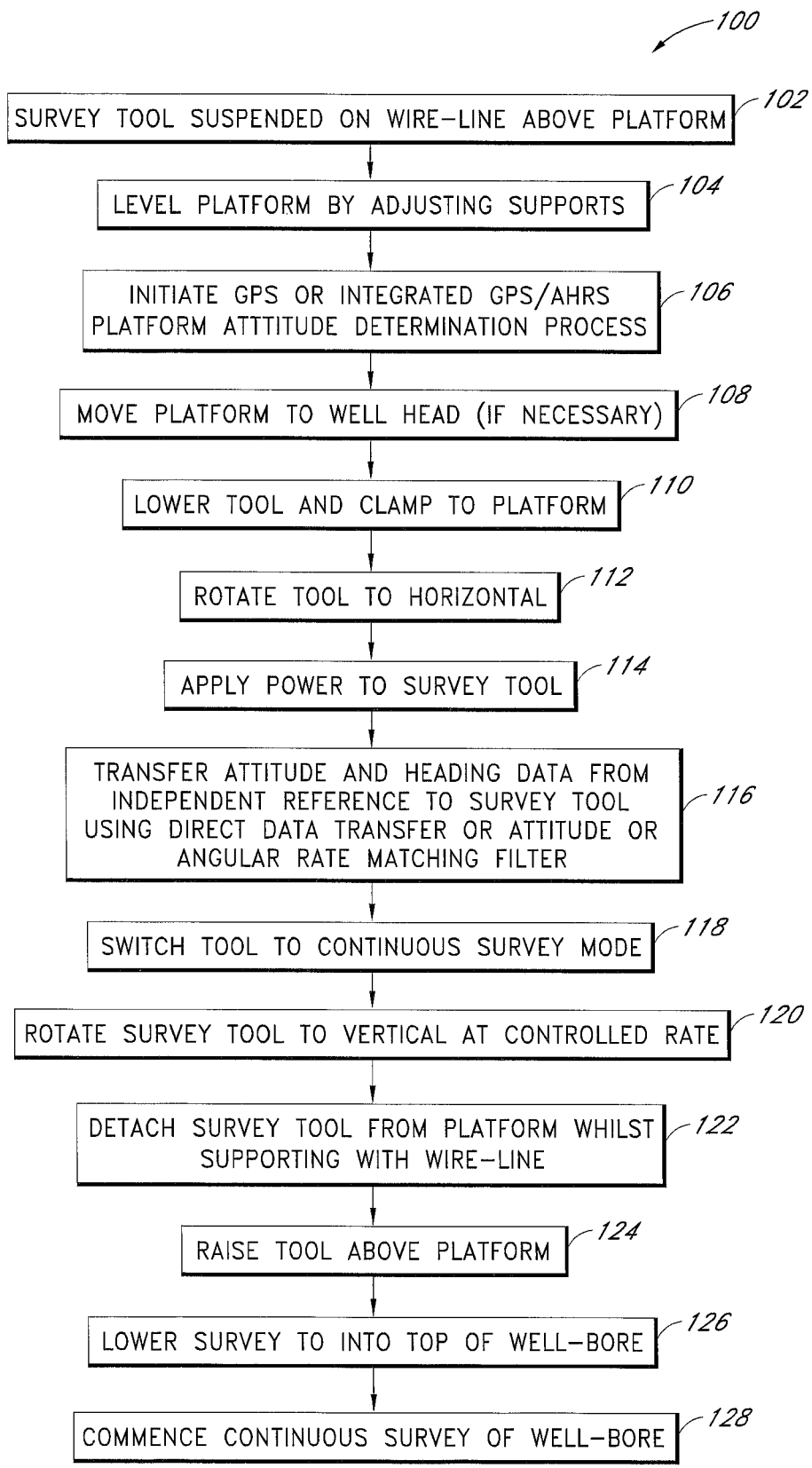
FIG. 8 is a flow diagram illustrating an example wellbore survey tool initialization process in accordance with certain embodiments described herein.

FIG. 8 is a flow diagram illustrating an example wellbore survey tool 30 initialization process 100 in accordance with certain embodiments described herein. While the flow diagram 100 is described herein by reference to the apparatus 10 schematically illustrated by FIGS. 2-6, other apparatus described herein may also be used (e.g., the apparatus 400 of FIG. 11). At operational block 102, the survey tool 30 can be suspended above the base portion of the apparatus 10, such as by a wire-line, for example. The apparatus 10 may then be leveled at operational block 104 by adjusting one or more of the at least one levelers 48 (e.g., an adjustable support), for example.

At operational block 106, the directional reference system 16 (e.g., GPS receiver, integrated GPS/AHRS) and/or inertial navigation system 42 may be initiated and may generate one or more signals indicative of the orientation (e.g., the attitude, azimuth, and/or heading) of the apparatus 10. At operational block 108, the apparatus 10 may be moved to the well head of the wellbore. This movement of the apparatus 10 may be performed in situations where the apparatus 10 has initially been positioned away from the wellbore, to avoid interference from a derrick, for example. The survey tool 30 may be lowered and attached to the apparatus 10 (e.g., clamped to the second mounting portion 20) at operational block 110. The survey tool 30 may be rotated to the horizontal (e.g., with respect to the base portion 12 of the apparatus 10) at operational block 112 and power may be supplied to the survey tool 30 at operational block 114.

At operational block 116, the orientation (e.g., attitude, azimuth, and/or heading) data from the directional reference system 16, inertial navigation system 42, or both, may be transferred to the survey tool 30. In some embodiments, an angular rate matching process (e.g., using an angular rate matching filter) as described below is employed. The tool may be switched to continuous survey mode at operational block 118, and moved (e.g., rotated using the tool positioning element 56) to vertical (e.g., with respect to the apparatus 10) at a controlled rate at operational block 120. The survey tool 30 can be detached from the apparatus 10 while still being supported (e.g., by a wire-line) at operational block 122 and raised above the apparatus 10 at operational block 124. The survey tool 30 may be lowered into the top of the wellbore at operational block 126 and continuous surveying may be enabled at operational block 128.

Figure 9:
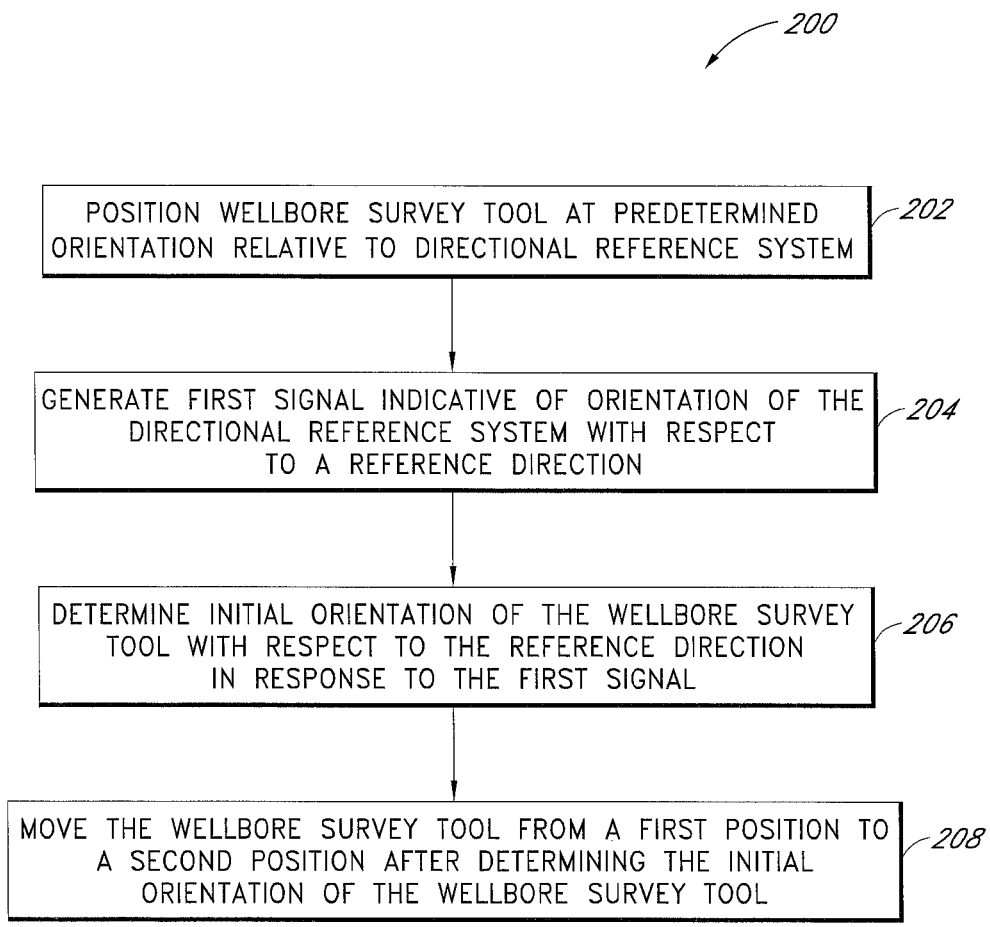
FIG. 9 is a flowchart of an example method of initializing a wellbore survey tool in accordance with certain embodiments described herein.

FIG. 9 is a flowchart of an example method 200 of initializing a wellbore survey tool 30 in accordance with certain embodiments described herein. At operational block 202, the method 200 includes positioning a wellbore survey tool 30 at a predetermined orientation relative to a directional reference system 16. For example, the wellbore survey tool 30 may be positioned substantially parallel to the directional reference system 16 in certain embodiments. While the method 200 is described herein by reference to the apparatus 10 described with respect to FIGS. 2-7, other apparatus described herein may be used (e.g., the apparatus 400 of FIG. 11).

At operational block 204, the method 200 of certain embodiments further comprises generating a first signal indicative of an orientation of the directional reference system 16 with respect to a reference direction 18. For example, the first signal may be generated by the directional reference system 16, and the reference direction may be north. The method 200 may further comprise determining an initial orientation of the wellbore survey tool 30 with respect to the reference direction 18 in response to the first signal at operational block 206. For example, a computing system 52 of the apparatus 10 may receive the first signal from the directional reference system 16 and determine the orientation of the directional reference system 16 with respect to the reference direction 18 in response to the first signal. In certain embodiments, because the wellbore survey tool 30 is positioned at a predetermined orientation (e.g., parallel) relative to the directional reference system 16, the computing system 52 can also determine the initial orientation of the survey tool 30 with respect to the reference direction 18.

At operational block 208, the method 200 further comprises moving the wellbore survey tool 30 from a first position to a second position after determining the initial orientation of the wellbore survey tool 30. For example, the wellbore survey tool 30 may be substantially horizontal with respect to the Earth when in the first position and the wellbore survey tool 30 may be substantially vertical with respect to the Earth when in the second position. The tool positioning element 56, (e.g., a motorized system) can be used to controllably move the survey tool from the first position to the second position, as described herein.

In some embodiments, the method 200 may further comprise moving the wellbore survey tool 30 from a first location 32 to a second location 34 (FIG. 3) after generating the first signal. The first location 32 may be farther from the wellbore than the second location 34. As described herein, the directional reference system 16 may be able to accurately determine the orientation of the directional reference system 16 with respect to the reference direction 18 at the first location 32. For example, the directional reference system 16 may comprise a signal receiver of a satellite navigation system which can communicate with satellites of the satellite navigation system free from shielding or other interference from the derrick 31 at the first location 32, but not at the second location 34. The wellbore survey tool 30 may have a first orientation with respect to the reference direction 18 when at the first location 32 and a second orientation with respect to the reference direction 18 when at the second location 34. For example, the orientation of the apparatus 10, and thus of the directional reference system 16 and the survey tool 30 coupled to the apparatus 10, may change in angle with respect to the reference direction 18 as the apparatus 10 moves from the first location 32 to the second location 34.

The method 200 may further comprise generating a second signal indicative of a change in orientation between the first orientation and the second orientation. For example, the computing system 52 may receive the second signal from the inertial navigation system 42. In certain embodiments, the determining the initial orientation in the operational block 206 comprises determining the initial orientation of the wellbore survey tool 30 with respect to the reference direction 18 in response to the first signal and in response to the second signal. For example, the computing system 52 may determine the first orientation of the directional reference system 16 and thus the survey tool 30 at the first location in response to the first signal. The computing system 52 may then determine the change in orientation of the survey tool between the first orientation and the second orientation in response to the second signal. The computing system 52 may further process the first and second signals (e.g., add the change in orientation to the initial orientation) to determine the initial orientation of the survey tool 30 at the second location.

C. Example Attitude Computation in the Survey Tool

In certain circumstances, the initial orientation data (e.g., reference attitude data determined in accordance with embodiments described herein) form the initial conditions for the gyro measurement integration process which can keep track of survey tool 30 attitude while a continuous survey mode of operation is maintained. During continuous periods of operation (e.g., during continuous survey mode), the survey tool 30 may keep track of attitude (tool face, inclination and azimuth) using the integrated outputs of the gyroscopes. Tracking of the attitude may involve solving the following equations to provide estimates of tool-face ($\alpha$), inclination (I) and azimuth (A) angles:

$$\alpha = \alpha_0 + \int \dot{\alpha} dt; \quad \text{(Eq. 2)}$$

$$I = I_0 + \int \dot{I} dt; \text{ and} \quad \text{(Eq. 3)}$$

$$A = A_0 + \int \dot{A} dt, \quad \text{(Eq. 4)}$$

where $\alpha_0$, $I_0$ and $A_0$ are the initial values of tool face, inclination and azimuth, and $\dot{\alpha}$, $\dot{I}$ and $\dot{A}$ are the estimated rates of change of $\alpha$, I and A which may be expressed as function of the gyro measurements (denoted $G_x$, $G_y$ and $G_z$) as follows:

$$\dot{\alpha} = G_z + (G_x \sin \alpha + G_y \cos \alpha)\cot I - \frac{\Omega_H \cos A}{\sin I}; \quad \text{(Eq. 5)}$$

$$\dot{I} = -G_x \cos \alpha + G_y \sin \alpha + \Omega_H \sin A; \text{ and} \quad \text{(Eq. 6)}$$

$$\dot{A} = -\frac{(G_x \sin \alpha + G_y \cos \alpha)}{\sin I} + \Omega_H \cos A \cot I - \Omega_V. \quad \text{(Eq. 7)}$$

where $\Omega_H$ and $\Omega_V$ represent the horizontal and vertical components of Earth's rate. The initial value of the azimuth angle can be derived directly from the GPS attitude estimation process. An initial value of inclination may also be derived using the GPS measurements, or using survey tool 30 accelerometer measurements ($A_x$, $A_y$, and $A_z$) and the following equation:

$$I_0 = \arctan\left[\frac{\sqrt{A_x^2 + A_y^2}}{A_z}\right]. \quad \text{(Eq. 8)}$$

The initial value of inclination may also be determined using a combination of both satellite and accelerometer estimates. Tool-face angle is initialized using accelerometer measurements as follows:

$$\alpha_0 = \arctan\left[\frac{-A_x}{-A_y}\right].$$

D. Example Alternative Method of Computing Attitude

In accordance with certain embodiments described herein, the use of direction cosines allows the tool orientation to be tracked generally at any attitude, such as when the tool is at or near vertical as occurs during tool pick-up and initial descent in the wellbore. This allows the methods of keeping track of tool-face angle and azimuth discussed in the previous section, which may be relatively imprecise, to be avoided. The use of the quaternion attitude representation can provide an alternative in this situation.

The attitude of an alignment structure (e.g., the directional reference system 16) on the apparatus 10, such as on a platform (P) of the apparatus 10 with respect to the local geographic reference frame (R) (e.g., the reference direction 18), which may be determined from the GPS measurements, may be expressed in term of the direction cosine matrix $C_P^R$. The reference frame R can be generally defined by the directions of true north and the local vertical. In certain other configurations, other Earth fixed reference frames may be used. The platform (P) may comprise or form a part of the base portion 12, for example. Given knowledge of the mounting orientation of the survey tool (T) 30 with respect to the alignment structure (e.g., the directional reference system 16), which may also be expressed as a direction cosine matrix, $C_T^P$, the attitude of the survey tool 30 with respect to the geographic reference frame (R) is given by the product of these matrices, as follows:

$$C_T^R = C_P^R \cdot C_T^P \quad \text{(Eq. 9)}$$

After switching to continuous survey mode, the survey tool 30 can keep track of tool attitude as it traverses the wellbore by solving the equation below. Expressing $C=C_T^R$ and the initial value derived from the GPS measurements as $C_o$, $$C = C_o + \int \dot{C} \, dt, \quad \text{(Eq. 10)}$$

where $$\dot{C} = C \cdot [w \times] \quad \text{(Eq. 11)}$$

$$\omega = \begin{bmatrix} G_x \\ G_y \\ G_z \end{bmatrix} - C^T \cdot \begin{bmatrix} \Omega_H \\ 0 \\ \Omega_V \end{bmatrix} \quad \text{(Eq. 12)}$$

Attitude information expressed in terms of tool-face, inclination and azimuth may be computed, from the elements of the direction cosine matrix:

$$C = \begin{bmatrix} c_{11} & c_{12} & c_{13} \\ c_{21} & c_{22} & c_{23} \\ c_{31} & c_{32} & c_{33} \end{bmatrix},$$

which may also be expressed as function of these angles as follows:

$$C = \begin{bmatrix} \cos A \cos I \sin \alpha + \sin A \cos \alpha & \cos A \cos I \cos \alpha - \sin A \sin \alpha & \cos A \sin I \\ \sin A \cos I \sin \alpha - \cos A \cos \alpha & \sin A \cos I \cos \alpha + \cos A \sin \alpha & \sin A \sin I \\ -\sin I \sin \alpha & -\sin I \cos \alpha & \cos I \end{bmatrix} \quad \text{(Eq. 13)}$$

In certain embodiments, the tool-face, inclination and azimuth angles may be extracted using the following equations:

$$\alpha = \arctan\left[\frac{-c_{31}}{-c_{32}}\right]; \quad \text{(Eq. 14)}$$

$$I = \arctan\left[\frac{\sqrt{c_{31}^2 + c_{32}^2}}{c_{33}}\right]; \text{ and} \quad \text{(Eq. 15)}$$

$$A = \arctan\left[\frac{c_{23}}{c_{13}}\right]. \quad \text{(Eq. 16)}$$

For example, using the above equation for inclination for the situation where inclination approaches 90°, $c_{33}$ approaches zero and I may become indeterminate. In this case, inclination may be expressed as follows:

$$I = \arccos[c_{33}]. \quad \text{(Eq. 17)}$$

For the situation where I passes through zero, the equations in a and A generally become indeterminate because both the numerator and the denominator approach zero substantially simultaneously. Under such conditions, alternative solutions for a and A can be based upon other elements of the direction cosine matrix. For example, a and A can be determined as follows:

$$c_{11} + c_{22} = \sin(\alpha + A) \cdot (\cos I + 1); \quad \text{(Eq. 18)}$$

$$c_{21} - c_{12} = \cos(\alpha + A) \cdot (\cos I + 1), \quad \text{(Eq. 19)}$$

and the following expression for the sum of azimuth and tool face may be written:

$$\alpha + A = \arctan\left[\frac{c_{11} + c_{22}}{c_{21} - c_{12}}\right]. \quad \text{(Eq. 20)}$$

This quantity corresponds to the so-called gyro tool-face angle that is currently computed while the tool is at or near vertical.

Separate solutions for a and A may not be obtained when I=0 because both generally become measures of angle about parallel axes (about the vertical), i.e. a degree of rotational freedom is lost. Either a or A may be selected arbitrarily to satisfy some other condition while the unspecified angle is chosen to satisfy the above equation. To avoid 'jumps' in the values of a or A between successive calculations when I is in the region of zero, one approach would be to 'freeze' one angle, a for instance, at its current value and to calculate A in accordance with the above equation. At the next iteration, A would be frozen and a determined. The process of updating a or A alone at successive iterations could generally continue until I is no longer close to zero.

E. Example Attitude Matching Filter for the Transfer of Orientation Data (e.g., Attitude and Heading Reference Data) to the Survey Tool In certain embodiments, orientation (e.g., attitude) data extracted from satellite navigation techniques (e.g., using the directional reference system 16) can be combined with inertial system data (e.g., from the inertial navigation system 42). For example, a least-squares or Kalman filtering process can be used determine a relatively accurate estimate (e.g., a best estimate) of survey tool 30 orientation (e.g., attitude) prior to engaging/initializing the continuous survey mode. Data which may be determined while the survey tool 30 is at the surface includes:

(1) satellite based estimates of azimuth and inclination (e.g., using the directional reference system 16);

(2) estimates of inclination and high-side tool-face angle of the survey tool 30 using accelerometers of the survey tool 30;

(3) estimates of azimuth, inclination and tool-face angle of the survey tool 30 using sensors gyroscopes of the survey tool 30;

An example filtering process is provided herein. Embodiments described herein include a Kalman filter formulation that may be used to initialize the continuous survey process while the survey tool 30 is at the surface. In certain embodiments, it may be assumed that the survey tool 30 provides measurement of acceleration along, and turn rate about, the three principal axes of the tool, denoted x, y and z. While continuous estimates of survey tool 30 orientation can be derived from the gyro measurements by a process of integration, it may further be assumed that the accelerometer measurements can provide a separate and independent estimate of survey tool orientation with respect to the local vertical. Further, a satellite attitude determination process (e.g., using the directional reference system 16) provides estimates of survey tool 30 azimuth during this period. Gyro, accelerometer and GPS based attitude estimates can be combined using a Kalman filter as described below. In addition to providing initial estimates of tool orientation (e.g., attitude), the filtering process may also be used to form estimates of any residual gyro biases and mass unbalance.

System Equations

During periods where the survey tool 30 is in continuous mode, the tool keeps track of attitude (e.g., tool face, inclination and azimuth) using the integrated outputs of the gyroscopes. This may be achieved by solving the following equations to provide estimates of tool face (a), inclination (I) and azimuth (A) angles directly. For example, these values may be expressed as follows:

$$\alpha = \alpha_0 + \int \dot{\alpha}\,dt; \quad \text{(eq. 21)}$$

$$I = I_0 + \int \dot{I}\,dt; \text{ and} \quad \text{(eq. 22)}$$

$$A = A_0 + \int \dot{A}\,dt, \quad \text{(eq. 23)}$$

where $\alpha_0$, $I_0$ and $A_0$ are the initial values of tool face, inclination and azimuth (e.g., approximate values derived based on a relatively coarse gyro-compassing procedure available at high latitude, or in the presence of platform rotational motion), and $$\dot{\alpha} = G_z + (G_x \sin\alpha + G_y \cos\alpha)\cot I - \frac{\Omega_H \cos A}{\sin I}; \quad \text{(eq. 24)}$$

$$\dot{I} = -G_x \cos\alpha + G_y \sin\alpha + \Omega_H \sin A; \text{ and} \quad \text{(eq. 25)}$$

$$\dot{A} = -\frac{(G_x \sin\alpha + G_y \cos\alpha)}{\sin I} + \Omega_H \cos A \cot I - \Omega_V, \quad \text{(eq. 26)}$$

where $G_x$, $G_y$, and $G_z$ are measurements of angular rate about the x, y and z axes of the survey tool.

System Error Equations

System error equations may be expressed as follows:

$$\Delta\dot{\alpha} = (G_x \cos\alpha + G_y \sin\alpha)\cot I \cdot \Delta\alpha - \quad \text{(eq. 27)}$$
$$\frac{(G_x \sin\alpha + G_y \cos\alpha)}{\sin^2 I} \cdot \Delta I + \frac{\Omega_H \cos A \cot I}{\sin I} \Delta I +$$
$$\frac{\Omega_H \sin A}{\sin I}\Delta A + \sin\alpha \cot I \cdot \Delta G_x + \cos\alpha \cot I \cdot \Delta G_y + \Delta G_z;$$

$$\Delta\dot{I} = (G_x \sin\alpha + G_y \cos\alpha)\cdot \Delta\alpha + \quad \text{(eq. 28)}$$
$$\Omega_H \cos A \cdot \Delta A - \cos\alpha \cdot \Delta G_x + \sin\alpha \cdot \Delta G_y; \text{ and}$$

$$\Delta\dot{A} = -\frac{(G_x \cos\alpha - G_y \sin\alpha)}{\sin I}\cdot \Delta\alpha + \quad \text{(eq. 29)}$$
$$\frac{(G_x \sin\alpha + G_y \cos\alpha)\cot I}{\sin I}\cdot \Delta I - \frac{\Omega_H \cos A}{\sin^2 I}\cdot \Delta I -$$
$$\Omega_H \sin A \cot I \cdot \Delta A - \frac{\sin\alpha}{\sin I}\cdot \Delta G_x - \frac{\cos\alpha}{\sin I}\cdot \Delta G_y$$

The system error equations may further be expressed in matrix form as:

$$\dot{x} = F \cdot x + G \cdot w, \quad \text{(eq. 30)}$$

where $x = [\Delta\alpha\, \Delta I\, \Delta A\, \Delta G_x\, \Delta G_y\, \Delta G_z]$ (eq. 31)

and represents the system error states, w is a 3 element vector representing the gyro measurement noise, G is the system noise matrix and the error matrix F can be given by:

$$F = \quad \text{(eq. 32)}$$

$$\begin{bmatrix} (G_x\cos\alpha - G_y\sin\alpha)\cot I & -\dfrac{-(G_x\sin\alpha + G_y\cos\alpha)}{\sin^2 I} - \dfrac{\Omega_H \cos A \cos I}{\sin^2 I} & \dfrac{\Omega_H}{\sin I}\sin A & \sin\alpha \cot I & \cos\alpha \cot I & 1 \\ (G_x\sin\alpha + G_y\cos\alpha) & 0 & \dfrac{\Omega_H}{\cos A} & -\cos\alpha & \sin\alpha & 0 \\ -\dfrac{(G_x\cos\alpha - G_y\sin\alpha)}{\sin I} & \dfrac{(G_x\sin\alpha + G_y\cos\alpha)\cot I}{\sin I} - \dfrac{\Omega_H \cos A}{\sin^2 I} & -\Omega_H \sin A \cot I & -\dfrac{\sin\alpha}{\sin I} & -\dfrac{\cos\alpha}{\sin I} & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

Filter Measurement Equations

Three accelerometers in the survey system (e.g., the survey tool 30) can provide independent measurement of tool face and inclination angles, as shown by the following equations:

$$\tilde{\alpha} = \arctan\left(\frac{A_x}{A_y}\right); \text{ and} \quad \text{(eq. 33)}$$

$$\tilde{I} = \arctan\left(\frac{\sqrt{A_x^2 + A_y^2}}{A_z}\right), \quad \text{(eq. 34)}$$

and it can be assumed for the purposes of this example filter formulation that an estimate of survey tool 30 azimuth ($\tilde{A}$) is provided by the satellite attitude determination process (e.g., using the directional reference system 16).

The differences between the two estimates of tool-face, inclination and azimuth can form the measurement difference inputs (z) to a Kalman filter, as follows:

$$z = \begin{bmatrix} \tilde{\alpha} - \alpha \\ \tilde{I} - I \\ \tilde{A} - A \end{bmatrix}. \quad \text{(eq. 35)}$$

The measurement differences (z) may also be expressed in terms of the error states (x) as follows:

$$z = H \cdot x + I \cdot v, \quad \text{(eq. 36)}$$
where $$H = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}, \quad \text{(eq. 37)}$$

v may be a 3 element vector that represents the accelerometer measurement and GPS azimuth measurement noise, and I is a measurement noise matrix.

Kalman Filter Equations
Discrete System and Measurement Equations

While the system may be described mathematically in the continuous differential equation form given above, the measurements are in practice provided at discrete intervals of time. To address with this, and to provide a computationally efficient filtering algorithm, the continuous equations can be expressed in the form of difference equations as shown below:

$$x_{k+1} = \Phi_k \cdot x_k + \Delta_k \cdot w_k; \quad (eq.\ 38)$$

where $\Phi_k = \exp[F \cdot (t_{k+1} - t_k)]$ (eq. 39)

with measurements expressed as:

$$z_{k+1} = H_{k+1} x_{k+1} + v_{k+1}, \quad (eq.\ 40)$$

and where $x_k$ = error state at time $t_k$,
$w_k$ = system noise at time $t_k$,
$\Phi_k$ = state transition matrix from time $t_k$ to time $t_{k+1}$,
$\Delta_k$ = system noise matrix at time $t_k$,
$z_{k+1}$ = measurement difference at time $t_{k+1}$,
$v_{k+1}$ = measurement noise at time $t_{k+1}$, and
$H_{k+1}$ = measurement matrix calculated at time $t_k+1$.

The noise can be zero mean, but now discrete, and can be characterized by the covariance matrices $Q_k$ and $R_k$ respectively.

Prediction Step

A relatively accurate estimate (e.g., a best estimate) of the error state at time $t_k$ is denoted below by $x_{k/k}$. Since the system noise $w_k$ of certain embodiments has zero mean, the best prediction of the state at time $t_k+1$ can be expressed as:

$$x_{k+1/k} = \Phi_k \cdot x_{k/k}, \quad (eq.\ 41)$$

while the expected value of the covariance at time $t_{k+1}$ predicted at time $t_k$, can be given by:

$$P_{k+1/k} = \Phi_k \cdot P_{k/k} \cdot \Phi_k^T + \Delta_k \cdot Q_k \cdot \Delta_k^T. \quad (eq.\ 42)$$

Measurement Update

The arrival of a new set of measurements $Z_{k+1}$ at time $t_{k+1}$ can be used to update the prediction to generate a relatively accurate estimate (e.g., a best estimate) of the state at this time. For example, a relatively accurate (e.g., best) estimate of the state at time $t_{k+1}$ can be expressed as:

$$x_{k+1/k+1} = x_{k+1/k} - K_{k+1}[H_{k+1} x_{k+1/k} - z_{k+1}], \quad (eq.\ 43)$$

and its covariance by:

$$P_{k+1/k+1} = P_{k+1/k} - K_{k+1} H_{k+1} P_{k+1/k}, \quad (eq.\ 44)$$

where the Kalman gain matrix can be given by:

$$K_{k+1} = P_{k+1/k} H_{k+1}^T [H_{k+1} P_{k+1/k} H_{k+1}^T + R_{k+1}]^{-1}. \quad (eq.\ 45)$$

State Correction

Following each measurement update, the states can be corrected using current estimates (e.g., best estimates) of the errors. In this situation, the predicted state errors become zero:

$$x_{k+1/k} = 0. \quad (eq.\ 46)$$

F. Initialization of the Survey Tool on a Moving Surface

In certain circumstances, the apparatus 10 may be positioned on a moving surface. For example, the apparatus 10 may be on an off-shore drilling rig or platform. The continuous survey mode will generally operate properly on the Earth under such conditions, provided some means of initializing the integration process involved, other than gyrocompassing, can be established. For example, given some independent means of keeping track of the substantially instantaneous attitude of a moving platform, and the dynamic transfer of that information to the survey tool to initialize the continuous survey process, the potential exists to remove the survey uncertainties associated with platform motion. It can therefore be beneficial to maintain a dynamic orientation (e.g., reference attitude) on the moving surface (e.g., a rig) which can be initialized at a particular moment. For example, the orientation (e.g., reference attitude or azimuth) of the survey tool 30 with respect to the reference direction 18 can be determined and/or transferred to the survey tool 30 generally immediately before the tool is placed in continuous survey mode (e.g., upon insertion of the survey tool 30 into the wellbore) in accordance with certain embodiments. In certain embodiments, the directional reference system 16 and/or the inertial navigation system 42 may be used to conduct the determination, transfer the information regarding the orientation to the survey tool 30, or both, as described herein (e.g., with respect to FIG. 6).

In some other embodiments, the motion of the drilling rig or platform may be advantageously used to initialize the survey tool 30. For example, an angular rate measurement matching procedure may be used to determine the relative orientation (e.g., attitude and/or azimuth) between two orthogonal sets of axes on the platform structure (e.g., between a set of axes defined by the inertial navigation system 42 and a set of axes defined by the survey tool 30). Such a procedure may account for relative differences between the orientation of the survey tool 30 and the apparatus 10. In general, as described herein, initialization of the survey tool 30 using the apparatus 10 can be achieved accurately where the wellbore survey tool 30 is mounted in some predetermined orientation with respect to the apparatus 10 or components thereof (e.g., the directional reference system 16). Thus, the accuracy of the determination of the orientation of the survey tool 30 may be improved when the alignment of the survey tool 30 (e.g., attitude) with respect to the apparatus 10 is relatively accurate and/or precise. Using the angular rate matching process described herein, residual misalignments between the survey tool 30 and the apparatus 10 may be determined such that actual mounting alignment accuracy of the survey tool 30 on the apparatus 10 becomes less critical.

Examples of a generally similar angular rate matching procedure used to produce precision alignment in attitude and corresponding systems for aligning a weapons system on a sea-borne vessel are described in U.S. Pat. No. 3,803,387, entitled "Alignment Error Detection System," which is hereby incorporated in its entirety by reference herein. By comparing the sets of angular rate measurements (e.g., from the inertial navigation system 42 and the survey tool 30), it is possible to deduce the relative orientation of the two sets of axes (e.g., o the apparatus 10 and the survey tool 30). The orientation of the apparatus 10 (which may be referred to as the platform reference frame) may be defined by the orientation of the inertial navigation system 42, an integrated device 43 (e.g., an integrated GPS/AHRS unit), or the directional reference system 16.

In an offshore drilling or platform, for example, the rocking motion of the rig is generally sufficient to provide angular motion sufficient to allow the attitude determination. Accurate knowledge of the inertial navigation system 42 reference orientation with respect to the geographic reference frame (e.g., the reference direction 18), combined with knowledge of the relative orientation (e.g., attitude and/or azimuth) between the survey tool 30 and the inertial navigation system 42 according to an angular rate matching procedure, can allow for accurate determination of the orientation (e.g., attitude and/or azimuth) of the survey tool 30 with respect to the geographic reference frame (e.g., the reference direction 18). Advantageously, utilizing the angular rate matching procedure, the initial orientation of the survey tool 30 can be accurately obtained in situations where the tool 30 is physically misaligned with respect to the platform reference system (e.g., due to operator error in mounting the tool, misalignment due to imprecision in the manufacturing/assembly of the platform, etc.). In certain embodiments, the directional reference system 16, or an integrated unit comprising a directional reference system 16 and an inertial navigation system 42 (e.g., GPS/INS unit 43), is used instead of or in addition to the inertial navigation system 42 in the angular rate matching procedure.

Figure 10:
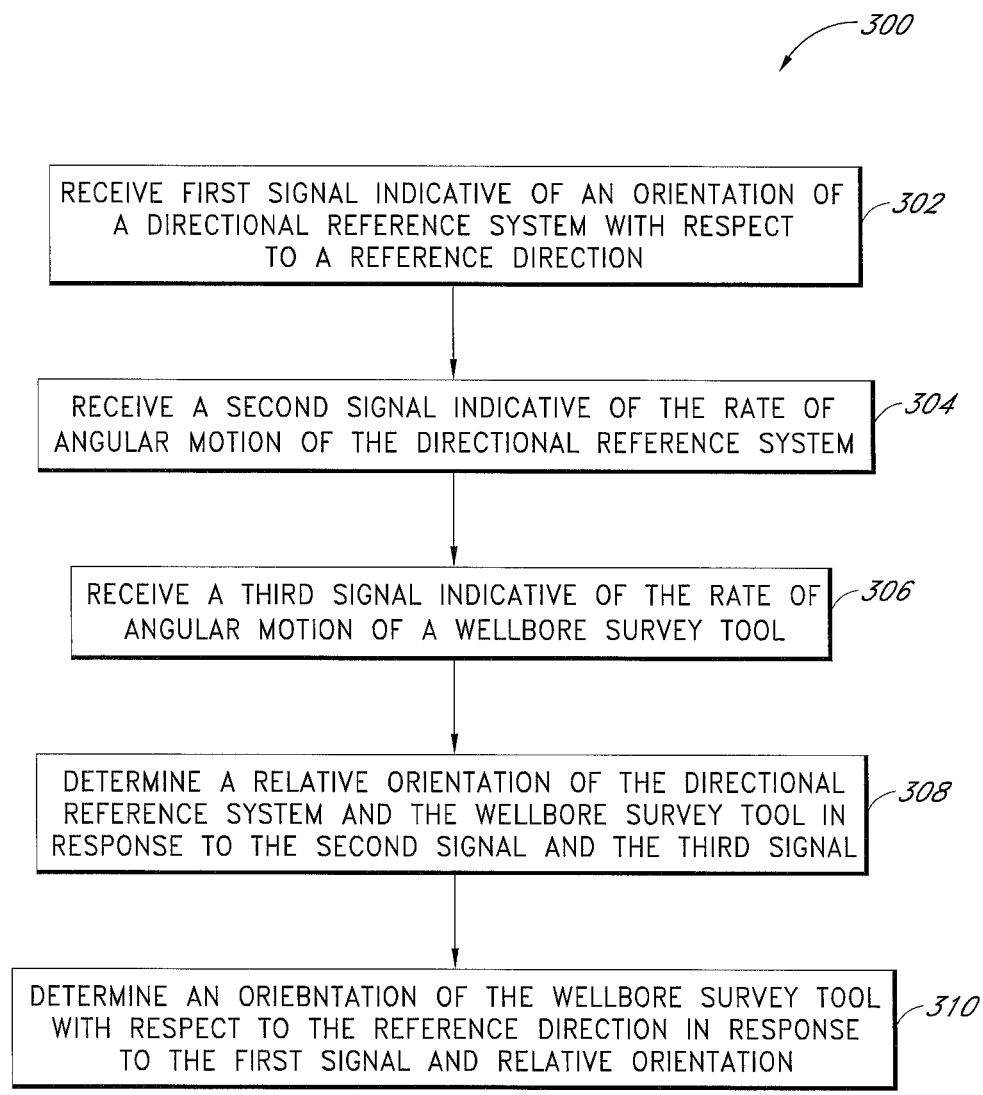
FIG. 10 is a flowchart of an example method of initializing a wellbore survey tool utilizing an angular rate matching procedure in accordance with certain embodiments described herein.

FIG. 10 is a flowchart of an example method 300 of initializing a wellbore survey tool 30 utilizing an angular rate matching procedure. While the method 300 is described herein by reference to the apparatus 10 described with respect to FIGS. 2-8, other apparatus described herein can also be used (e.g., the apparatus 400 of FIG. 10). At operational block 302, the method 300 comprises receiving a first signal indicative of an orientation of a directional reference system 16 with respect to a reference direction 18. For example, the orientation of the directional reference system 16 may be calculated by a processor of the directional reference system 16 in response to signals received by the first antenna 22 and the second antenna 24 as described herein. The first signal may be generated by the directional reference system 16 and transmitted for processing (e.g., to the computing system 52 or directly to the wellbore survey tool 30). In certain embodiments, the method 300 further comprises positioning the wellbore survey tool 30 such that the wellbore survey tool 30 has a predetermined orientation with respect to the directional reference system 16. For example, the wellbore survey tool 30 may be positioned substantially parallel with the directional reference system 16 on the apparatus 10 (e.g., using a tool positioning element as described herein).

The method 300 further comprises receiving a second signal indicative of the rate of angular motion of the directional reference system 16 at operational block 304. For example, in certain embodiments, one or more sensors (e.g., one or more gyroscopes) of the inertial navigation system 42 measure the rate of angular motion of the inertial navigation system 42 and generate the second signal indicative of the same. The inertial navigation system 42 may then transmit the second signal for processing (e.g., to the computing system 52 or directly to the wellbore survey tool 30). In certain other embodiments, the rate of angular motion is measured directly by the directional reference system 16. In one embodiment, apparatus 10 comprises an integrated system, such as the integrated GPS/AHRS unit 43. In such an embodiment, because the directional reference system 16 is integrated with the inertial navigation system 42, the GPS/AHRS unit 43 generates the second signal.

At operational block 306, the method 300 comprises receiving a third signal indicative of the rate of angular motion of a wellbore survey tool 30. For example, one or more sensors of the survey tool 30 (e.g., one or more gyroscopes) may measure the rate of angular motion of the survey tool 30 and generate the third signal. The third signal may then be transmitted for processing (e.g., to the computing system 52 or directly to the wellbore survey tool 30).

The method 300 can further comprise determining a relative orientation of the directional reference system 16 and the wellbore survey tool 30 in response to the second signal and the third signal at operational block 308. For example, the relative orientation can be determined using an angular rate matching procedure described herein. At operational block 310, the method 300 of certain embodiments comprises determining an orientation of the wellbore survey tool 30 with respect to the reference direction 18 in response to the first signal and the relative orientation. Given the orientation of the directional reference system 16 with respect to the reference direction 18, as indicated by the first signal, and given the relative orientation of the survey tool 30 to the directional reference system 16, as indicated by the angular rate matching procedure, such a determination can be made.

In certain embodiments, the second signal may be indicative of the rate of angular motion of the inertial navigation system 42, or of generally the entire apparatus 10 or components thereof (e.g., the base portion 12), instead of, or in addition to the directional reference system 16. For example, in one embodiment, the second signal is generated by the inertial navigation system 42 and is directly indicative of the orientation of the inertial navigation system 42 with respect to the reference direction 18. For example, the inertial navigation system 42 may be oriented in substantially the same orientation on the apparatus 10 with respect to the survey tool 30 as the directional navigation system 16 is oriented with respect to the survey tool 30 and is therefore at least indirectly indicative of the orientation of the directional reference system 16 with respect to the reference direction 18.

G. Example Angular Rate Matching Filter for the Transfer of Orientation Data (e.g., Attitude and Heading Reference Data) to the Survey Tool on a Moving Platform As described, in some embodiments, the apparatus 10 includes an integrated unit, such as a GPS/AHRS reference system 43 generally including the functionality of both a directional reference system 16 and an inertial navigation system 42. On a moving apparatus 10 (e.g., a moving platform or board), the azimuth difference between the survey tool 30) GPS/AHRS reference system 43 and the survey tool 30 may be determined by comparing angular rate measurements provided by the two systems, provided that the drilling rig exhibits some rocking motion. For example, the measurements may be processed using a Kalman filter based on an error model of an inertial system in the survey tool 30. One form of the measurement equation is expressed below. In certain other embodiments, as described herein, separate directional reference system 16 and inertial navigation system 42 are used. Such embodiments are also compatible with the example described herein. For example, in one embodiment, the directional reference system 16 and the inertial navigation system 42 comprise separate units but are substantially aligned with respect to each other on the apparatus 10.

The measurements of turn rate provided by the GPS/AHRS reference system 43 and survey tool 30 system can be assumed to be generated in local co-ordinate frames denoted a and b respectively. In certain embodiments, the rates sensed by a triad of strap-down gyroscopes mounted at each location with their sensitive axes aligned with these reference frames may be expressed as $\omega^a$ and $\omega^b$. The measurements provided by the gyroscopes in the reference and aligning systems are resolved into a common reference frame, the a-frame for example, before comparison takes place.

Hence, the reference measurements may be expressed as:

$$z = \omega^a, \quad \text{(eq. 47)}$$

assuming the errors in the measurements are negligible. The estimates of these measurements generated by the survey tool 30 system are denoted by the $\hat{\ }$ notation.

$$\hat{z} = \hat{C}_b^a \hat{\omega}^b. \quad \text{(eq. 48)}$$

The gyroscope outputs ($\hat{\omega}^b$) may be written as the sum of the true rate ($\omega^b$) and the error in the measurement ($\delta\omega^b$) while the estimated direction cosine matrix may be expressed as the product of a skew symmetric error matrix, $[I-\varphi\times]$, and the true matrix $C_b$ as follows:

$$\hat{z} = [I-\varphi\times]C_b^a[\psi^b + \delta\omega^b]. \quad \text{(eq. 49)}$$

Expanding the right hand side of this equation and ignoring error product terms gives:

$$\hat{z} = C_b^a \omega^b - \varphi \times C_b^a \omega^b + C_b^a \delta\omega^b. \quad \text{(eq. 50)}$$

The measurement differences may then be written as:

$$\begin{aligned} \delta z &= z - \hat{z} \\ &= -[C_b^a \omega^b] \times \varphi - C_b^a \delta\omega^b \end{aligned} \quad \text{(eq. 51)}$$

The measurement differences ($\delta z_k$) at time $t_k$ may be expressed in terms of the error states ($\delta x_k$) as follows:

$$\delta z_k = H_k \delta x_k + v_k, \quad \text{(eq. 52)}$$

where $H_k$ is the Kalman filter measurement matrix which can be expressed as follows:

$$H_k = \begin{bmatrix} 0 & \omega_z & -\omega_y & c_{11} & c_{12} & c_{13} \\ -\omega_z & 0 & \omega_x & c_{21} & c_{22} & c_{23} \\ \omega_y & -\omega_x & 0 & c_{31} & c_{32} & c_{33} \end{bmatrix}, \quad \text{(eq. 53)}$$

where $\omega_x$, $\omega_y$, and $\omega_z$ are the components of the vector $C_b^a \omega^b$, $c_{11}$, $c_{12}$, ... etc. are the elements of direction cosine matrix $C_b^a$ and $v_k$ is the measurement noise vector. This represents the noise on the measurements and model-mismatch introduced through any flexure of the platform structure that may be present.

A Kalman filter may be constructed using the measurement equation and a system equation of the form described above in relation to the attitude matching filter. The filter provides estimates of the relative orientation of the platform reference (e.g., the GPS/AHRS reference system 43) and the survey tool 30.

H. Alternative Embodiments

Figure 11:
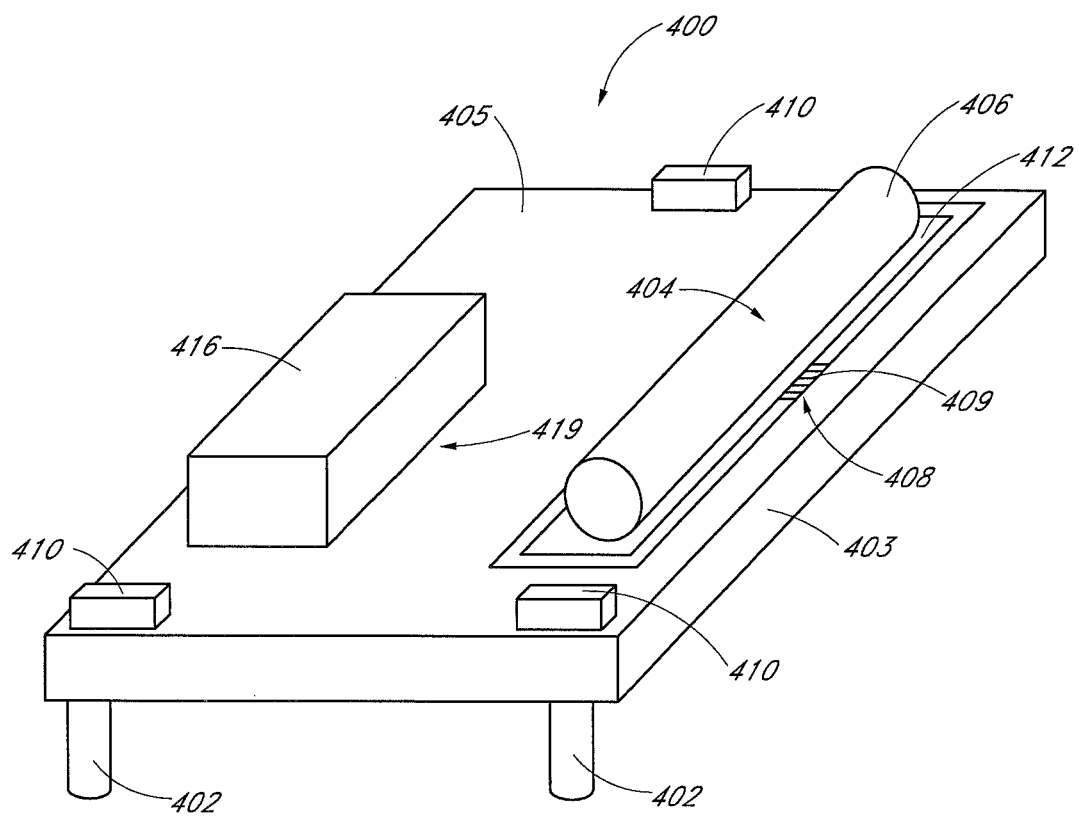
FIG. 11 schematically illustrates an example apparatus for moving a wellbore survey tool in accordance with certain embodiments described herein.

FIG. 11 schematically illustrates an example apparatus 400 for moving a wellbore survey tool. The apparatus 400 of FIG. 11 is configured to transport the survey tool 30 along a surface beneath the apparatus 400. In certain embodiments, the apparatus 400 is configured to be mechanically coupled to at least one directional reference system 416 (e.g., on the apparatus 400 itself or on a platform configured to be removably coupled to the apparatus 400). In this way, certain embodiments advantageously decouple the transportation functionality from the orientation-determination functionality.

The apparatus 400 of certain embodiments comprises at least one support 402 and a base portion 403 mechanically coupled to the at least one support 402. The apparatus 400 can further comprise a tool receiving portion 404 mechanically coupled to the base portion 403 and configured to receive a wellbore survey tool 406. The apparatus 400 may also comprise at least one member movably coupled to a portion of the apparatus 400 and configured to allow the apparatus to move along a surface beneath the apparatus 400. The apparatus 400 can further comprise a tool positioning element 408 configured to controllably move the wellbore survey tool 406 between a first position relative to the apparatus and a second position relative to the apparatus 400.

As shown in FIG. 11, the base portion 403 may comprise a substantially rigid, generally rectangular platform structure including a generally planar surface 405. In other embodiments, the base portion 12 may have a different shape (e.g., circular, ovular, trapezoidal, etc.), may be somewhat flexible, and/or may include one or more inclined surfaces, declined surfaces, stepped portions, etc. The base portion 403 may be similar to the base portion 12 of the apparatus 10 described above (e.g., with respect to FIG. 2 and FIG. 4), for example.

The at least one support 402 may comprise one or more posts. The apparatus 400 of FIG. 11 comprises three supports 402. In other embodiments, there may be more or less supports 402 and/or the supports 402 may be shaped differently (e.g., as rectangular posts, blocks, hemispherical protrusions, etc.). In various embodiments, the at least one support may be similar to the at least one leveler 48 of the apparatus 10 described above (e.g., with respect to FIG. 4).

The tool receiving portion 404 of certain embodiments comprises an area of the base portion 403 on which the well survey tool 406 is mounted. In various embodiments, the survey tool 406 can be releasably secured to the tool receiving portion 404. In certain embodiments, the tool receiving portion 403 is similar to the second mounting portion 20 of the apparatus 10 described above (e.g., with respect to FIG. 2).

The surface beneath the apparatus 400 may be the Earth's surface, a rig surface, etc. In certain embodiments, the at least one member comprises a wheel, tread, ski, or other mechanism configured to allow for movement of the apparatus 400 along the surface. In some embodiments, for example, the at least one member of the apparatus 400 is similar to the at least one member of the apparatus 10 described above (e.g., with respect to FIG. 4).

The tool positioning element 408 can be configured to controllably move the wellbore survey tool 406 between a first position relative to the apparatus 400 and a second position relative to the apparatus 400. In certain embodiments, the first position is horizontal with respect to the base portion 403 and the second position is vertical with respect to the base portion 403. The tool positioning element 408 may be similar to the tool positioning element 56 of the apparatus 10 described above (e.g., with respect to FIGS. 6A-6C) in certain embodiments.

The apparatus 400 may further comprise a mounting portion 414 mechanically coupled to the base portion 403 and configured to receive at least one directional reference system 416. The at least one directional reference system 416 can be configured to provide data (e.g., attitude or azimuth) indicative of an orientation of the at least one directional reference system 416 with respect to a reference direction. In certain embodiments, the mounting portion 414 is similar to the first mounting portion 14 of the apparatus 10 described above (e.g., with respect to FIG. 2).

The directional reference system 416 may be similar to the directional reference system 16 described above (e.g., with respect to FIG. 2). For example, the at least one directional reference system 416 comprises at least one signal receiver of a global positioning system (GPS). For example, the directional reference system 16 may comprise a first antenna 418 and a second antenna 420 spaced apart from the first antenna and defining a line 422 from the first antenna 418 to the second antenna 420. In certain embodiments, the at least one signal receiver further comprises a processor (not shown) configured to receive signals from the first and second antennae 418, 420 and to determine an orientation of the line 422 (e.g., attitude or azimuth) with respect to the reference direction 424.

In certain embodiments, the tool receiving portion 408 is configured to receive the wellbore survey tool 406 such that the wellbore survey tool 406 has a predetermined orientation with respect to the at least one directional reference system 416. This general configuration may be similar the one described above (e.g., with respect to FIG. 2) for the apparatus 10, the wellbore survey tool 30, and the directional reference system 16, for example. In addition, the survey tool 406 of certain embodiments may be similar to the survey tool 30 described above (e.g., with respect to FIG. 2).

The apparatus 400 of certain embodiments may further include one or more of components described herein, such as an inertial navigation system and/or computing system similar to the inertial navigation system 42 and computing system 52 of the apparatus 10 described above (e.g., with respect to FIG. 4).

I. Remote Reference Source

Certain embodiments described above include methods and apparatus for initializing a wellbore survey system using an external directional reference system such as a satellite navigation system (GPS/GLONASS). One of the methods described generally involves mounting both the satellite reference system (e.g., comprising 2 or more antennae, receivers and processor) and the survey tool on a stable platform in a known orientation with respect to one another and transferring attitude data from the reference system to the tool. Thereafter, the tool is switched to a continuous survey mode allowing its orientation to be tracked during pick-up of the tool and positioning at the entrance to the well, and throughout the subsequent survey of the well.

In certain cases, screening of the GPS antennae may occur (e.g., by the derrick or other objects). Thus, it can be advantageous to mount the GPS well away from the derrick and so have a sufficient number of satellites in view. However, it can also be desirable to mount the survey tool in close proximity to the well head/Kelly bushing (e.g., near to the entrance to the wellbore) so as to avoid having to transport the tool to this location after initialization. Survey errors can propagate throughout the period of tool surface handling—therefore it is often desirable to keep this to a minimum duration. Further, there is a possibility of exceeding the dynamic range of the sensors in the tool, e.g. of saturating the gyroscopes by exceeding maximum allowable input rate. If this occurs, the attitude reference stored in the tool at initialization will be lost and the procedure of aligning the tool to the GPS reference will need to be repeated. Thus, there can be a tension between these two design goals: performing initialization using GPS measurements on the rig and positioning the tool close to the well head/Kelly bushing tool to minimize the surface handling requirement.

To address the competing design goals described above, certain methods described herein involve mounting the GPS equipment and the survey tool remote from one another during the initialization process. For example, the GPS equipment can be mounted well away from the derrick (e.g., in order to maximize the number of satellites in view) and the tool may be located close to the entrance to the well (e.g., in order to minimize or otherwise reduce the movement of the tool prior to running into the well and/or the time taken in any physical transfer of the tool between two locations). In certain embodiments, the initial orientation of the wellbore survey tool is determined with respect to a chosen reference frame (e.g., the local vertical geographic frame expressed as an azimuth angle, an inclination, and a high-side orientation of the wellbore survey tool). In certain embodiments described herein, the directional reference system and the wellbore survey tool are not mechanically coupled to one another and are mounted on respective surfaces that are not mechanically coupled to one another.

Figure 12:
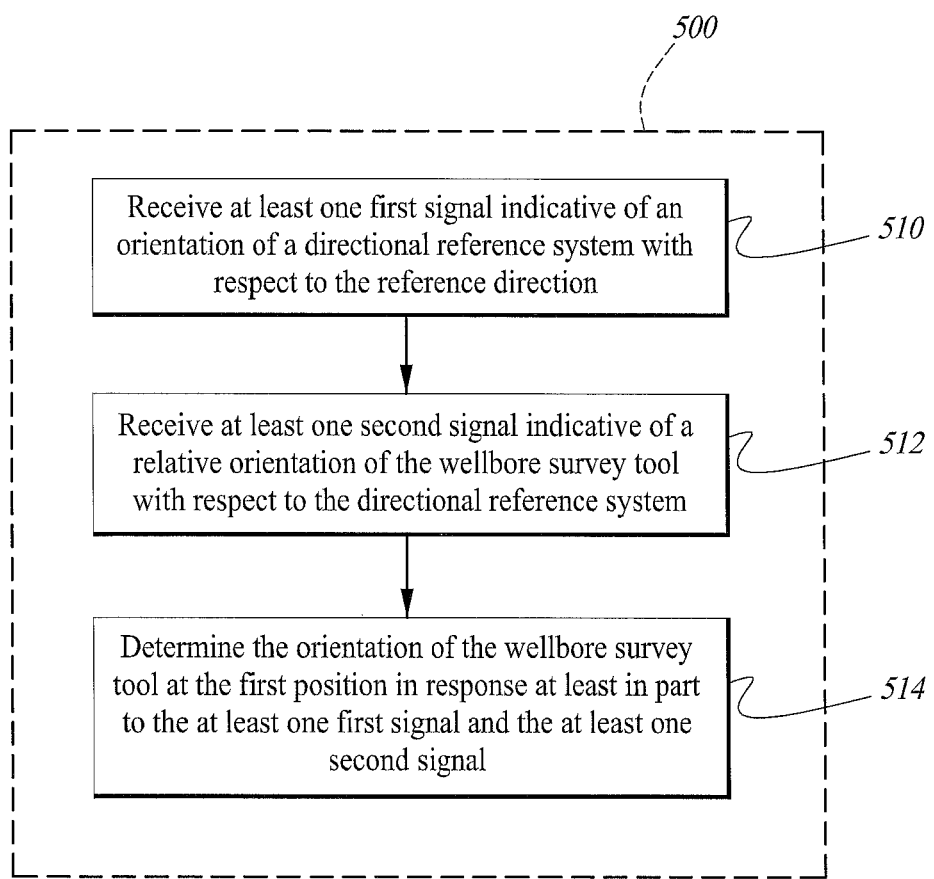
FIG. 12 is a flowchart of an example method for determining an orientation of a wellbore survey tool at a first position with respect to a reference direction in accordance with certain embodiments described herein.

FIG. 12 is a flowchart of an example method 500 for determining an orientation of a wellbore survey tool at a first position with respect to a reference direction in accordance with certain embodiments described herein. In an operational block 510, the method 500 comprises receiving information (e.g., at least one first signal) indicative of an orientation of a directional reference system with respect to the reference direction. The directional reference system is positioned at a second position spaced from the first position. In an operational block 512, the method 500 further comprises receiving information (e.g., at least one second signal) indicative of a relative orientation of the wellbore survey tool with respect to the directional reference system. In an operational block 514, the method 500 further comprises determining the orientation of the wellbore survey tool at the first position in response at least in part to the received information (e.g., the at least one first signal and the at least one second signal).

In certain embodiments, the at least one first signal and the at least one second signal are received by a computer system comprising one or more computer processors (e.g., one or more computer microprocessors). For example, the one or more computer processors can comprise one or more processors of the wellbore survey tool, the directional reference system, or one or more processors that are dedicated to determining the orientation of the wellbore survey tool. Additional information, such as parameter values (e.g., distance between two reference points on the wellbore survey tool, distance between two reference points on the directional reference system, distance between the wellbore survey tool and the directional reference system, and horizontal and vertical components of these distances) that are directly or indirectly representative of one or more dimensions or geometric relationships of or between the wellbore survey tool and the directional reference system (e.g., angle between lines linking reference points and axes of tool and GPS reference directions) may also be used in determining the orientation of the wellbore survey tool, and such parameter values are received by the one or more processors which are used to calculate the orientation of the wellbore survey tool. In certain embodiments, the one or more computer processors comprise one or more inputs to receive data (e.g., information or one or more signals) indicative of (e.g., to be used to compute) the orientation of the directional reference system with respect to the reference direction and indicative of the relative orientation of the wellbore survey tool with respect to the directional reference system.

In certain embodiments, the computer system further comprises a memory subsystem adapted to store information (e.g., one or more signals or parameter values) to be used in the determination of the orientation of the wellbore survey tool. The computer system can comprise hardware, software, or a combination of both hardware and software. In certain embodiments, the computer system comprises a standard personal computer. In certain embodiments, the computer system comprises appropriate interfaces (e.g., modems) to receive and transmit signals as needed. The computer system can comprise standard communication components (e.g., keyboard, mouse, toggle switches) for receiving user input, and can comprise standard communication components (e.g., image display screen, alphanumeric meters, printers) for displaying and/or recording operation parameters, orientation and/or location coordinates, or other information used in determining the orientation or generated as a result of determining the orientation. In certain embodiments, the computer system is configured to read a computer-readable medium (e.g., read-only memory, dynamic random-access memory, flash memory, hard disk drive, compact disk, digital video disk) which has instructions stored thereon which cause the computer system to perform a method for determining an orientation of the wellbore survey tool in accordance with certain embodiments described herein. In certain embodiments, at least one signal of the at least one first signal and the at least one second signal is received from user input, computer memory, or sensors or other components of the system configured to provide signals having the desired information.

Techniques are also described herein for transferring the attitude reference defined by the GPS to a location physically removed from it (e.g., the tool location). In certain embodiments, the wellbore survey tool is at a first position spaced a first distance from the wellbore entrance (e.g., spaced a first distance from the well head/Kelly bushing) and the directional reference system is at a second position spaced a second distance from the wellbore entrance (e.g., spaces a second distance from the well head/Kelly bushing), with the second distance being greater than the first distance. In certain embodiments, the first distance has a first horizontal component that is less than 10 feet, or the second distance has a second horizontal component that is greater than the first horizontal component by at least about 30 feet, or both. In certain embodiments, the first distance has a first vertical component that is less than about 20 feet.

In some cases, the horizontal separation distance between the first position and the second position could be as much as 50 feet, and the two positions could be at different levels on the rig (also up to 50 feet). In other configurations, the horizontal and vertical separation distances can vary. For example, in various configurations, the horizontal and/or vertical separation distances may range from between about 10 and 1000 feet, may be at least 10, 15, 20, 25, 30, 35, 40, 45, 50, 55, 60, 65, 70, 75, 80, 85, 90, 95, 100, 1000 feet, or may be some value greater than 1000 feet. For example, in certain such embodiments, the GPS equipment (or other directional reference system) and the survey tool are separated by a distance beyond a distance for which it is physically easy or straightforward to have the GPS equipment and the survey tool mechanically connected to one another. Moreover, in some cases, the survey tool and the GPS equipment are mounted during the initialization process such that they are not mechanically coupled to one another, are mounted on respective surfaces that are not mechanically coupled to one another, or both.

In certain embodiments, the information (e.g., the at least one first signal) indicative of an orientation of the directional reference system with respect to the reference direction is generated or provided by the directional reference system itself. For example, the directional reference system can generate one or more signals based on the orientation of the directional reference system, and can input the one or more signals to the one or more computer processors.

Furthermore, a number of methods are described herein generate the information (e.g., the at least one second signal) indicative of the relative orientation of the wellbore survey tool with respect to the directional reference system e.g., using either (i) laser/optical sighting between the GPS reference equipment and the tool or (ii) the application of an inertial attitude reference system. In both cases, the survey tool may be mounted vertically, horizontally, or anywhere in between during the attitude initialization process. Provided the tool can be physically located close to the entrance to the well at this time, any need to move the tool over a significant distance following GPS attitude initialization is avoided or reduced and the time for attitude errors to propagate before the start of a wellbore survey is therefore reduced. If the tool can be held close to vertical during this process, the need to rotate the tool before insertion in the well is also avoided or reduced. Therefore, by holding the survey tool vertical close to the wellbore entrance (e.g., the well head/Kelly bushing) throughout the initialization process, attitude errors which would grow and contribute to the overall attitude error at the start of a survey may be kept to a minimum or are otherwise significantly reduced. Techniques are described here which address these issues.

It is desirable to accurately determine, the full attitude of the survey tool, e.g., the azimuth, inclination and high side orientation with respect to the chosen reference frame (the local vertical geographic frame for example). It is therefore desirable for the attitude reference to be capable of defining fully the attitude of the tool for initialization purposes, particularly for operation on a moving offshore platform. It is noted that whilst the inclination and high side angles can be determined very accurately on a stationary platform using the measurements provided by the accelerometers installed in the tool, this approach is less reliable offshore, and may not produce accurate results.

However, for the purposes of illustrating and providing a clear (flat page) visualization of the techniques described below, single plane illustrations are given, and attention is focused on the determination of tool orientation with respect to true north which is used as the tool azimuth angle. In the event that the tool is mounted at, or close to, the local vertical, it is desirable to determine the direction of a lateral axis of the tool (usually the y-axis) with respect to north. The direction of the projection of this lateral axis on the horizontal plane, with respect to north, is commonly referred to as the gyro tool face angle.

It is stressed that some or all of the methods described herein may be adapted and used to define the attitude of the survey tool completely, and made to work irrespective of the orientation of the survey tool. In such cases, the system geometry will become more complex and additional measurements may be taken and used to extract full attitude data.

1. Optical Sighting Procedures

Figure 13:
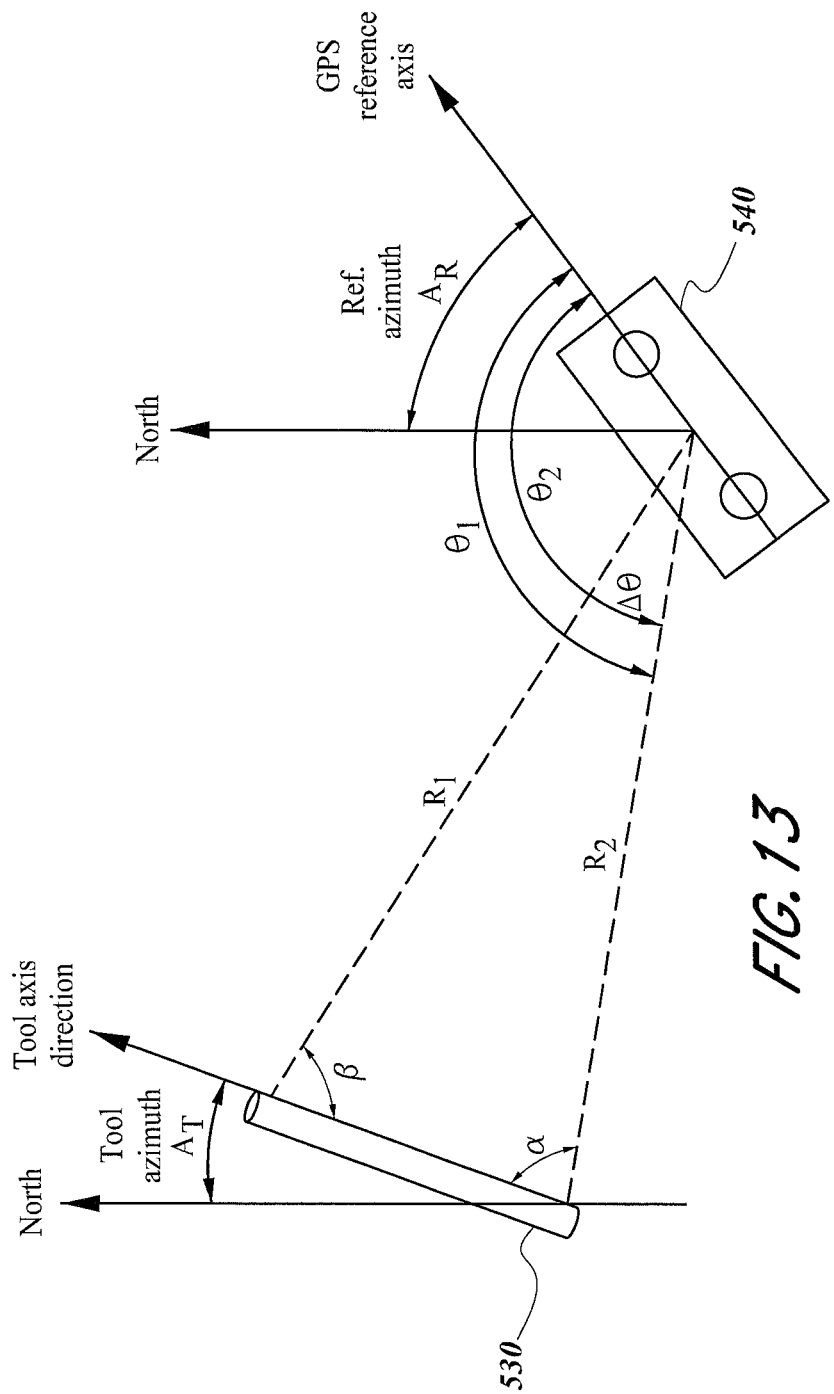
FIG. 13 illustrates an example survey tool initialization configuration including a survey tool and a reference system and also illustrates a corresponding initialization process, according to certain embodiments described herein.

In certain embodiments, one or more optical sighting procedures are used to generate information (e.g., the at least one second signal) indicative of the relative orientation of the wellbore survey tool 530 with respect to the directional reference system 540. FIG. 13 illustrates an example wellbore survey tool/directional reference system arrangement and corresponding initialization process that may be implemented when the survey tool 530 is horizontal. A theodolite and a ranging device (not shown) mounted on the platform containing the satellite antennae provides measurements of the line of sight to two points marked at a known spacing along the tool casing. Together with measurements of the ranges to each of these points, it is possible to define fully the triangle formed by the location of the theodolite and two known points on the casing of the tool 530. Given this information, the direction in which the tool is pointing with respect to north (the tool azimuth) may be calculated using the geometric relationships shown in FIG. 13. For example, the reference azimuth ($A_R$) can be determined using the directional reference system 540 (e.g., satellite reference system), and angles $\theta_1$ and $\theta_2$ and distances $R_1$ and $R_2$ can be measured. Angles $\alpha$ and $\beta$ can be computed, which are functions of measured distances $R_1$ and $R_2$ and the difference $\Delta\theta$ between angles $\theta_1$ and $\theta_2$. The tool azimuth can then be computed using $A_T=A_R-\theta_1-\alpha+180$ or $A_T=A_R-\theta_2+3$.

The accuracy of the process described may be limited by the ability to site on to the appropriate points on the survey tool casing, but may be enhanced by taking multiple measurements at known spacing along the casing. By this method some redundancy is introduced into the measurement data, and the measurements may then be processed using a least squares adjustment.

Whilst the procedure and calculation described in FIG. 13 is valid for the situation where the tool is horizontal, the method can be extended to cases in which the tool is mounted in any orientation with respect to the reference frame. In such cases, both the geometrical arrangement and the calculations used to determine the orientation of the tool become more complex, but are within the capability of persons of ordinary skill in the art using the disclosure herein.

Figure 14:
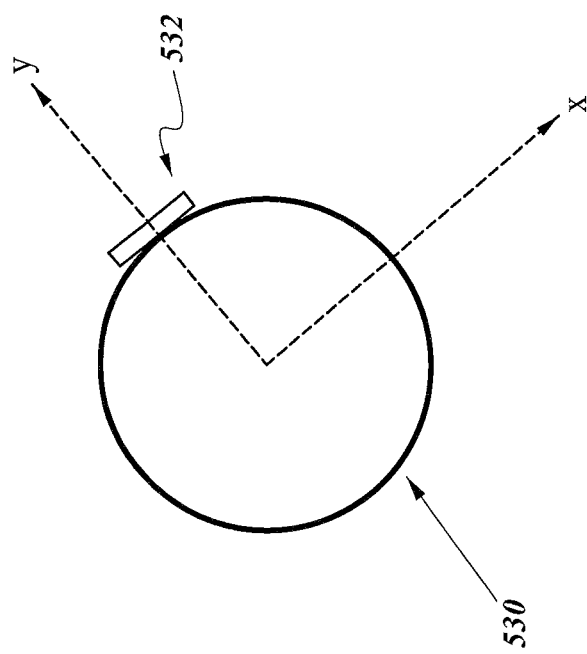
FIG. 14 illustrates an example survey tool mounted vertically and having a mirror attached to the tool, according to certain embodiments described herein.

If the tool were to be mounted vertically, a similar process may be implemented. For example, the orientation of a mirror 532 attached to the tool 530 aligned perpendicular to a known axis (e.g., the y-axis as depicted in FIG. 14) may be determined. The angle measured with respect to a reference direction and the angle of the reference direction with respect to north may then be summed to determine the gyro tool face angle. According to this approach, it is desirable to accurately align and position the mirror 532 with respect to the axes of the survey tool 530. A method of achieving this alignment is described below.

Figure 15:
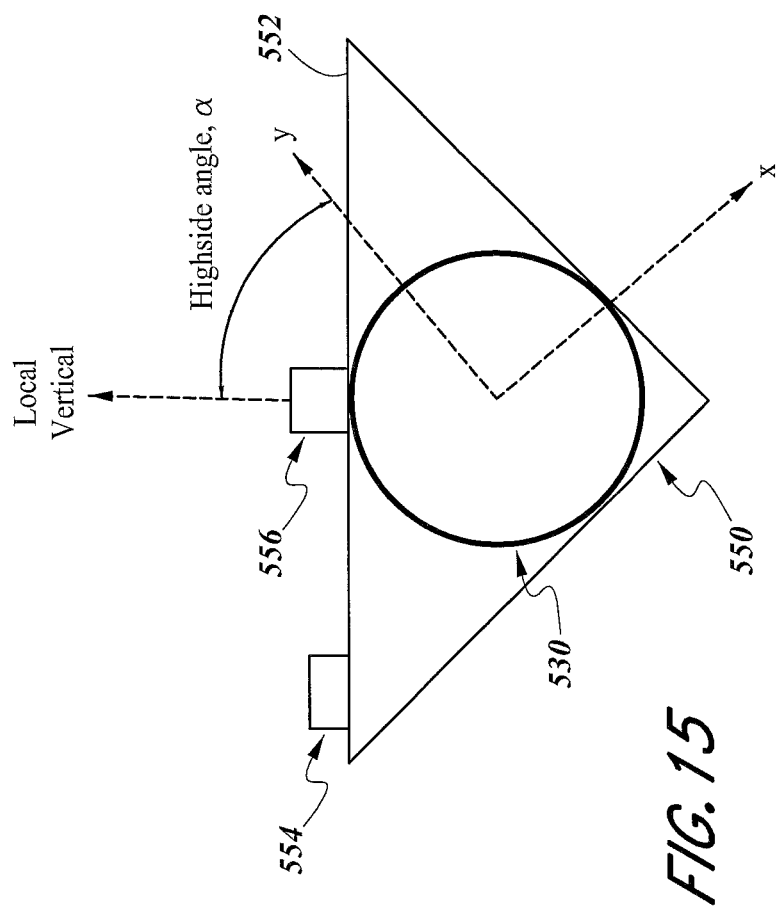
FIG. 15 illustrates an example survey tool mounted horizontally in a v-block mount, according to certain embodiments described herein.

The tool 530 can be mounted horizontally in a v-shaped channel or block mount(s) 550 and a flat bar 552 can be positioned above the tool 530 as shown in FIG. 15. The bar 552 may be leveled accurately using a level sensor 554 attached to the bar 552. A laser 556 can be positioned on the bar 552 with its beam pointing perpendicular to it, e.g., aligned vertically. Using x and y accelerometer measurements, the tool high side angle can be determined, which corresponds to the angle between the y-axis of the tool 530 and the laser beam direction. For example, the tool high side angle $\alpha$ can be expressed using the x accelerometer measurement ($A_x$) and the y accelerometer measurement ($A_y$) as $\alpha=\tan^{-1}(A_x/A_y)$. If the tool 530 is subsequently lifted to the vertical and the direction of the laser beam with respect to true north can be established, the gyro tool face angle can be determined by simply summing the high side angle, measured when the tool 530 was horizontal, and the beam angle.

Thus, in certain embodiments, the tool highside angle is determined while the wellbore survey tool 530 is substantially horizontal (e.g., aligned with the local horizontal using the level sensor), and the wellbore survey tool 530 is then moved to be substantially vertical, and the orientation of the wellbore survey tool 530 at the first position is determined by calculating the gyro tool face angle (e.g., using accelerometer measurements from the wellbore survey tool 530) at least in part based on the determined tool highside angle.

A similar result may be achieved by replacing the laser 556 with a mirror attached to the bar 552 described above. A method of determining the gyro tool face angle is described next with respect to FIGS. 16-18.

According to such a method, the satellite antennae 542 of the directional reference system 540 are mounted on a platform as described previously. Also mounted on this platform can be a laser light source 544 coupled with an optical sight and a mirror 546 which can be both rotated and moved along the axis of the platform as depicted in FIG. 16. A motor driven screw mechanism may be used to achieve linear motion of the mirror 546 along the reference axis 548, and a further motor can be incorporated to rotate the tool 530 to the desired angle. The laser beam can be directed or transmitted along a first line extending between the directional reference system 540 and the centre of the reflecting surface of the mirror 532 attached to the survey tool 530, or at a flat surface machined on the casing of the tool 530. The mirror 532 or flat surface on the casing of the tool 530 is at a predetermined orientation with respect to the tool 530, and reflects the incident light. In certain embodiments, the wellbore survey tool 530 at the first position is mounted substantially vertically with respect to the wellbore entrance. In certain embodiments, the mirror 532 is moved to change the direction the light is reflected by the mirror 532, and since the mirror 532 is mechanically coupled to the wellbore survey tool 530, the mirror 532 and tool 530 maintain their relationship with one another while being moved.

The light reflected by the mirror 532 is transmitted along a second line extending between the mirror 532 and a movable mirror 546 on the reference platform. The movable mirror 546 is positioned to intersect the beam reflected from the tool mounted mirror 532 and subsequently rotated in order to reflect or direct the beam back along the axis 548 of the reference platform. The operator or other entity makes the necessary linear and angular adjustments to this mirror 546 to ensure that the returning beam from the tool mounted mirror 532 is directed at a target point alongside the laser source. In certain embodiments, the light reflected by the mirror 546 propagates along a third line extending between the mirror 546 and a portion of the directional reference system (e.g., the light source 544), such that the first line, the second line, and the third line form a triangle.

Figure 17A:
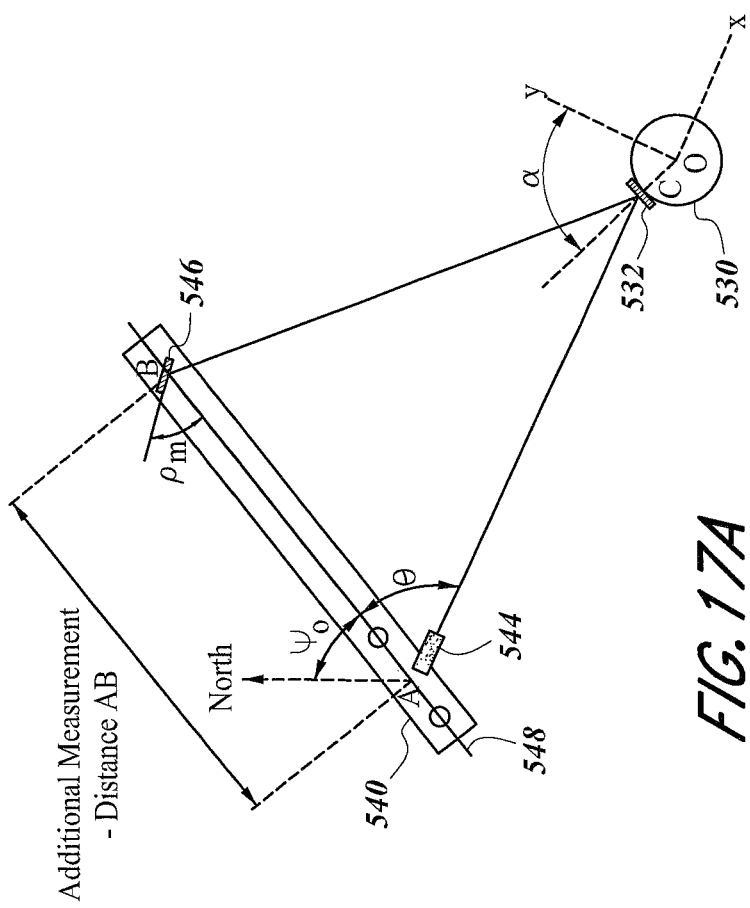
FIGS. 17A and 17B illustrate example initialization configurations in which a reference system is mounted on a platform along with one or more optical sighting instruments and a survey tool, according to certain embodiments described herein.

The resulting triangle (denoted ABC) formed by the light path (A to C to B to A) is shown in FIG. 17A. The geometry of this triangle can be fully defined using the measured angles which are shown in FIG. 17A. Point O denotes the central axis of the survey tool 530, and the lateral axes of the tool Ox and Oy are also shown in FIG. 17A. Other measured angles are the beam angle $\theta$ with respect to the azimuth reference, mirror angle $\rho_m$ with respect to the azimuth reference, and the tool y-axis a with respect to the tool mirror axis (corresponding to the measured highside angle). Given knowledge of the reference azimuth axis AB direction with respect to north (defined by the satellite system and corresponding to the reference azimuth angle $\Psi_o$), the internal angles of the triangle ABC and the orientation of the tool axis Oy with respect to the axis of the mirror 532 attached to the tool 530, the orientation of the tool axis Oy with respect to north (the gyro tool face angle) can be determined.

Figure 17B:
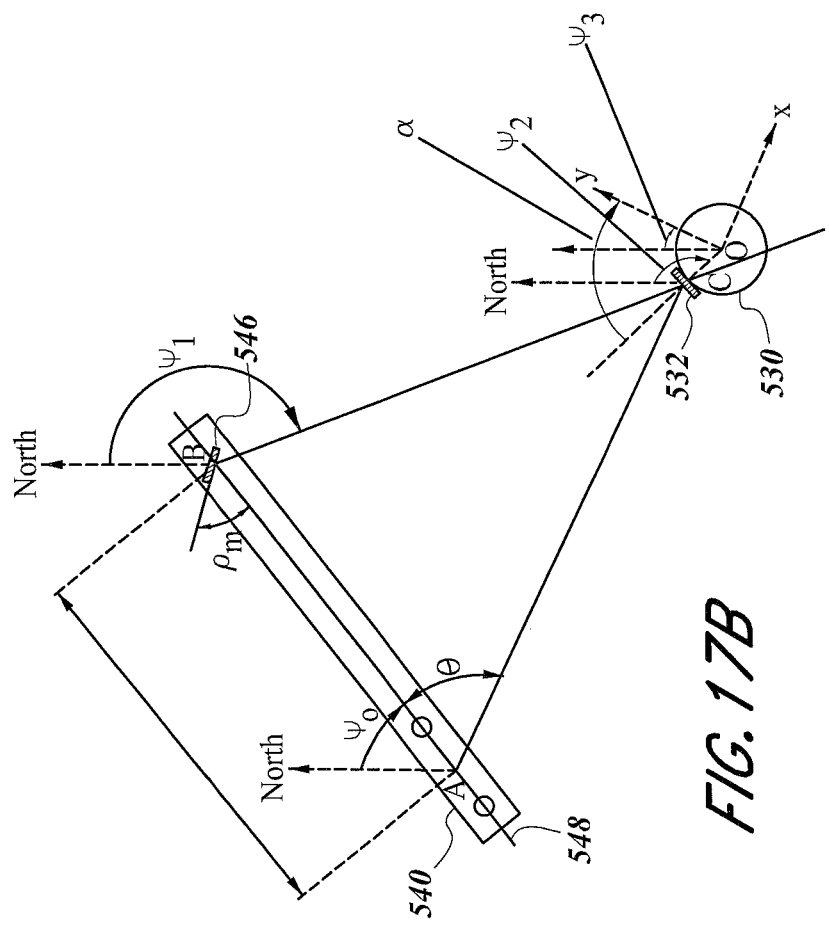

An example sequence of calculations used to establish this angle, using the angles shown in FIG. 17B, is now described. The azimuth reference direction $I_0$ is defined by the directional reference system 540, is the direction of line AB with respect to north. The direction of line BC with respect to north, defined by azimuth reference $\psi_0$ and mirror angle $\rho_m$ is given by $\psi_1=\psi_0+2\rho_m$. The direction of line CO with respect to north, defined by Ti and measured angle $\theta$, is given by $\psi_2=\psi_1+180-\rho_m+\theta/2=\psi_0+180+\rho_m+\theta/2$. The direction of tool axis (Oy) with respect to north (gyro toolface angle), defined by $\psi_2$ and measured highside angle $\alpha$, is given by $\psi_3=\psi_2+\alpha-360=\psi_0+\rho_m+\theta/2+\alpha-180$.

Additional geometric measurements may be provided to aid the process defined in FIG. 17B. For example, the distance between the laser source and the movable mirror (AB) may be measured and used in the computational process to determine tool orientation (shown in FIG. 17A). The availability of additional measurement data such as this may be used to advantage to check the accuracy of the computational process and provide quality control, through a least squares adjustment process for example.

In alternative embodiments and as illustrated in FIG. 18, the gyro tool face angle and/or other parameters can be determined using a mirror 532 attached to the tool 530 (e.g., at the highside point), and an autocollimating head 549 attached to the directional reference system 540 (e.g., a GPS unit or fixture). The autocollimating head 549 and the mirror 532 can then be aligned via a visual sighting, or a light beam, for example. In such an arrangement, it may be desirable that the mirror 532 be locked in the "gyro tool face" plane, but able to be tilted in the inclination plane to allow any differences in height to be accommodated. During the autocollimation process, a beam of light can be sent out through the head 549 and the reflection can be detected coming back onto the eyepiece. In other embodiments, alignment can be determined by detecting that the image of the end of the autocollimating head 549 is in the mirror reflection (e.g., when looking through the eyepiece), indicating that the mirror 532 and head 549 are lined up or substantially lined up with each other.

A further alternative scheme for establishing the instantaneous gyro tool face angle of a survey tool on a moving platform is described next. The following method relies on the accurate surveying of the orientations of two mounting locations on the rig, one for the satellite reference antennae and one for the survey tool, each with respect to a defined platform reference frame. Given that the survey tool is clamped in the defined reference location, and that its orientation relative to the satellite reference system is known to an acceptable level of accuracy, the satellite reference can be transferred to the survey tool and the survey process initiated. In the following description, it is assumed throughout that the rig structure is substantially rigid and that the relative orientations of the mounting locations are therefore substantially unchanging.

The transformations between the various coordinate frames are denoted by direction cosine matrices, viz.

$C_G^R$=coordinate transformation from the local geographic reference (G), defined by the directions of true north, east and the local vertical, and the satellite reference frame (R)—established using the satellite system.

$C_P^R$=coordinate transformation from the platform reference (P) and the satellite reference frame (R)—determined using standard land surveying procedures $C_P^T$=coordinate transformation from the platform reference (P) and the survey tool frame (T)—determined in part using land surveying procedures (orientation of x and y tool axes). The orientation of the tool about its longitudinal (z) axis is more difficult to control, particularly if the oil platform on which the initialization process is taking place is moving. To overcome this concern, the following method can be used.

Figure 19:
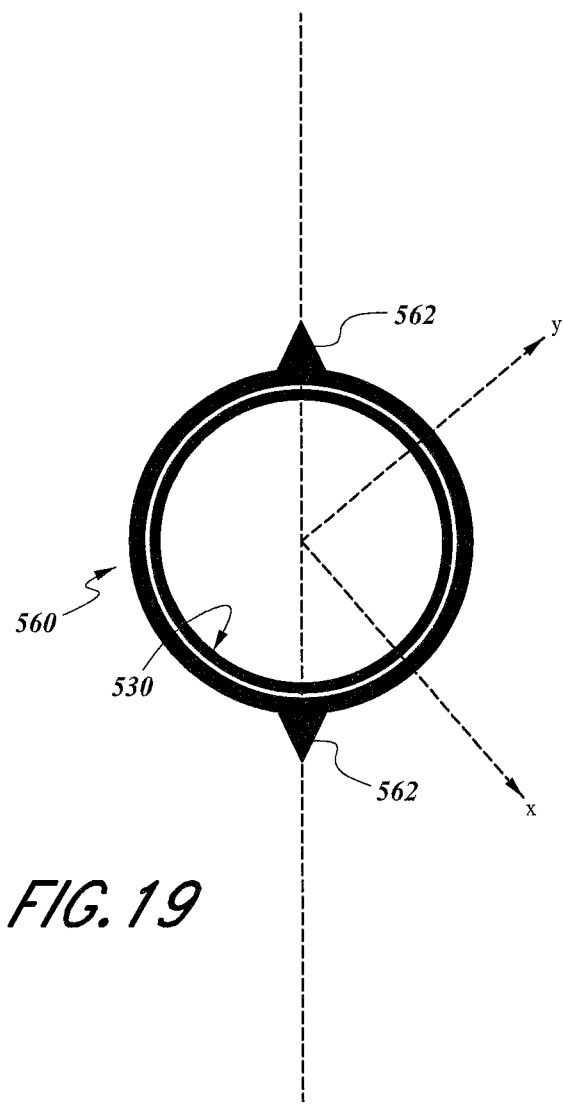
FIG. 19 illustrates an example survey tool initialization configuration in which a sleeve is affixed to a survey tool, according to certain embodiments described herein.
Figure 20:
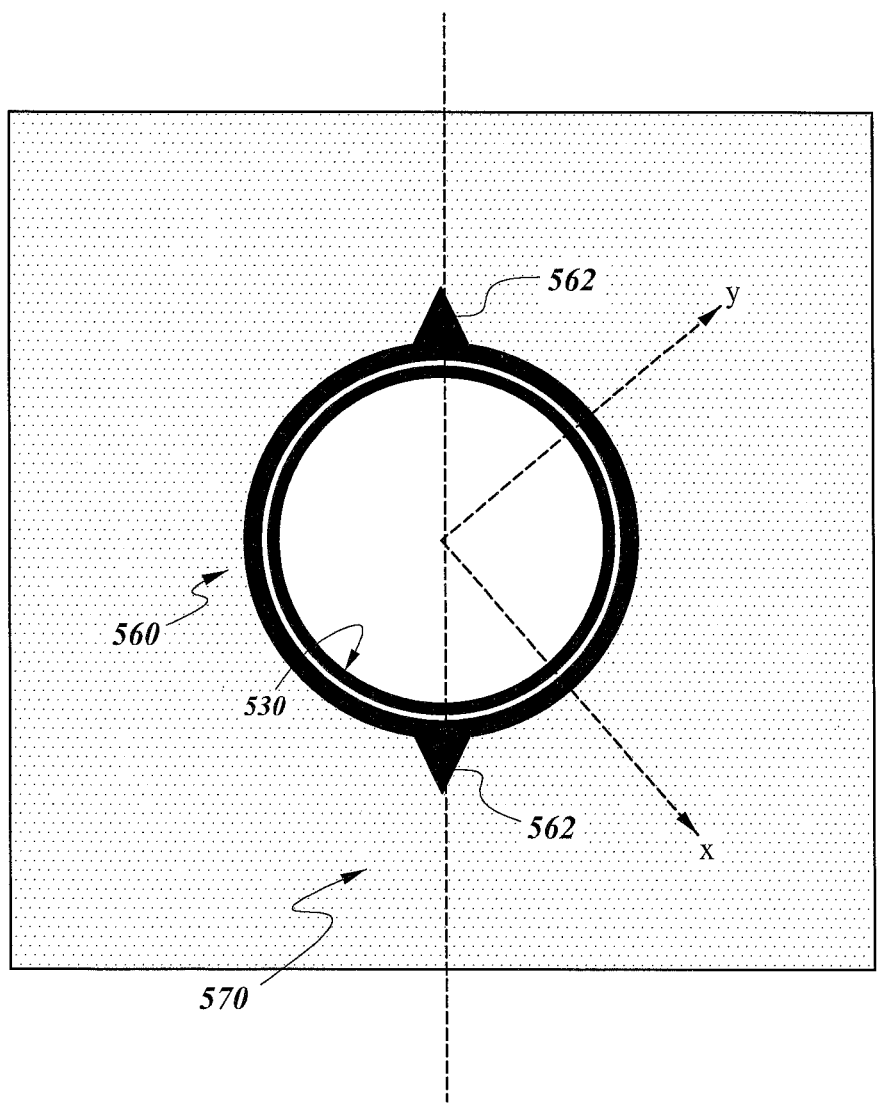
FIG. 20 illustrates another example survey tool initialization configuration in which a sleeve is affixed to a survey tool and the tool/sleeve assembly are keyed into a clamping mechanism, according to certain embodiments described herein.

The high side of the tool 530 can be established to a relatively high degree of accuracy using the tool accelerometer measurements provided that the tool 530 is substantially stationary. Thus, one example method includes determining the tool highside on land (as part of the tool calibration process) and affixing (e.g., clamping) a sleeve 560 to the tool casing with reference structures, e.g., clearly defined protrusions 562, in a known position(s) with respect to the x and y axes of the instrument assembly within the tool—as schematically illustrated in FIG. 19. This sleeve assembly 560 then remains attached to the tool 530 while it is shipped to the offshore platform. The assembly 570 in which the survey tool 530 is to be mounted (e.g., clamped) on the platform can be designed to allow the tool protrusions 562 to key into a corresponding mechanism on the platform to lock the tool 530 in a predetermined orientation about its z-axis, as illustrated in FIG. 20. Thus, in certain embodiments, the wellbore survey tool 530 is mounted at a predetermined orientation with respect to the directional reference system 540 using corresponding keying structures affixed to a mount that is located at the first position.

Other methods of achieving the same or similar result involve the substantially rigid attachment of a cross-over piece to one end of the survey tool, to which a key way can be machined; either a protrusion or an indentation in the cross-over, for example.

The attitude of the survey tool with respect to the geographic frame ($C_G^T$) may then be calculated using the following matrix equation:

$$C_G^T = C_G^R C_R^P C_P^T$$

where $C_R^P$ is equal to the transpose of the matrix $C_P^R$.

One object of this particular scheme is to initialize the survey tool 530 while positioned above the well in the derrick, although the method is generally applicable for any tool orientation; vertical to horizontal on the rig. The tool 530 may be fully made up prior to the start of the initialization process, ready to be inserted into the wellbore, and clamped in position at its two ends (e.g., at the ends of tool section containing the instrument assembly). Land surveying techniques may be used to establish the position of the end supports, thus defining the tool orientation about its lateral (x and y) axes with respect to the platform reference axis set. The sleeve assembly 560 attached to the casing of the tool prior to shipment offshore and the clamping assembly 570 on the rig can be used to define the tool orientation about the z-axis.

Figure 21:
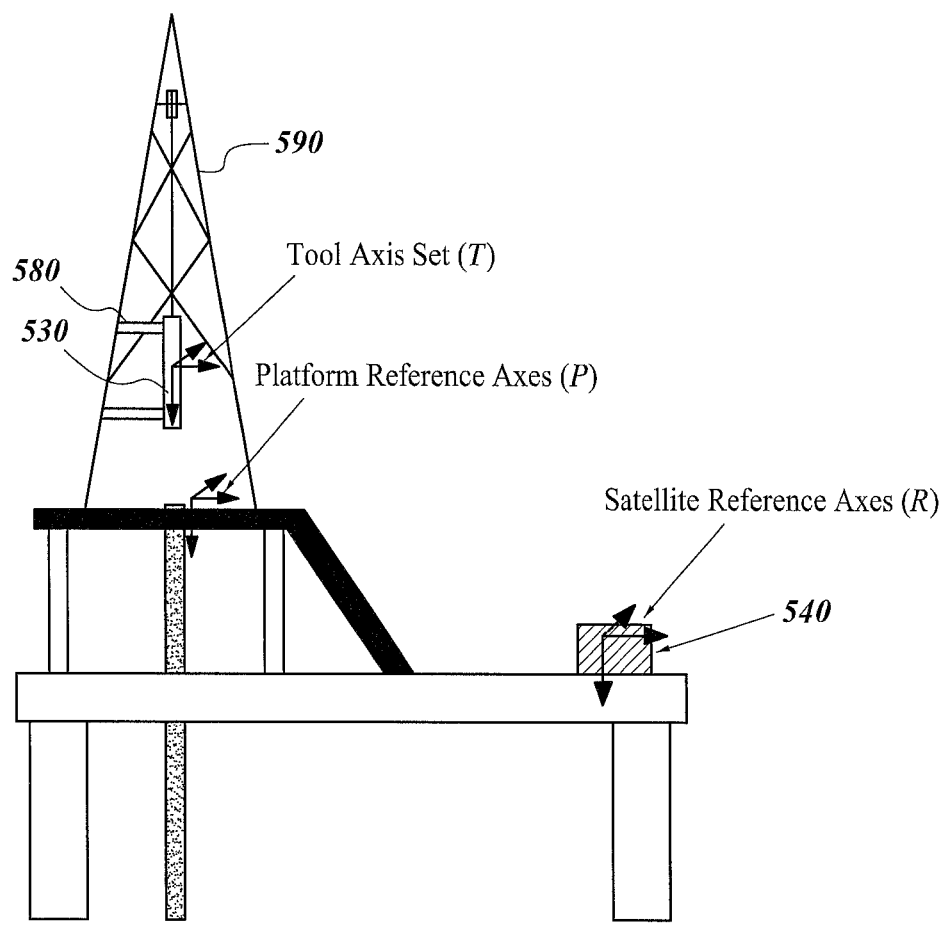
FIG. 21 shows an example rig having a survey tool and reference system mounted thereon, according to certain embodiments described herein.

FIG. 21 shows the example locations of the directional reference system 540 and the survey tool 530 in which the initialization process is to take place. The survey tool 530 can be held by tool initialization support 580 (including clamping assembly 570) of the derrick 590 and spaced away from the directional reference system 540.

2. Methods Involving the Use of an Additional Inertial Reference System

Certain alternative methods for initializing a gyro survey tool 530 are described next. According to some embodiments, these alternative methods are not reliant on and/or may not involve optical measurements and lasers. As described more fully below, values received from an inertial reference system can be used to determine the orientation of the wellbore survey tool 530 at the first position.

Figure 22:
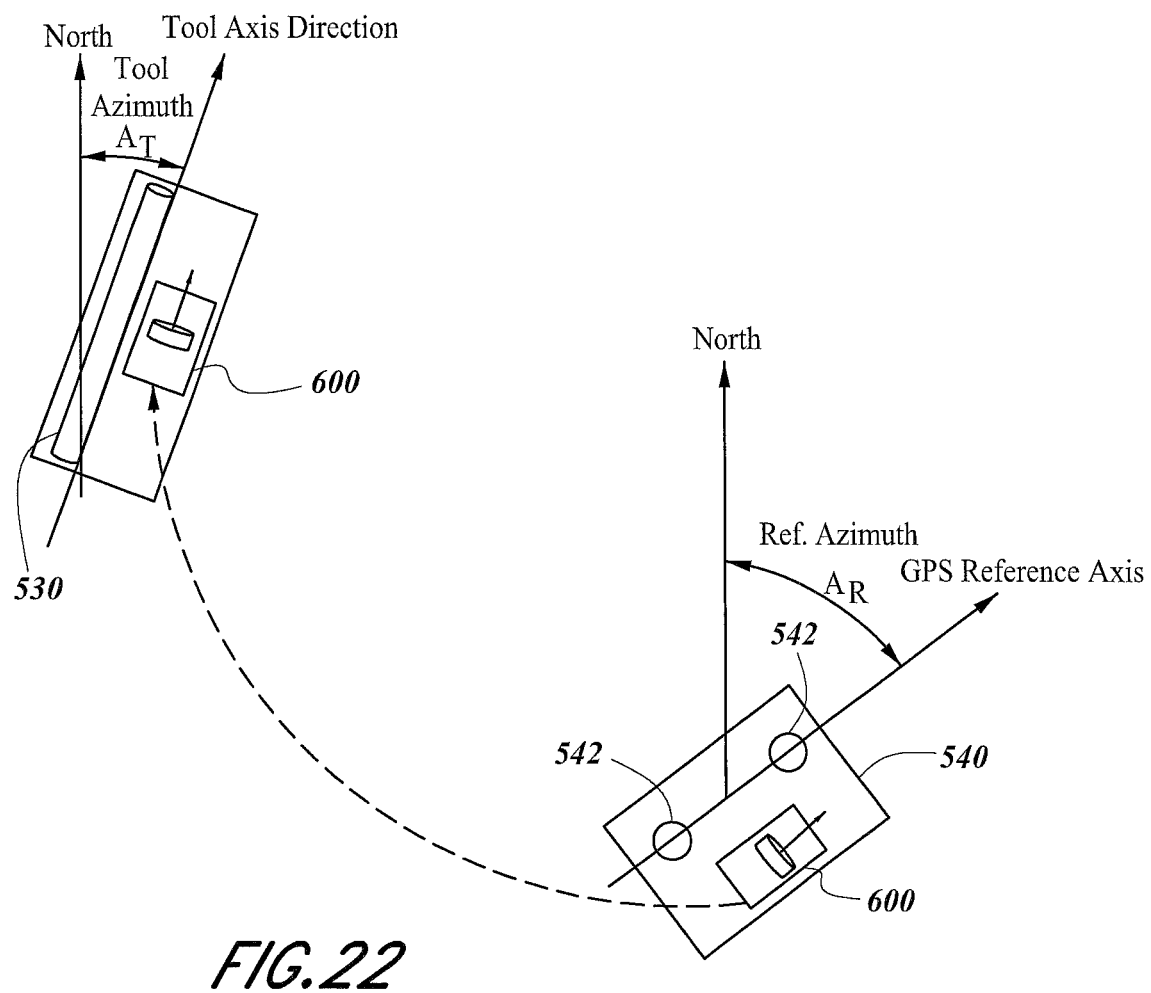
FIGS. 22 and 23 shows further example initialization configurations including inertial attitude and heading reference systems (AHRS), according to certain embodiments described herein.

FIG. 22 shows a reference platform containing the directional reference system 540 (e.g., GPS system) comprising satellite antennae 542 (two or more) and a survey tool 530 located at a location remote from the directional reference system 540. The method shown here involves the application of an inertial attitude and heading reference system (AHRS) unit 600 to store the azimuth reference set up using the directional reference system 540. This result can be achieved by initially mounting the AHRS unit 600 on the reference platform of the directional reference system 540. Having transferred the satellite reference to the AHRS unit 600, it can be detached from the platform and physically moved or carried to the entrance to the well where it can be affixed (e.g., clamped) to a platform to which the tool 530 is also attached. Assuming that the AHRS unit 600 and the tool 530 are accurately aligned relative to one another, or their relative orientation is known to sufficient accuracy, the azimuth defined by the AHRS unit 600 may be transferred to the survey tool 530.

For example, the reference azimuth ($A_R$) can be determined using the directional reference system 540 and can be transferred to the AHRS unit 600. While the AHRS unit 600 is carried to the wellbore entrance, the AHRS unit 600 maintains the attitude reference throughout. The AHRS unit 600 can then be attached to mounting blocks to which the survey tool 530 is also attached, and the attitude reference from the AHRS unit 600 can then be transferred to the survey tool 530. The survey tool 530 can then be switched to continuous survey mode and rotated to vertical above the wellbore entrance. Thus, in certain embodiments, before the orientation of the wellbore survey tool 530 is determined, the inertial reference system (e.g., AHRS unit 600) is moved from a first mounting position in which the inertial reference system is mounted at a predetermined orientation with respect to the directional reference system 540 to a second mounting position in which the inertial reference system is mounted at a predetermined orientation with respect to the wellbore survey tool 530.

The accuracy of the method involving the physical transfer of the AHRS unit 600 to the tool location can depend to some degree on the accuracy with which the AHRS unit 600 can be aligned mechanically in its respective mounting locations; firstly to the satellite antennae structure of the directional reference system 540 and subsequently to the survey tool 530. This alignment can be more challenging with the tool vertical, since the length of the baseline which controls the accuracy of this alignment may only be a few centimeters (the diameter of the tool) compared to meters (the length of the tool) in the case where the tool 530 is horizontal. However, the method described earlier of setting up a key way during tool assembly to define the orientation of the tool when affixed or clamped in place on the rig may be used (ref. FIGS. 19 and 20).

In certain cases, a significant advantage of this method, compared to the optical sighting methods described above, is a reduced dependency on the degree of rigidity of the rig structure. For example, the mounting arrangement over the relatively short distances between the AHRS unit 600 and the satellite antennae structure of the directional reference system 540, and between the AHRS unit 600 and the tool 530, are relevant to such a method.

Figure 23:
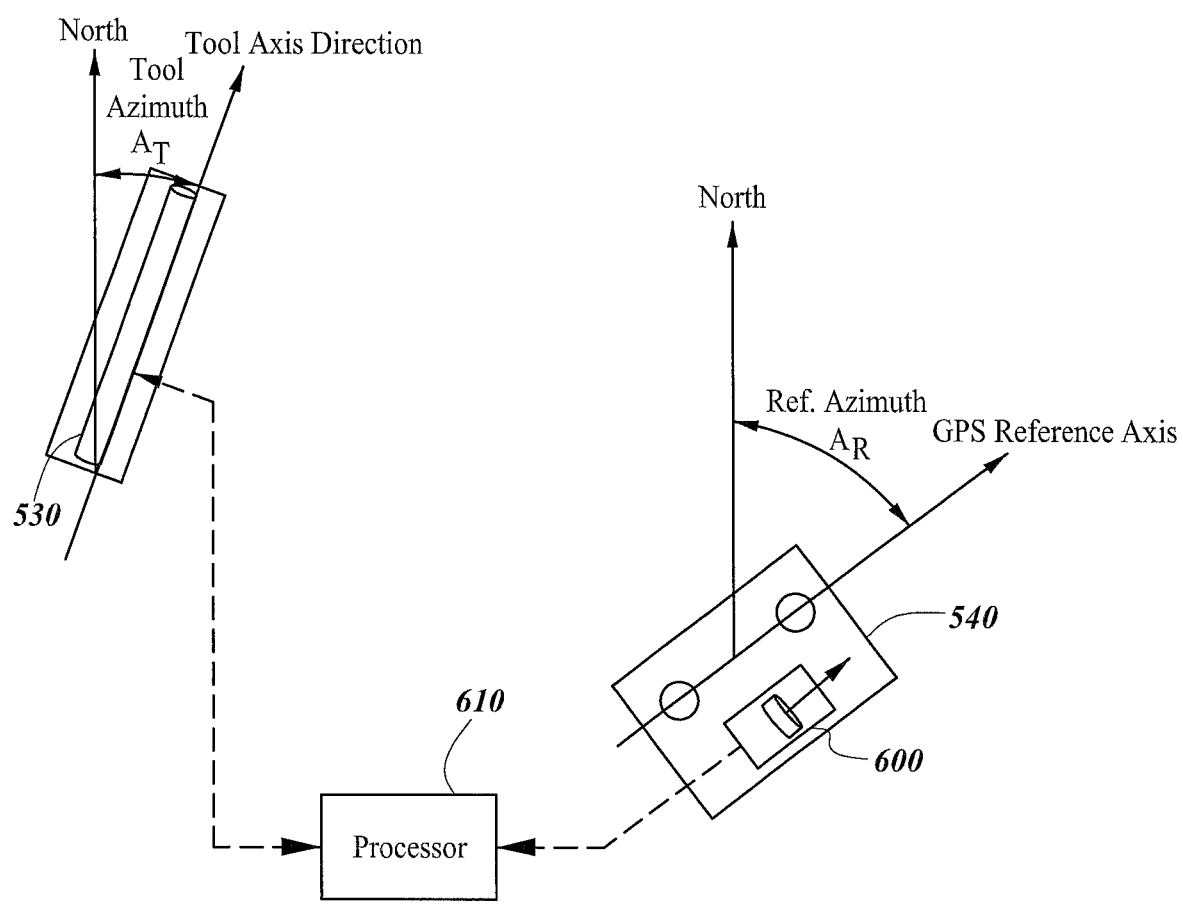

A further option, which according to certain embodiments does not involve the physical transport of the AHRS unit 600 between the reference site of the directional reference system 540 and the location of the tool 530, is shown in FIG. 23. In this case, angular rate measurements generated by the AHRS unit 600 and the gyroscopes in the survey tool 530 are compared and used to determine the relative orientation of the tool 530 and the AHRS unit 600 in a process referred to as inertial measurement matching. The time taken to perform this operation, and the accuracy to which it can be accomplished, can be a function of the motion of the rig or drilling platform on which the system is located. Given knowledge of the reference orientation (generated using the satellite system) to which the AHRS unit 600 is physically aligned and the relative orientation to the tool 530, as described above, the orientation of the tool 530 with respect to true north can be calculated. This information is then used to initialize the survey tool 530 before engaging continuous survey mode.

For example, the reference azimuth ($A_R$) can be determined using the directional reference system 540 and can be transferred to the AHRS unit 600. A comparison of the angular rate measured by the AHRS unit 600 and measured by the survey tool 530 can be performed by the processor 610, which can then determine the relative attitude (AA) between the AHRS unit 600 and the tool 530. The tool azimuth can then be expressed as $A_T = A_R - \Delta A$. The tool 530 can then be switched to continuous survey mode and rotated to vertical above the wellbore.

Both methods involving the use of the AHRS unit 600 may be implemented with the survey tool 530 either vertical or horizontal, or anywhere in between.

In an alternative configuration, when the tool 530 is vertical or substantially vertical, a large spinning wheel (spinning vertically) is set in a full gravity weighted gimbal system. The gimbal system may have a window on the top of the box to see the gyro tool face angle, for example. One example usage of such a configuration is to attach the directional reference system 540 (e.g., GPS unit or fixture) and spin up in the reference position and then detach and move to the rig floor where it gets attached to the tool 530 (e.g., to a tool reference plate). Then the tool 530 can be turned in the gyro tool face plane until the AHRS unit 600 is back at its reference position, and the survey tool initialisation can be performed.

J. Alternative Method for Initializing a Tool

As described herein, a significant amount of oil exploration activity occurs at high latitudes (e.g., higher than 70 degrees) from both land and off-shore sites. At these latitudes, the reference vectors used by wellbore survey systems or directional drilling systems for estimating azimuth, for example, as shown schematically in FIG. 24, the horizontal component of the Earth's rotation rate ($\Omega_H = \Omega \cos L$, where $\Omega$=Earth's rate and L=latitude) or the horizontal component of the Earth's magnetic field ($B_H = B \cos Dip$, where B=Earth's magnetic field and Dip=angle between a direction tangent to the magnetic field and the vertical direction) become small. With such small values, using instrumentation of the quality normally used in tools (e.g., wellbore survey tools, directional drilling tools), gyrocompassing (e.g., static surveys in which measurements of the Earth's rate are taken at discrete intervals on the wellbore trajectory) and magnetic surveys will not generally meet the desired accuracy. In addition, for continuous surveys (e.g., surveys in which measurements of the tool change in orientation are taken as the tool traverses the well), an integration of the high frequency gyro measurements is performed with respect to a known start orientation, usually derived from gyrocompassing, so precise knowledge of the initial attitude is desired. Thus, gyrocompass initialization accuracy reduces with increasing latitude. Furthermore, movement of the drilling platform (e.g., at an off-shore site) cannot be distinguished from the Earth's rate.

As described herein, a satellite navigation system comprising multiple antennae can be used to define a reference direction with respect to true north, a reference that can be determined at any latitude on the surface of the Earth and in the presence of motion of the platform on which the system is mounted (e.g. a floating drilling platform or drill ship). The reference may be transferred either directly to the tool, by mounting the tool alongside the satellite antennae, or indirectly via a separate inertial system. Indirect methods can offer a more practical approach since the tool can be located at the well head ready to run in-hole throughout the initialization process, avoiding the need to transport the tool physically between the satellite antennae location and the well head after it has been initialized.

As described herein, a method of initialization can use a separate directional reference system (DRS), such as an inertial attitude and heading reference system (AHRS) or an inertial navigation system (INS), mounted initially alongside the satellite antennae, to which the satellite reference data can be transferred (e.g., shortly before the wellbore survey operation is due to start). Thereafter, the DRS unit can keep track of its orientation with respect to true north by integrating the measured turn rate. The DRS unit can be capable of maintaining the reference to sufficient accuracy (e.g., less than +0.2°) for the period of time (e.g., a few minutes) during which the DRS unit is transported to the tool that is installed in the tool string at the entrance to the wellbore. The DRS unit can then be attached to an accurately defined mounting face on the pressure barrel in which the tool is installed, thereby allowing the reference to be transferred to the tool. The tool can operate in continuous mode thereafter as it is run in and out of the wellbore. One benefit of this approach can be avoiding transport of the powered tool around the rig site, which may be difficult to achieve safely and without subjecting the tool to excessively high turn rates or shock which may cause the reference to be lost. Another benefit of this approach can be using a relatively low-grade inertial DRS unit which can be both physically small and light in weight, thereby facilitating movement by hand around the rig.

Despite the unavoidable degradation of static measurement techniques, such as gyrocompassing and magnetic surveys, at high latitudes, in certain embodiments described herein, a gyrocompassing system of sufficiently high precision can be used to determine the direction of true north to a sufficient accuracy to initialize the tool. In general, the error in the direction of true north (AA) is governed by the residual gyro bias acting in the east direction ($B_g$), which can be expressed as $A=B_g/\Omega \cos L$, where $\Omega$=Earth's rate and L=latitude. The magnitude of the error reduces asymptotically to the value given by this expression of AA with the square root of time.

Current fiber optic gyroscopic systems can provide sufficiently high precision for determining the direction of true north to a sufficient accuracy to initialize the tool in accordance with certain embodiments described herein. For example, a gyroscopic system having a bias stability of 0.01°/hour can be used to determine the direction of true north to an accuracy approximately equal to 0.1° at a latitude of 70°, and to an accuracy approaching 0.2° at a latitude of 80°. Although fiber optic gyroscopic systems are not currently available for in-hole use in tools (due mainly to size and operating temperature constraints), in certain embodiments described herein, a DRS unit comprising a fiber optic gyroscopic system can be used for surface or out-hole applications, as described herein.

In certain embodiments, a method for initializing the tool (e.g., determining the direction of true north) to an accuracy of 0.2° or less can utilize a DRS unit comprising at least one gyroscope and at least one accelerometer. In certain embodiments, the method can advantageously simplify the equipment and procedures used at the surface for initialization of a tool for high latitude operation.

The method can use the at least one gyroscope of the DRS unit to provide the desired attitude reference, thereby avoiding reliance on a satellite-based system as the primary source of the north reference. For example, the DRS unit can be mounted on or alongside the tool until the desired reference has been established, and then disconnected (e.g., removed from being mounted on or alongside the tool) before the tool is inserted into the wellbore. The method can provide initialization using the at least one gyroscope of the DRS unit while located at or near the wellbore entrance, thereby avoiding initialization of the DRS unit while at a first location away from the wellbore entrance, then transporting the DRS unit to be at or near the wellbore entrance.

In certain embodiments, the method can be used for initialization for drilling operations conducted from a stable platform (e.g., on a land-based rig) or from a moving platform (e.g., on a floating rig). For example, the DRS unit may be used during a time period over a number of cycles of the wave motion to which the DRS unit is subjected to while on the floating rig, thereby providing a time-averaged or stabilized reference. The DRS unit may be run while other operations are conducted in preparation for running the tool in the wellbore, e.g., while the tool string is being assembled in preparation of an in-hole survey run.

Figure 25:
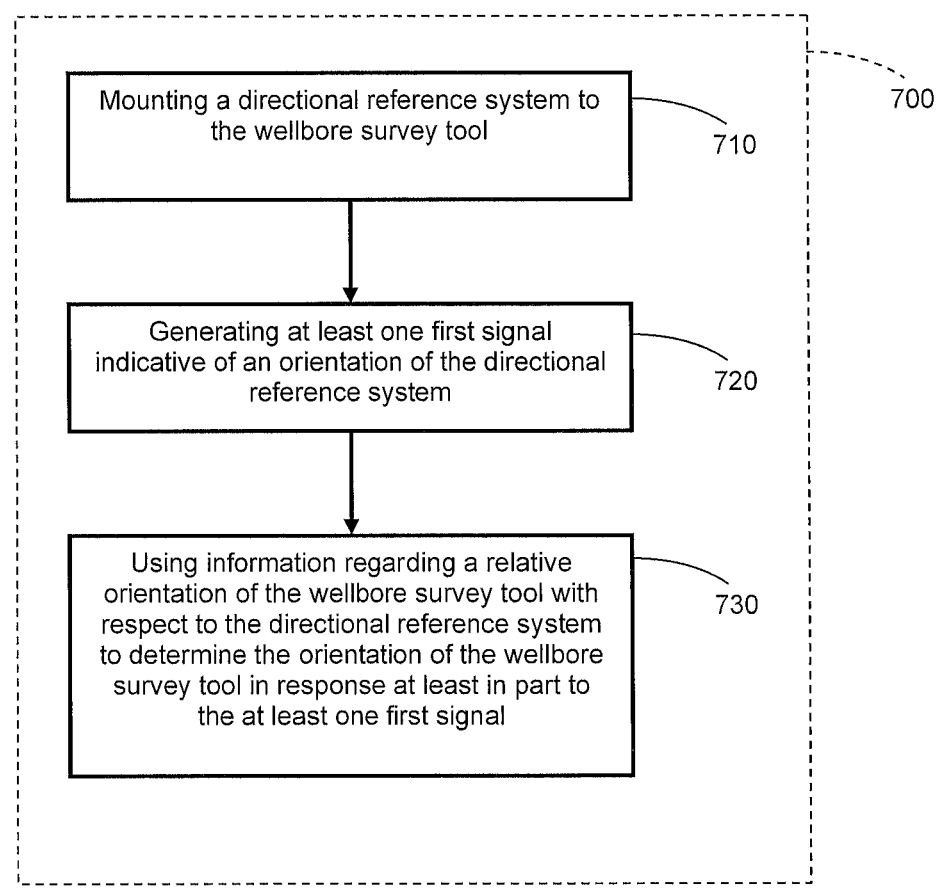
FIG. 25 is a flow diagram of an example method for initializing a tool in accordance with certain embodiments described herein.

FIG. 25 is a flow diagram of an example method 700 for initializing a tool in accordance with certain embodiments described herein. In an operational block 710, the method 700 comprises mounting a directional reference system to the tool at a predetermined orientation with respect to the tool. In an operational block 720, the method 700 further comprises generating at least one first signal indicative of an orientation of the directional reference system with respect to the reference direction after mounting the directional reference system to the tool. In an operational block 730, the method 700 further comprises using information regarding a relative orientation of the tool with respect to the directional reference system to determine the orientation of the tool with respect to the reference direction in response at least in part to the at least one first signal.

Figure 26:
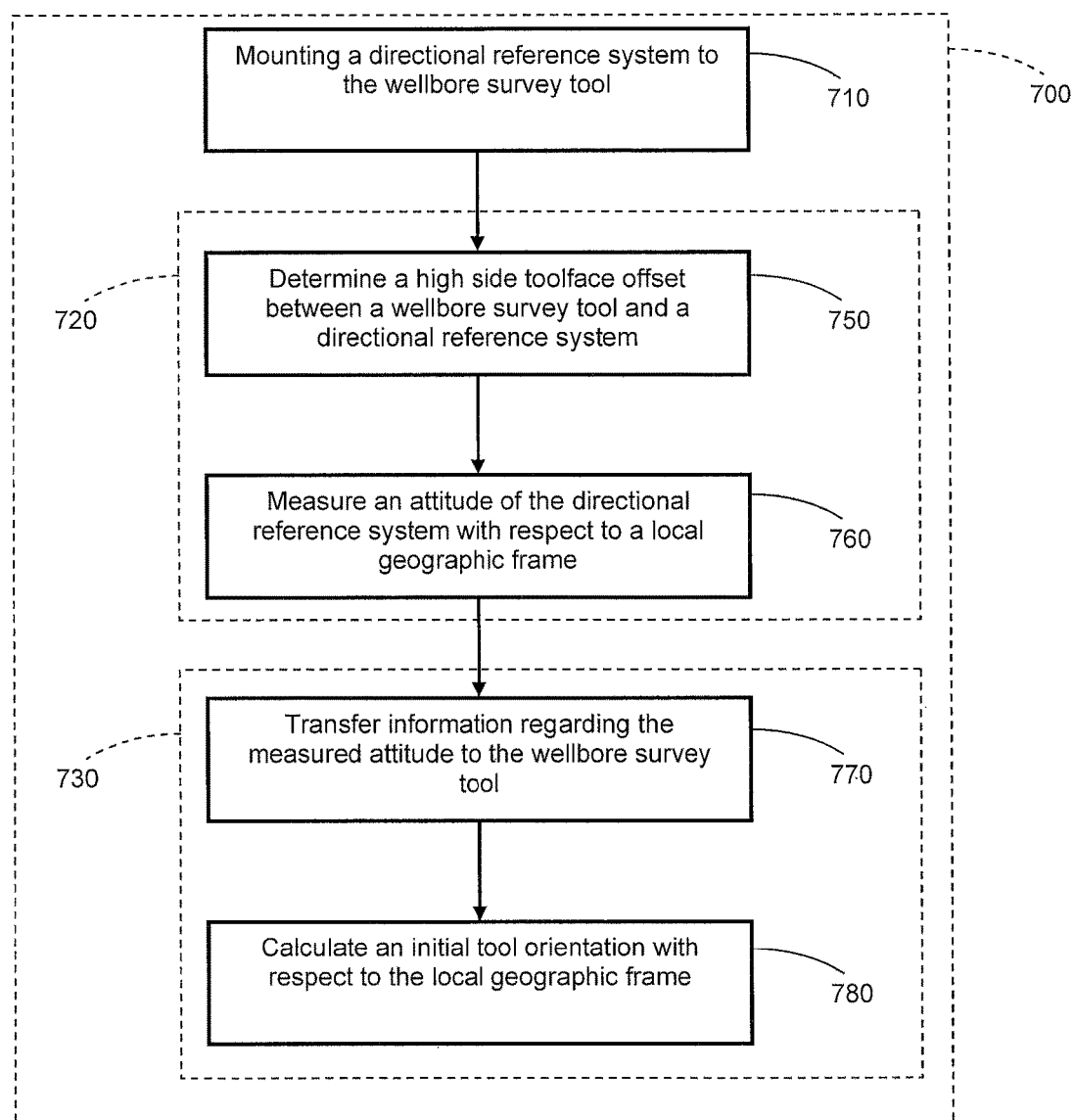
FIG. 26 is a flow diagram of another example method for initializing a tool in accordance with certain embodiments described herein.

FIG. 26 is a flow diagram of another example method 740 for initializing a tool in accordance with certain embodiments described herein. In the operational block 710, the method 700 comprises mounting a directional reference system to the tool at a predetermined orientation with respect to the tool. In the operational block 720, generating the at least one first signal comprises determining a high side toolface offset between the tool and the directional reference system in an operational block 750 and measuring an attitude of the directional reference system with respect to a local geographic frame in an operational block 760. In the operational block 730, using information regarding a relative orientation of the tool comprises transferring information regarding the measured attitude to the tool in an operational block 770 and calculating an initial tool orientation with respect to the local geographic frame in an operational block 780.

Figure 27:
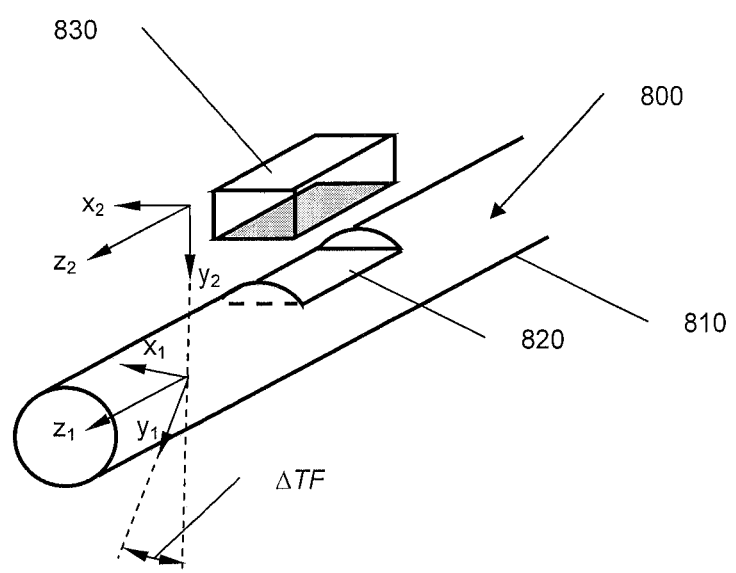
FIG. 27 schematically illustrates an example configuration of a tool comprising a housing having a mounting face configured to be mechanically coupled to a directional reference system in accordance with certain embodiments described herein.

In certain embodiments, the tool 800 comprises a housing 810 (e.g., a pressure barrel) having a mounting face 820 configured to mate with the directional reference system 830 (e.g., an AHRS unit or an INS unit). For example, as schematically illustrated by FIG. 27, the mounting face 820 can comprise a surface (e.g., flat or otherwise configured to mechanically coupled to a mating surface of the directional reference system 830) machined on the housing 810 of the tool 800. Alternatively, the mounting face 820 can comprise a surface (e.g., flat or otherwise configured to mechanically couple to a mating surface of the directional reference system 830) machined on an attachment that is configured to be mechanically coupled (e.g., bolted or clamped) onto an outside surface of the housing 810.

In certain embodiments, the orientation of the mounting face 820 to the tool 800 is known such that upon mounting the directional reference system 830 to the mounting face 820, the orientation of the directional reference system 830 to the tool 800 is also known. In certain such embodiments, by mounting the directional reference system 830 to the mounting face 820, the high side toolface offset ($\Delta TF$) between the tool 800 and the directional reference system 830 is determined. In certain other embodiments, measurements (e.g., $a_{x1}$ and $a_{y1}$) from at least one accelerometer of the tool 800 can be used to measure the high side toolface angle $TF_1 = \arctan(a_{x1}/a_{y1})$ of the tool 800 (e.g., in a plane perpendicular to an axial direction $z_1$ of the tool 800), and measurements (e.g., $a_{x2}$ and $a_{y2}$) from at least one accelerometer of the directional reference system 830 or of an inertial measuring unit (e.g., attached to either the directional reference system 830 or the mounting face 820) can be used to measure the high side toolface angle $TF_2 = \arctan(a_{x2}/a_{y2})$ of the directional reference system 830 (e.g., in a plane perpendicular to a direction $z_2$ of the directional reference system 830 that is parallel to the axial direction $z_1$ of the tool 800). The high side toolface offset 840 between the tool 800 and the directional reference system 830 can be determined by calculating a difference between the toolface angle $TF_1$ of the tool 800 and the toolface angle $TF_2$ of the directional reference system 830. In certain embodiments, measurements performed in determining the high side toolface offset (e.g., measurements of one or more of $a_{x1}$, $a_{y1}$, $a_{x2}$ and $a_{y2}$) are performed while the tool 800 has its axial direction $z_1$ (e.g., the axis of the housing 810) oriented in a non-vertical orientation (e.g., at or near a horizontal direction).

In certain embodiments, the high side toolface offset ($\Delta TF$) between the tool 800 and the directional reference system 830 can be used to express the attitude of the survey tool axis set ($T = \{x_1, y_1, z_1\}$) with respect to the mounting face axis set ($M = \{x_2, y_2, z_2\}$) as a direction cosine matrix:

$$C_M^T = \begin{bmatrix} \cos(\Delta TF) & \sin(\Delta TF) & 0 \\ -\sin(\Delta TF) & \cos(\Delta TF) & 0 \\ 0 & 0 & 1 \end{bmatrix}$$

In certain embodiments, measuring the attitude (A) of the directional reference system 830 with respect to a local geographic frame (G) comprises using at least one gyroscope of the directional reference system 830 (e.g., an AHRS unit or an INS unit) to measure the orientation of the directional reference system 830 with respect to the directions of true north, east, and the local vertical (e.g., performing a gyrocompassing operation). In certain embodiments, the measurements can be performed while the directional reference system 830 is mounted to the tool 800. In certain other embodiments, the measurements can be performed while the directional reference system 830 is at a location separate from that of the tool 800 and the directional reference system 830 can be moved to be mounted with the tool 800. While being moved, the directional reference system 830 can be in a continuous operating mode in which the directional reference system 830 keeps track of its orientation (e.g., by integrating the measured turn rates) during the movement, examples of which are described herein. Once the directional reference system 830 is mounted with the tool 800, the attitude (A) of the directional reference system 830 with respect to a local geographic frame (G) can be expressed as a direction cosine matrix $C_G^A$. The matrix $C_G^A$ may be expressed in component form in terms of the azimuth (Vu) and inclination ($\theta$) angles and the roll (z-axis) rotation ($\varphi$) of the directional reference system as follows:

$$C_G^A = \begin{bmatrix} \cos\psi\cos\theta\sin\varphi + \sin\psi\cos\varphi & \sin\psi\cos\theta\sin\varphi - \cos\psi\cos\varphi & -\sin\theta\sin\varphi \\ \cos\psi\cos\theta\cos\varphi - \sin\psi\sin\varphi & \sin\psi\cos\theta\cos\varphi + \cos\psi\sin\varphi & -\sin\theta\cos\varphi \\ \cos\psi\sin\theta & \sin\psi\sin\theta & \cos\theta \end{bmatrix}$$

Figure 28:
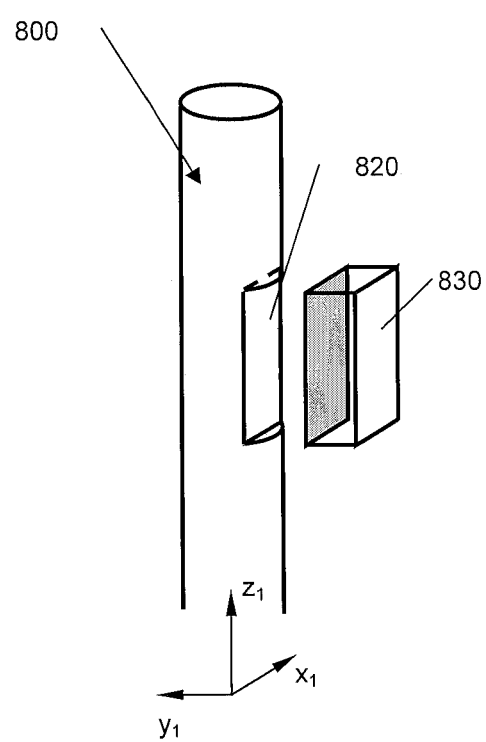
FIG. 28 schematically illustrates an example configuration with the tool installed in a tool string and oriented close to the vertical direction in accordance with certain embodiments described herein.

In certain embodiments, transferring information (e.g., $C_G^A$) regarding the measured attitude (A) to the tool 800 is performed once the directional reference system 830 is mounted with the tool 800. The tool 800 can be in a powered-up operational mode in which the tool 800 can measure its orientation, and the tool 800 can be installed in the tool string and oriented close to the vertical direction (e.g., ready to be run in-hole) as schematically illustrated by FIG. 28. Upon the directional reference system 830 being mounted on the mounting face 820, the directional reference system 830 is in registry with the tool 800, and the direction cosine matrix $C_A^M$ expressing the mounting face axis set (M) with respect to the attitude (A) of the directional reference system 830 is the unit matrix. Therefore, the direction cosine matrix $C_O^A$ is equal to a direction cosine matrix $C_G^M$ which expresses the orientation of the mounting face axis set (M) with respect to the local geographic frame (G).

In certain embodiments, the information (e.g., $C_G^A = C_G^M$) regarding the measured attitude (A) of the directional reference system 830 to the tool 800 is used (e.g., by the tool 800) to calculate an initial orientation (e.g., $C_G^T$) of the tool 800 with respect to the local geographic frame (G). This calculation can be performed by multiplying the attitude (e.g., $C_M^T$) of the survey tool axis set (T) with respect to the mounting face axis set (M) with the orientation (e.g., $C_G^M$) of the mounting face axis set (M) with respect to the local geographic frame (G): $C_G^T = C_M^T \cdot C_G^M$. In this way, the tool 800 can correct for the high side toolface offset to yield the tool instrument orientation with respect to the local geographic frame.

In certain embodiments, the directional reference system 830 comprises at least one gyroscope and at least one accelerometer used to initialize the tool 800 to a predetermined accuracy for carrying out a continuous survey of a wellbore. For high latitude operations, the at least one gyroscope can have a bias stability less than or equal to 0.01 degree per hour.

The number of gyroscopes and accelerometers of the directional reference system 830 can impact the flexibility of the initialization operational procedure. A high level of operational flexibility can be achieved using a directional reference system 830 comprising three or more gyroscopes and three or more accelerometers. In certain such embodiments, the directional reference system 830 can be initialized using a gyrocompassing procedure at any location on a drilling rig. For example, the directional reference system 830 can be initialized either alongside the tool 800 immediately before the tool 800 is run in the wellbore hole or at a location remote from the tool 800. This latter option may be desirable to minimize the risk of the directional reference system 830 being physically moved or knocked so as to disturb the relatively delicate process of gyrocompassing. Such a disturbance may occur as a result of other activity near to the wellhead location. In certain embodiments, the directional reference system 830 is mounted on a stationary level surface while gyrocompassing takes place.

Once an inertial reference is established to a predetermined accuracy, the directional reference system 830 can then be transported (e.g., carried) to the tool 800, while the directional reference system 830 keeps track of its orientation throughout. In certain embodiments in which a three-axis system is used, there are no limits to the attitude through which the directional reference system 830 may be moved while maintaining its reference in azimuth, inclination and high side tool rotation, other than ensuring that the rotation rate that the gyroscopes are capable of measuring is not exceeded.

In certain embodiments in which fewer than three sensors are used or in which fewer than three sensor measurement axes are used, the scope for initializing the directional reference system 830 at a location remote from the tool 800 become limited, and the full operation described here can be conducted with the directional reference system 830 attached to the tool 800, or mounted in close proximity to the tool 800. Such an approach can be desirable for initializing the tool 800 rapidly after it has been prepared to carry out a survey.

Figure 29:
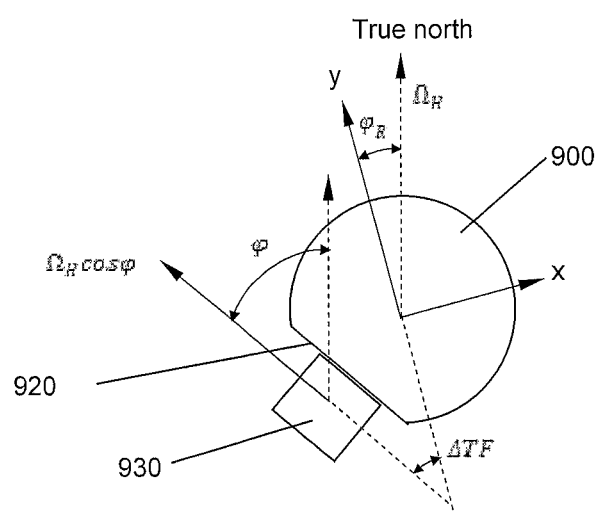
FIG. 29 schematically illustrates an example configuration of an initialization process compatible with certain embodiments described herein.

FIG. 29 schematically illustrates an example configuration of an initialization process compatible with certain embodiments described herein. A tool 900 is suspended vertically above a well entrance, and has a mounting surface 920 attached to a directional reference system 930 comprising a single gyroscope. In certain other configurations, the directional reference system 930 can be mounted on a level surface. The gyroscope of the directional reference system 930 is configured to measure the horizontal component of the Earth's rate ($\Omega_H$) in a known direction with respect to the mounting surface 920, and the directional reference system 930 comprises at least one processor configured to calculate the angle ($\varphi$) between the mounting surface 920 and true north in response to the measured horizontal component of the Earth's rate. Using information regarding the toolface offset ($\Delta TF$) with respect to the mounting surface 920, at least one processor (e.g., the at least one processor of the directional reference system 930 or at least one processor of the survey tool 900) can calculate the direction of the tool y-axis with respect to true north (e.g., the rotational toolface angle $\varphi=\varphi-\Delta TF$). This information can then be used for initialization of the tool 900 before the tool 900 is inserted into the wellbore.

K. Survey Tool Implementations

Figure 24:
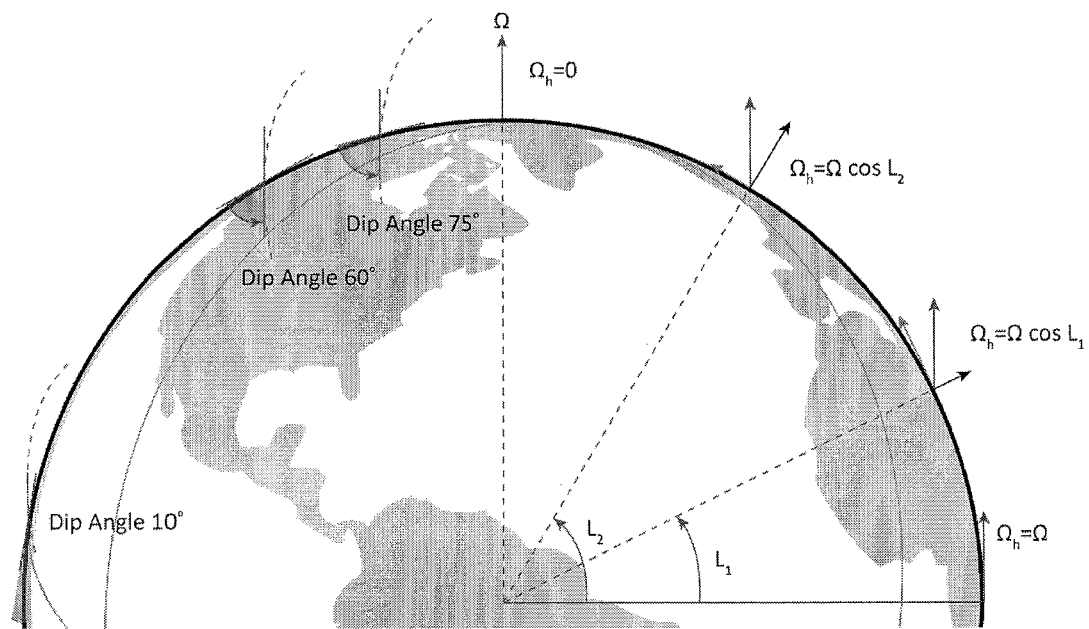
FIG. 24 schematically illustrates the horizontal component of the Earth's rate and the horizontal component of the Earth's magnetic field for changing latitude.

As described above, oil exploration activities may occur at relatively high latitudes (e.g., higher than 60 degrees) from land and/or offshore sites. At these latitudes, the reference vectors used by wellbore survey systems or directional drilling systems for estimating azimuth may become relatively small. As shown in FIG. 24, such reference vectors may include the horizontal component of the Earth's rotation rate ($\Omega_H=\Omega$ cos L, where $\Omega$ represents the Earth's rate and L represents latitude) or the horizontal component of the Earth's magnetic field ($B_H$=B cos Dip, where B represents the Earth's magnetic field and Dip represents the angle between a direction tangent to the magnetic field and the vertical direction). With smaller values for the reference vectors, gyrocompassing (i.e., static surveys in which measurements of the Earth's rate are taken at discrete intervals on the wellbore trajectory) and magnetic surveys performed for a wellbore may decrease in accuracy. Further, for continuous surveys (i.e., surveys in which measurements of the tool change in orientation are taken as the tool traverses the well), an integration of the high frequency gyroscopic measurements is performed with respect to a known initial orientation, where the initial orientation may be derived from gyrocompassing. As such, precise knowledge of the initial attitude is desired. However, gyrocompass initialization accuracy may be reduced with increasing latitude.

Accordingly, various implementations described above may be used for initializing a survey tool at high latitudes. For example, a directional reference system, such as those discussed above with respect to FIGS. 2-9, may be used to provide data indicative of an orientation of the directional reference system with respect to a reference direction. In particular, the directional reference system may be a satellite navigation system having multiple antennae and the reference direction may be true north, such that the multiple antennae can be used to determine an initial orientation of a survey tool with respect to true north. Data indicative of the initial orientation can then be transferred to the survey tool, at which point the survey tool may be switched to continuous survey mode prior to being positioned for insertion into the wellbore and/or prior to insertion into the wellbore. The survey tool may be switched to continuous survey mode such that its subsequent orientation (e.g., heading, trajectory, attitude, azimuth, etc.) can be measured with respect to the initial orientation. A continuous survey of the wellbore may then be conducted as the survey tool traverses the wellbore.

As further described below, various implementations of a survey tool may be used in conjunction with the above-described implementations for initializing the survey tool. As mentioned above with respect to FIGS. 2-9, the survey tool may be a dedicated survey instrument while, in other implementations, the survey tool may be a MWD or LWD instrumentation pack, where these instrumentation packs may be coupled to a rotary steerable drilling tool.

1. Drop Survey Tool, Wireline Survey Tool, & Slickline Survey Tool

In one implementation, and as further described below, the survey tool may be a drop survey tool, a wireline survey tool, or a slickline survey tool. In particular, the survey tool may be any drop survey tool, wireline survey tool, or slickline survey tool known to those skilled in the art. As is known in the art, a drop survey tool may be uncoupled from the surface, and may be powered using one or more batteries. A slickline survey tool may also be powered using one or more batteries, such as tools for surveys run on a wireline without communication to the surface. In contrast, a wireline survey tool may be powered from and/or in communication with systems on the surface while the tool is disposed within the wellbore. As is also known in the art, the slickline survey tool and the wireline survey tool may be configured to be lowered into a wellbore, while the drop survey tool may be configured to be dropped into a wellbore.

In a further implementation, the drop survey tool, the wireline survey tool, or the slickline survey tool may be smaller in size and/or weight than the MWD or LWD instrumentation packs discussed above. In particular, in such implementations, the survey tool may be configured with a length and weight such that an individual may be capable of physically carrying the survey tool. In one such implementation, the survey tool may have a length that is equal to less than ten feet. In another such implementation, the survey tool may have a length that is equal to approximately three feet.

The survey tool may include one or more gyroscopic sensors, one or more accelerometers (e.g., single-axis or multiple-axis accelerometers) configured to measure one or more orthogonal components of the Earth's gravity, one or more magnetic sensors (e.g., single-axis or multiple axis magnetometers), and/or any other sensors known to those skilled in the art.

The one or more gyroscopic sensors may be configured to generate signals indicative of measurements of the rotation rate to which the gyroscopic sensors are exposed. The gyroscopic sensors may include a spinning mass gyroscopic sensor, such as a single-axis rate integrating gyroscopic sensor or a dual-axis dynamically tuned gyroscopic sensor; an optical gyroscopic sensor, such as a ring laser gyroscopic sensor (RLG) or a fiber-optic gyroscopic sensor (FOG); a Coriolis vibratory gyroscopic (CVG) sensor, such as a tuning fork gyroscopic sensor or a hemispherical resonator gyroscopic sensor (HRG); a microelectromechanical system (MEMS) gyroscopic sensor; and/or any other implementation known to those skilled in the art. In particular, the one or more first gyroscopic sensors 112 may include a dual-axis gyroscopic sensor, one or more single-axis gyroscopic sensors, or combinations thereof that are configured to provide measurements of the Earth's rotation rate about the x-axis, the y-axis, or the z-axis of the survey tool.

With respect to the use of CVG sensors, the design technology for these sensors may incorporate either a silicon or a quartz resonator with piezo-electric driver circuits. The motion due to Coriolis forces may be detected using piezo-electric or capacitive pick-offs. The small devices of this type, which may be referred to as MEMS sensors, may be fabricated using the chemical etching and batch processing techniques used by the electronics integrated circuit industry. The resulting solid state sensors can be made to be rugged, with the capability to withstand applied accelerations of many tens of thousands of g-forces (g). Further, these solid state CVG sensors may be less susceptible to g-dependent effects, and thus may eliminate the concern over the effect that g-dependent errors may be having on survey accuracy.

Further, with respect to wellbore surveying and construction, the application of CVG sensors may lead to: a reduction in the physical size of gyroscopic tools incorporating these sensors; a reduction in power requirements; reduced survey time, as spinning mass gyroscopes take time for the rotor to reach the required spin speed; and/or increased time intervals between recalibrations of the tool. The use of advanced solid state gyroscopic sensors may be a practical option for high performance wellbore placement with the potential to outperform traditional mechanical gyroscopic systems. Survey tools using such sensors may not require additional time for rig operations, may not require regular calibrations for its sensors, may avoid mass unbalance errors, may operate in all latitudes, may operate in all attitudes, may automatically collect surveys while the tool is stationary, may have a relatively short tool length with the sensors proximate to the drill bit, may reduce error ellipses, may reduce costs, and may be accurate in high shock, high vibration, and high temperature environments.

The one or more accelerometers may be configured to measure one or more orthogonal and/or non-orthogonal components of the Earth's gravity, where these measurements may be used to generate an inclination angle and a toolface angle of the survey tool, as is known to those skilled in the art. For example, the one or more acceleration sensors may include three single-axis accelerometers configured to provide measurements of the orthogonal components ($g_x$, $g_y$, $g_z$) of the Earth's gravitation vector with respect to the x, y, and z axes of the survey tool. Various types of accelerometers may be used, such as quartz flexure accelerometers, MEMS accelerometer devices, and/or any other type of accelerometers known to those skilled in the art. In one implementation, the measurement range of the accelerometers may be in excess of +1 unit of standard gravity (g) (e.g., in a range between +1.2 g and +1.5 g). Further, the accelerometers may be of a size that can be accommodated in a downhole tool (e.g., within the confines of a 1 and ¾ inch pressure case of a wellbore), capable of operating over an expected temperature range (e.g., −20° C. to +150° C., or greater), and capable of surviving the downhole vibration and shock environment that may be encountered during the drilling process. The resolution and precision of the one or more accelerometer sensors can depend on the time and the desired angular rate uncertainty. For example, for errors below a maximum error on a toolface rate of 0.05°/hour over 15 seconds, the at least one accelerometer can provide noise levels below 0.14 mg. An analog-to-digital system with a range of +1.2 g and 16 bits can give a resolution of 0.036 mg/count, which can satisfy the desired noise levels. If the time is increased, the accelerometer uncertainty can be increased as well.

As noted above, the survey tool may be used to acquire survey data during an inrun and/or outrun data acquisition using the one or more sensors described herein. An inrun data acquisition may refer to a data acquisition performed as a survey tool is inserted into a wellbore, and an outrun data acquisition may refer to a data acquisition performed as a survey tool is extracted from the wellbore. In particular, the tool may be configured to record the continuous survey data at multiple positions (i.e., survey stations) within the wellbore and store that data in an electronic memory device of the survey tool. The data recorded by the tool may correspond to continuous survey measurements acquired using the one or more sensors described above.

In particular, the survey data may be acquired using these sensors at discrete intervals (i.e., survey stations) within the wellbore. Although the survey data is acquired at discrete intervals, the discrete intervals may be set to a value such that the survey data effectively corresponds to "continuous" survey data for the wellbore. As such, the survey data acquired using such implementations discussed herein are referred to as "continuous survey data". For example, the discrete intervals may be set to be no greater than every one foot along the wellbore. In other examples, discrete intervals of three feet, five feet, and so forth may be used. The continuous survey data may be used to generate a continuous survey of the wellbore in order to determine a true path or trajectory of the wellbore.

One or more computing systems may be used with the survey tool described herein. The computing system may be used to process the data acquired by the survey tool. In particular, based on the acquired data, the computing system may be used to generate a continuous survey of the wellbore.

In one implementation, the computing system may be located at the surface, and may be configured to receive or download the recorded data from the tool after the tool has been retrieved from the wellbore using any form of communications known to those skilled in the art. In another implementation, the computing system may be configured to receive or download the acquired data from the tool as the tool traverses the wellbore, using any communication implementations known to those skilled in the art. The computing system can be any computing system implementation known to those skilled in the art. In some implementations, the survey tool may also include a computing system. Various implementations of the computing system and the computing system of the survey tool are further discussed in a later section.

Figure 30:
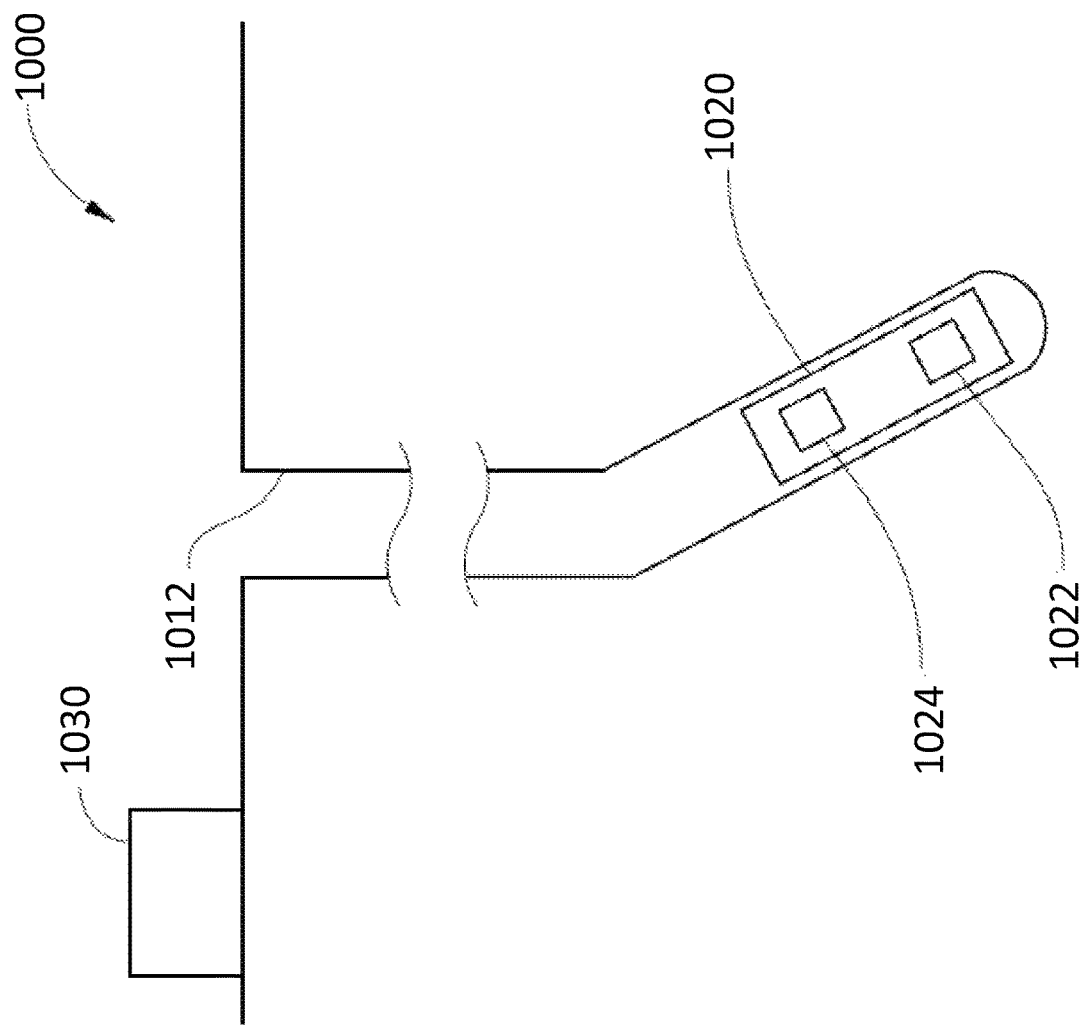
FIG. 30 illustrates a schematic diagram of a survey operation in accordance with implementations of various techniques described herein.

For example, FIG. 30 illustrates a schematic diagram of a survey operation 1000 in accordance with implementations of various techniques described herein, where the survey tool used may be a drop survey tool 1020. As shown, the survey operation may also include a computing system 1030. The drop survey tool 1020 may be disposed within a wellbore 1012, and may be used in conjunction with various applications described herein. The drop survey tool 1020 may also include various sensors, such as those described above, including one or more gyroscopic sensors 1022 and one or more accelerometers 1024.

The drop survey tool 1020 may be configured to perform inrun and/or outrun data acquisitions. In one implementation, the drop survey tool 1020 may be dropped into a drill string (not pictured) of the wellbore 1012, record the continuous survey data as it falls within the drill string, and store that data in an electronic memory device (not pictured) in the survey tool 1020. The drop survey tool 1020 may be configured to land at the bottom of the drill string, such as in an area proximate to a bottom hole assembly of the drill string. In one implementation, the drop survey tool 1020 may include a spring mounted to the bottom of the tool and/or any other implementation known in the art that may be used to minimize levels of shock and vibration for the tool 1020 as it travels down the wellbore and lands within the drill string.

In some implementations, the drop survey tool 1020 may freefall in the drill string after it is initially dropped. However, various implementations for the drop survey tool 1020 may be used in order to control a rate of descent within the drill string, and to minimize levels of shock and vibration for the tool 1020 as it travels down the wellbore and lands within the drill string.

In addition, the rate of descent of the drop survey tool 1020 may be controlled based on the drilling fluid being pumped in the wellbore. In particular, the drill string may be filled with the drilling fluid, where the fluid may be resistant to the free falling of the drop survey tool 1020. As such, the rate at which the drilling fluid is pumped in the wellbore may be used to control the speed of the tool 1020. In addition, the rate at which the drilling fluid is pumped in the wellbore may be used to control the speed of the tool 1020 for any high-angle sections of the wellbore 712. In one implementation, the rate of descent of the tool 1020 may be limited to as low as 1-2 feet per minute. In another implementation, the viscosity of the drilling fluid may be changed to alter the rate of descent of the tool 1020.

After a period of time, the drill string may be retrieved, such as for the inspection or replacement of a drill bit coupled to the bottom of the drill string. During the retrieval of the drill string, the drop survey tool 1020 positioned at the bottom of the drill string is slowly raised within the wellbore, during which time the drop survey tool may perform the outrn data acquisition.

In addition, the continuous survey data also includes depth data acquired by the drop survey tool 1020 during the inrun data acquisition. For example, in one implementation, the drop survey tool 1020 may include a casing collar locator (not shown). As is known in the art, a casing collar locator may be used to find or locate collars or casing joint ends of the segments that form the casing of the wellbore 1012. Given that casing joints may have known spacing, the depth of the survey tool 1020 within the wellbore can be determined if the casing collars or joints can be correctly counted. As such, the casing collar locator can be used to estimate the depth of the survey tool 1020 (i.e., the depth data) at the survey points for the continuous survey data recorded during the inrun data acquisition. In one implementation, the casing collar locator may include one or more magnetic sensors. In another implementation, depth data may be acquired by detecting casing joints, such as by monitoring disturbances in the gyroscopic sensor or accelerometer readings as the survey tool 1020 passes the joints as it traverses the wellbore 1012.

In another implementation, the depth of the survey tool 1020 (i.e., the depth data) at the survey points for the continuous survey data recorded during the inrun data acquisition can also be determined using the one or more accelerometers 1024. In particular, the one or more accelerometers 1024 may include a z-axis accelerometer configured to provide measurements of the acceleration along a longitudinal axis (i.e., z-axis) of the survey tool. As such, the z-axis accelerometer may be used to determine the depth of the survey tool 1020 at the survey points for the continuous survey data recorded during the inrun data acquisition, particularly if the rate of descent for the tool 1020 is substantially constant. In particular, the measurements acquired using the z-axis accelerometer may be integrated twice in order to determine the depth of the survey tool 1020 at the survey points. In a further implementation, the depth of the survey tool 1020 (i.e., the depth data) at the survey points for the continuous survey data can be determined using both a casing collar locator and the z-axis accelerometer. In particular, the casing collar locator may be used to estimate the depth of collars or casing joint ends of the segments that form the casing of the wellbore 1012, while the z-axis accelerometer may be used to determine the depth of the survey tool 1020 at points between the joint ends. In yet another implementation, empirical velocity profiles may also be used to determine the depth of the survey tool 1020 at the survey points for the continuous survey data recorded during the inrun data acquisition.

Further, the continuous survey data may also include depth data acquired by the drop survey tool 1020 during the outrun data acquisition. Such depth data can be determined based on the known lengths of the drill string and of each section of the drill string that is pulled out during the retrieval process. For example, if each section of the drill string is 90 feet long, then the tool 1020 may record data at multiple positions along the wellbore 1012 that are spaced at 90 feet from each other. In another implementation, systems known to those skilled in the art may be used to track the depth of a drill bit coupled to the drill string. As such, the depth of the survey tool 1020 at the survey points can be determined based on the known depths of the drill bit, such as by applying an offset to the known depths of the drill bit during the continuous survey. Other implementations known in the art for acquiring depth data may also be used.

As mentioned above, the drop survey tool 1020 may be uncoupled from the surface, and may be powered using one or more batteries. The gyroscopic sensors 1022 may include one or more solid state CVG sensors, where the x and y gyroscopic sensors (of the gyroscopic sensors 1022) may be mounted with the x and y accelerometers (of the accelerometers 1024) in a single chassis unit (not pictured) which can be rotated together. The orientation of this unit within the survey tool 1020 may be controlled by a motor drive unit (not pictured) mounted alongside the xy sensor chassis unit. A z gyroscopic sensor (of the gyroscopic sensors 1022) may be mounted separately. One or more cabling connections (not pictured) may be disposed beyond the gyroscopic sensor assembly of the tool 1020. These connections may enable both signal and power communication to other items in the drill string above and below the drop survey tool, thus allowing tool (and the gyroscopic sensors) to be placed anywhere in the drill string.

The computing system 1030 may be used to process the data recorded by the survey tool 1020. In particular, based on the recorded data, the computing system 1030 may be used to generate a continuous survey of the wellbore 1012. As discussed above, the computing system 1030 may be located at the surface, and may be configured to receive or download the recorded data from the tool 1020 after the tool 1020 has been retrieved from the wellbore 1012.

2. Initializing the Survey Tool

The various implementations for a survey tool described above may be used in conjunction with any of the previously-described implementations for initializing a survey tool. For example, a drop survey tool, a slickline survey tool, or a wireline survey tool may be used with the implementations described above with respect to FIGS. 2-9.

In particular, using such implementations, the initial orientation (e.g., attitude) of such a survey tool may be defined accurately while above ground (i.e., on the surface), and data indicative of the initial orientation can then be transferred to the tool. In some implementations, the survey tool may be switched to continuous survey mode prior to being positioned for insertion into the wellbore and/or prior to insertion into the wellbore. For example, the initial orientation of the tool may be measured prior to pick-up of the survey tool (e.g., from horizontal to vertical with respect to the wellbore) to position the survey tool into the wellbore. In certain implementations, this initial measurement may be made while the tool is positioned generally horizontally with respect to the wellbore (e.g., laying on a surface in the vicinity of the wellbore), for example. The survey tool may be switched to continuous survey mode such that its subsequent orientation (e.g., heading, trajectory, attitude, azimuth, etc.) can be measured with respect to the initial orientation. The survey tool may then be lifted from the horizontal position to another position, such as a vertical position. A continuous survey of the wellbore may then be conducted as the survey tool traverses the wellbore trajectory.

For example, implementations of a drop survey tool, a slickline survey tool, or a wireline survey tool (as described above) may be used with the apparatus 10 shown in FIG. 2, where the drop survey tool, the slickline survey tool, or the wireline survey tool are represented in FIG. 2 by survey tool 30.

As described above, the apparatus 10 may include a base portion 12 and a first mounting portion 14 mechanically coupled to the base portion 12. The first mounting portion 14 may be adapted to be mechanically coupled to at least one directional reference system 16. The at least one directional reference system 16 can be configured to provide data indicative of an orientation (e.g., attitude and/or azimuth) of the at least one directional reference system 16 with respect to a reference direction 18. The reference direction 18 may be north (e.g., true or rotational north or magnetic north). The apparatus 10 may also include a second mounting portion 20 mechanically coupled to the base portion 12. The second mounting portion 20 may be configured to be mechanically coupled to the survey tool 30. In particular, the second mounting portion 20 may include an area of the base portion 12 on which the survey tool 30 is mounted.

When coupled to the second mounting portion 20, the survey tool 30 may be positioned at a predetermined orientation with respect to the at least one directional reference system 16. For example, as shown in FIG. 2, the survey tool 30 may be substantially parallel to the directional reference system 16. In other implementations, the survey tool 30 may be oriented at some predetermined angle relative to the directional reference system 16, or may be oriented in some other predetermined fashion with respect to the directional reference system 16.

The second mounting portion 20 may also include one or more ports (e.g., electrical ports) for operatively coupling the survey tool 30 to the apparatus 10. For example, the ports may enable electrical communication between the survey tool 30 and the apparatus 10 or components thereof. In other implementations, the survey tool 30 may not be in direct communication or otherwise operatively coupled to the apparatus 10, but may be in communication with one or more systems or subsystems physically separate from the apparatus 10. Such systems or subsystems may themselves be in communication with the apparatus 10 or components thereof.

The at least one directional reference system 16 may include at least one signal receiver of a global positioning system (GPS). In one implementation, the at least one signal receiver may include a first antenna 22 and a second antenna 24 spaced apart from the first antenna 22. The first antenna 22 and the second antenna 24 may define a line 26 from the first antenna 22 to the second antenna 24. In some implementations, more than two antennae may be used. In other implementations, the at least one signal receiver may be a non-GPS signal receiver. As discussed above, implementations other than a directional reference system may be used to determine the orientation of the platform or a line on the platform with respect to the reference direction 18.

Because the line 26 between the two antennae 22, 24 may be generally aligned with a direction 19 of the apparatus 10, or the orientation of the line 26 with respect to the apparatus 10 may otherwise be known, the line 26 may define, correspond to, or be used as the orientation (e.g., direction 19) of the apparatus 10 with respect to the reference direction 18. In FIG. 2, for example, the line 26 is shown as being rotated with respect to the reference direction 18 (e.g., true north) by angle A. The angle A may define or be characterized as the angle (e.g., azimuth angle) of the apparatus 10 with respect to the reference direction 18. Moreover, because the survey tool 30 can be aligned with respect to the line 26, the angle A can therefore also correspond to the direction (e.g., azimuth direction) of the survey tool 30 with respect to the reference direction 18. The angle A can thus be transmitted (e.g., as electronic data) to the survey tool 30 for the initialization of the survey tool 30.

Further, as discussed above with respect to FIG. 4, the apparatus 10 may also include at least one leveler 48 configured to level the apparatus 10 with respect to the Earth (e.g., to be substantially perpendicular to the direction of gravity). The at least one leveler 48 may include a set of one or more adjustable supports, for example.

In addition, the apparatus 10 may include a computing system 52. The computing system 52 may be in communication with the directional reference system 16 and/or the survey tool 30. For example, the computing system 52 may receive data indicative of the orientation of the apparatus 10 with respect to the reference direction 18 from the directional reference system 16. The computing system 52 may also process the information from the directional reference system 16 to determine an initial orientation of the survey tool 30. The computing system 52 may further be configured to transmit such information to the survey tool 30. In one implementation, the computing system 52 may perform one or more of the functions described above for the computing system of the drop survey tool, the slickline survey tool, or the wireline survey tool.

As discussed above, the apparatus 10 may be positioned away from a wellhead of the wellbore in order to avoid issues with shielding of the at least one signal receiver from one or more satellites by a derrick or other equipment on a rig. In one implementation, after determining an initial orientation of the survey tool 30, the survey tool 30 may be decoupled from the apparatus 10 and then carried to the wellhead for deployment into the wellbore.

In particular, the drop survey tool, the slickline survey tool, and/or the wireline survey tool discussed above may be used for such an implementation, as these tools can be relatively small in size and/or weight. As mentioned above, these survey tools may be configured with a length and weight such that an individual may be capable of physically carrying the survey tool. As such, in operation, one of these survey tools may be coupled to the apparatus 10, where the survey tool may be positioned at a predetermined orientation with respect to the at least one directional reference system 16, as described above. In one implementation, while coupled to the apparatus 10, the survey tool may be positioned in a substantially horizontal position with respect to the base portion 12 of the apparatus 10.

The initial orientation of the survey tool may be determined using the directional reference system 16, as described above, where the initial orientation may be transmitted to the survey tool 30. The survey tool may then be placed into a continuous survey mode, during which the continuous survey data can be acquired. One or more individuals may subsequently remove the survey tool from the apparatus 10, and then transport (e.g., carry) the survey tool to the wellhead. In a further implementation, the survey tool may remain in the substantially horizontal position while being transported to the wellhead.

While in the continuous survey mode, the survey tool may be able to track its orientation based on the initial orientation using the sensors discussed above. Once at the wellhead, the survey tool may be rotated to a substantially vertical position for deployment into the wellbore. The survey tool may be rotated a relatively low rate (e.g., within the rate limits of the gyroscopic sensors on the survey tool). In particular, it may be avoided to turn the survey tool at undesirably high turn rates which exceed the maximum rates which can be measured by one or more rotation sensors (e.g., gyroscopic sensors) of the survey tool. Under such undesirable conditions, the orientation data (e.g., directional reference data) stored in the survey tool can be lost and subsequent orientation (e.g., attitude and/or azimuth) processing will be in error. By moving the survey tool at a relatively low rate, the sensors of the survey tool may avoid being saturated, thereby allowing the survey tool to continue to keep track of its rotation as it is moved.

After being deployed, the survey tool may be used to conduct a continuous survey, as described earlier. As discussed above, after withdrawal of the survey tool from the wellbore, the survey tool orientation (e.g., attitude) determined by the survey tool can be compared to a reference orientation (e.g., attitude) determined by the apparatus 10 to can provide a post-survey check on the calibration or amount of drift of the survey tool. For example, the survey tool may be mounted to the apparatus 10 following its withdrawal from the wellbore and readings of the orientation (e.g., attitude) of the survey tool from the survey tool may be compared to readings of the orientation (e.g., attitude) from the directional reference system 16. Differences in orientation determined from such a comparison may correspond to calibration errors or drift.

Figure 31:
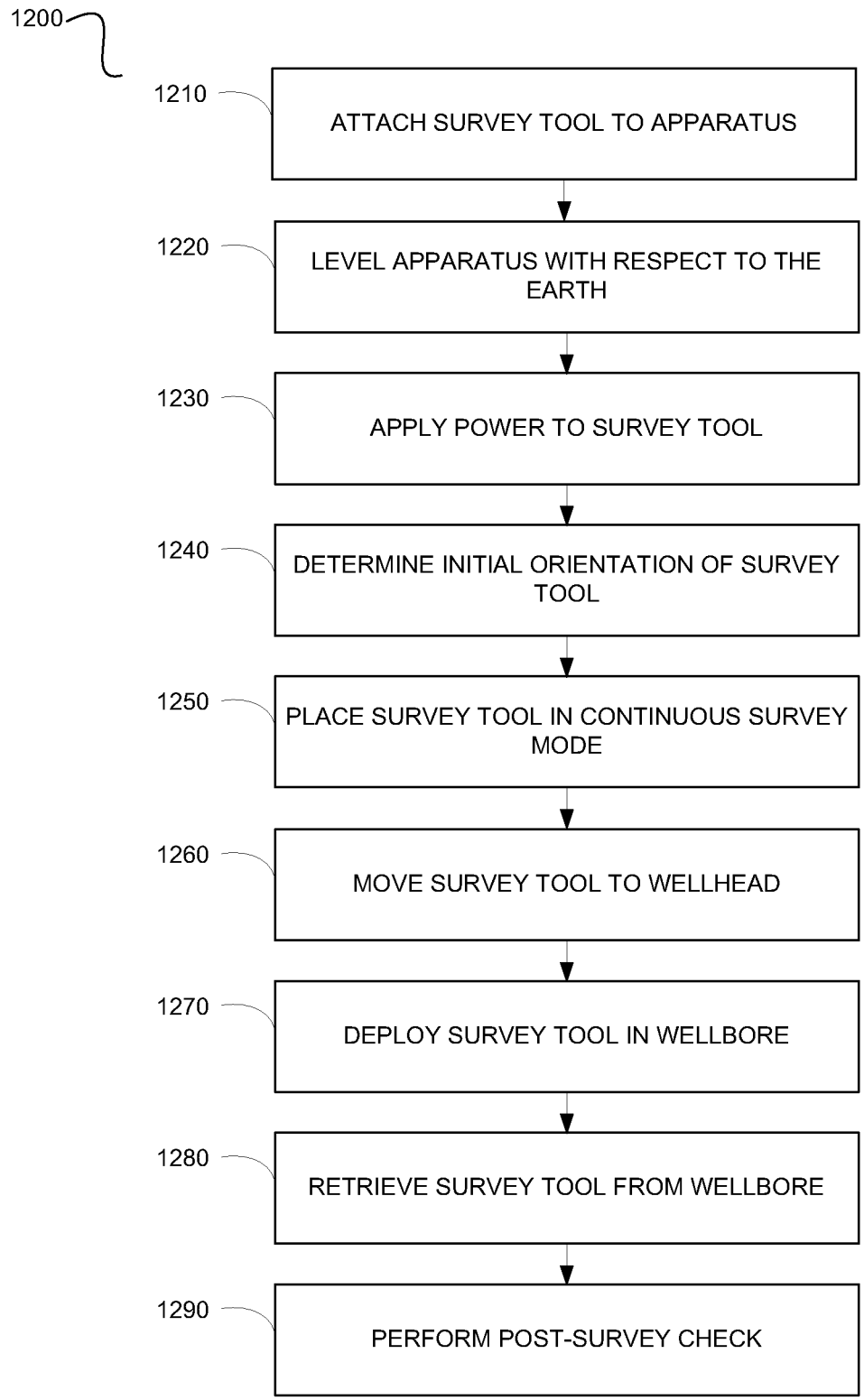
FIG. 31 illustrates a flow diagram of a method for initializing a survey tool in accordance with implementations of various techniques described herein.

FIG. 31 illustrates a flow diagram of a method 1200 for initializing a survey tool in accordance with implementations of various techniques described herein. In particular, the survey tool may be a drop survey tool, a slickline survey tool, or a wireline survey tool, as described above. While the flow diagram 1200 is described herein by reference to the apparatus 10 schematically illustrated by FIGS. 2-6, other apparatuses described herein may also be used. In one implementation, method 1200 may be at least partially performed by a computing system, such as the computing system 52 discussed above. It should be understood that while method 1200 indicates a particular order of execution of operations, in some implementations, certain portions of the operations might be executed in a different order. Further, in some implementations, additional operations or steps may be added to the method 1200. Likewise, some operations or steps may be omitted.

At block 1210, the survey tool may be attached to the apparatus 10. In particular, the survey tool may be mechanically coupled to a second mounting portion 20 of the apparatus 10, where the second mounting portion 20 is mechanically coupled to a base portion 12 of the apparatus 10. In one implementation, while coupled to the apparatus 10, the survey tool may be positioned in a substantially horizontal position with respect to the base portion 12. When coupled to the second mounting portion 20, the survey tool may be positioned at a predetermined orientation with respect to the at least one directional reference system 16.

At block 1220, the apparatus 10 may be leveled with respect to the Earth. In particular, the apparatus 10 may use at least one leveler 48 to level the apparatus 10 with respect to the Earth (e.g., to be substantially perpendicular to the direction of gravity). The at least one leveler 48 may include a set of one or more adjustable supports.

At block 1230, power may be applied to the survey tool. As is known in the art, a drop survey tool and a slickline survey tool may be powered using one or more batteries. A wireline survey tool may be powered using electrical cabling connections.

At block 1240, an initial orientation of the survey tool may be determined. The initial orientation of the survey tool may be determined using the directional reference system 16, as described above, where the initial orientation may be transmitted to the survey tool.

At block 1250, the survey tool may be placed into a continuous survey mode. While in the continuous survey mode, the survey tool may be configured to acquire continuous survey data. Further, while in the continuous survey mode, the survey tool can determine its subsequent orientation (e.g., heading, trajectory, attitude, azimuth, etc.) can with respect to the initial orientation.

At block 1260, the survey tool may be moved to a wellhead of a wellbore. In one implementation, one or more individuals may subsequently remove the survey tool from the apparatus 10, and then transport (e.g., carry) the survey tool to the wellhead. In a further implementation, the survey tool may remain in the substantially horizontal position while being transported to the wellhead. In particular, the drop survey tool, the slickline survey tool, and/or the wireline survey tool discussed above may be used for such an implementation, as these tools can be relatively small in size and/or weight. Once at the wellhead, the survey tool may be rotated to a substantially vertical position for deployment into the wellbore. The survey tool may be rotated a relatively low rate (e.g., within the rate limits of the gyroscopic sensors on the survey tool).

At block 1270, the survey tool may be deployed in the wellbore. After being deployed, the survey tool may be used to conduct a continuous survey, as described earlier. At block 1280, the survey tool may be retrieved from the wellbore. The survey tool may be retrieved using any retrieval process known to those skilled in the art.

At block 1290, a post-survey check may be performed on the survey tool. In particular, after withdrawal of the survey tool from the wellbore, the survey tool orientation (e.g., attitude) determined by the survey tool can be compared to a reference orientation (e.g., attitude) determined by the apparatus 10 to can provide a post-survey check on the calibration or amount of drift of the survey tool. Differences in orientation determined from such a comparison may correspond to calibration errors or drift.

L. Computing System

Various implementations of computing systems are further discussed below. Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, smart watches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 32:
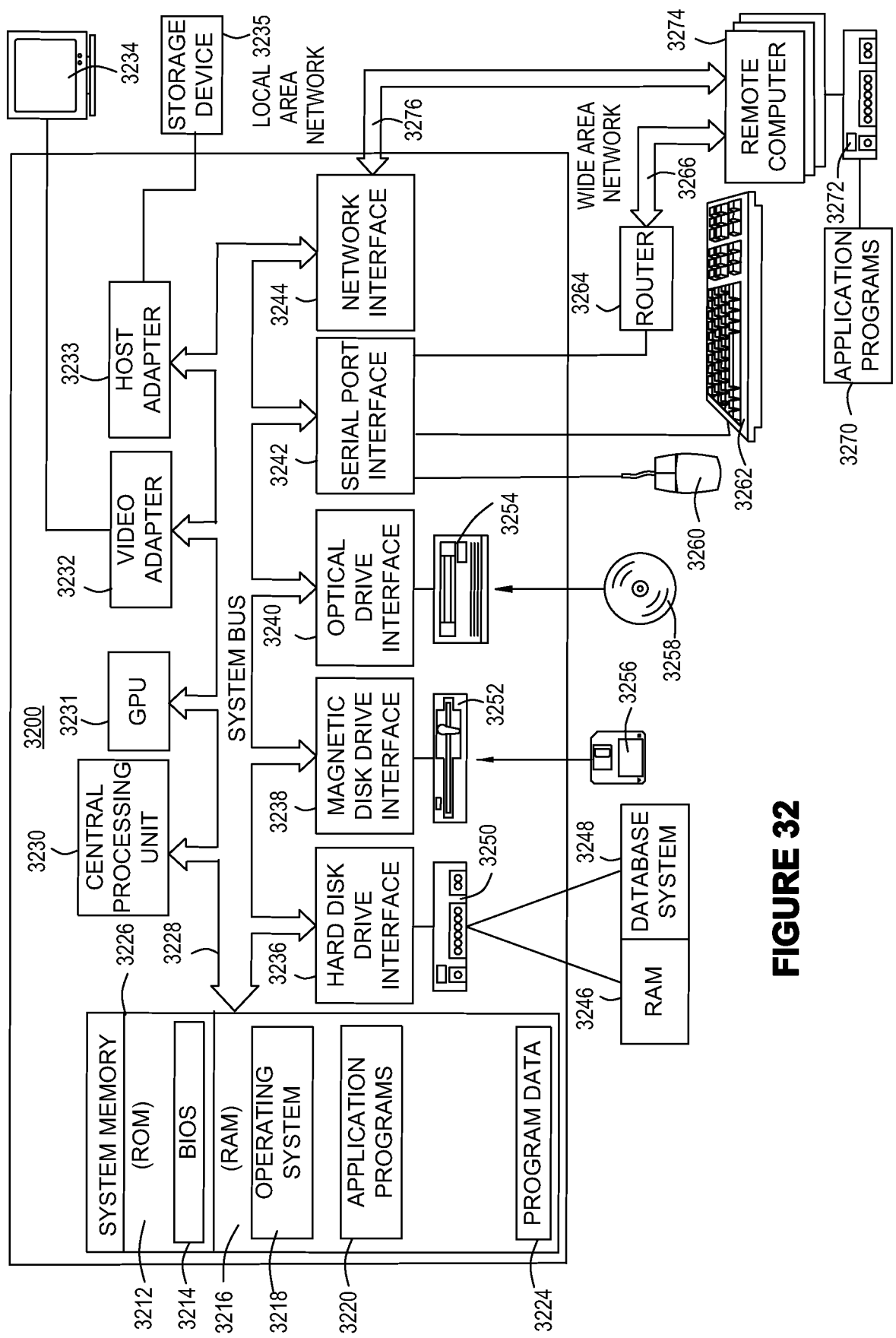
FIG. 32 illustrates a schematic diagram of a computing system in which the various technologies described herein may be incorporated and practiced.

FIG. 32 illustrates a schematic diagram of a computing system 3200 in which the various technologies described herein may be incorporated and practiced. Although the computing system 3200 may be a conventional desktop or a server computer, as described above, other computer system configurations may be used.

The computing system 3200 may include a central processing unit (CPU) 3230, a system memory 3226, a graphics processing unit (GPU) 3231 and a system bus 3228 that couples various system components including the system memory 3226 to the CPU 3230. Although one CPU is illustrated in FIG. 32, it should be understood that in some implementations the computing system 3200 may include more than one CPU. The GPU 3231 may be a microprocessor specifically designed to manipulate and implement computer graphics. The CPU 3230 may offload work to the GPU 3231. The GPU 3231 may have its own graphics memory, and/or may have access to a portion of the system memory 3226. As with the CPU 3230, the GPU 3231 may include one or more processing units, and the processing units may include one or more cores. The system bus 3228 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 3226 may include a read-only memory (ROM) 3212 and a random access memory (RAM) 3246. A basic input/output system (BIOS) 3214, containing the basic routines that help transfer information between elements within the computing system 3200, such as during start-up, may be stored in the ROM 3212.

The computing system 3200 may further include a hard disk drive 3250 for reading from and writing to a hard disk, a magnetic disk drive 3252 for reading from and writing to a removable magnetic disk 3256, and an optical disk drive 3254 for reading from and writing to a removable optical disk 3258, such as a CD ROM or other optical media. The hard disk drive 3250, the magnetic disk drive 3252, and the optical disk drive 3254 may be connected to the system bus 3228 by a hard disk drive interface 3256, a magnetic disk drive interface 3258, and an optical drive interface 3250, respectively. The drives and their associated computer-readable media may provide nonvolatile storage of computer-readable instructions, data structures, program modules and other data for the computing system 3200.

Although the computing system 3200 is described herein as having a hard disk, a removable magnetic disk 3256 and a removable optical disk 3258, it should be appreciated by those skilled in the art that the computing system 3200 may also include other types of computer-readable media that may be accessed by a computer. For example, such computer-readable media may include computer storage media and communication media. Computer storage media may include volatile and non-volatile, and removable and nonremovable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 3200. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 3200 may also include a host adapter 3233 that connects to a storage device 3235 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 3250, magnetic disk 3256, optical disk 3258, ROM 3212 or RAM 3216, including an operating system 3218, one or more application programs 3220, program data 3224, and a database system 3248. The application programs 3220 may include various mobile applications ("apps") and other applications configured to perform various methods and techniques described herein. The operating system 3218 may be any suitable operating system that may control the operation of a networked personal or server computer, such as Windows® XP, Mac OS® X, Unix-variants (e.g., Linux® and BSD®), and the like.

A user may enter commands and information into the computing system 3200 through input devices such as a keyboard 3262 and pointing device 3260. Other input devices may include a microphone, joystick, game pad, satellite dish, scanner, or the like. These and other input devices may be connected to the CPU 3230 through a serial port interface 3242 coupled to system bus 3228, but may be connected by other interfaces, such as a parallel port, game port or a universal serial bus (USB). A monitor 3234 or other type of display device may also be connected to system bus 3228 via an interface, such as a video adapter 3232. In addition to the monitor 3234, the computing system 3200 may further include other peripheral output devices such as speakers and printers.

Further, the computing system 3200 may operate in a networked environment using logical connections to one or more remote computers 3274. The logical connections may be any connection that is commonplace in offices, enterprise-wide computer networks, intranets, and the Internet, such as local area network (LAN) 3256 and a wide area network (WAN) 3266. The remote computers 3274 may be another a computer, a server computer, a router, a network PC, a peer device or other common network node, and may include many of the elements describes above relative to the computing system 3200. The remote computers 3274 may also each include application programs 3270 similar to that of the computer action function.

When using a LAN networking environment, the computing system 3200 may be connected to the local network 3276 through a network interface or adapter 3244. When used in a WAN networking environment, the computing system 3200 may include a router 3264, wireless router or other means for establishing communication over a wide area network 3266, such as the Internet. The router 3264, which may be internal or external, may be connected to the system bus 3228 via the serial port interface 3252. In a networked environment, program modules depicted relative to the computing system 3200, or portions thereof, may be stored in a remote memory storage device 3272. It will be appreciated that the network connections shown are merely examples and other means of establishing a communications link between the computers may be used.

The network interface 3244 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 3274.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 3200 may be located at a data center remote from the survey region. The system computer 3200 may be in communication with the receivers (either directly or via a recording unit, not shown), to receive signals indicative of the reflected seismic energy. These signals, after conventional formatting and other initial processing, may be stored by the system computer 3200 as digital data in the disk storage for subsequent retrieval and processing in the manner described above. In one implementation, these signals and data may be sent to the system computer 3200 directly from sensors, such as geophones, hydrophones and the like. When receiving data directly from the sensors, the system computer 3200 may be described as part of an in-field data processing system. In another implementation, the system computer 3200 may process seismic data already stored in the disk storage. When processing data stored in the disk storage, the system computer 3200 may be described as part of a remote data processing center, separate from data acquisition. The system computer 3200 may be configured to process data as part of the in-field data processing system, the remote data processing system or a combination thereof.

Those with skill in the art will appreciate that any of the listed architectures, features or standards discussed above with respect to the example computing system 3200 may be omitted for use with a computing system used in accordance with the various embodiments disclosed herein because technology and standards continue to evolve over time.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although certain preferred embodiments and examples are discussed above, it is understood that the inventive subject matter extends beyond the specifically disclosed embodiments to other alternative embodiments and/or uses of the invention and obvious modifications and equivalents thereof. It is intended that the scope of the inventions disclosed herein should not be limited by the particular disclosed embodiments. Thus, for example, in any method or process disclosed herein, the acts or operations making up the method/process may be performed in any suitable sequence and are not necessarily limited to any particular disclosed sequence. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A method, comprising:
    positioning a survey tool at a predetermined orientation relative to a directional reference system, wherein the survey tool is configured to acquire continuous survey data while disposed within a wellbore, and wherein the survey tool comprises a drop survey tool, a wireline survey tool, or a slickline survey tool;

using the directional reference system to generate a first signal indicative of an orientation of the directional reference system with respect to a reference direction;

using the first signal to determine an initial orientation of the survey tool with respect to the reference direction; and moving the survey tool after the initial orientation of the survey tool has been determined.

2. The method of claim 1, wherein positioning the survey tool comprises mechanically coupling the survey tool to an apparatus, and wherein the apparatus includes at least one signal receiver of the directional reference system.

3. The method of claim 2, further comprising using the apparatus to communicate the initial orientation to the survey tool.

4. The method of claim 2, further comprising leveling the apparatus with respect to the Earth using at least one leveler after the survey tool is mechanically coupled to the apparatus.

5. The method of claim 1, wherein the reference direction comprises a true north or a magnetic north.

6. The method of claim 1, wherein the directional reference system comprises at least one signal receiver of a satellite navigation system.

7. The method of claim 1, further comprising operating the survey tool in a continuous survey mode prior to moving the survey tool.

8. The method of claim 1, wherein moving the survey tool comprises:

removing the survey tool from an apparatus, wherein the apparatus includes at least one signal receiver of the directional reference system, and wherein the apparatus is positioned away from a wellhead of the wellbore;

transporting the survey tool to the wellhead of the wellbore;

using one or more gyroscopic sensors of the survey tool and the initial orientation to determine an orientation of the survey tool while being transported; and deploying the survey tool within the wellbore to acquire the continuous survey data.

9. The method of claim 8, further comprising:
retrieving the survey tool from the wellbore; and
coupling the survey tool to the apparatus to determine a calibration or drift of the survey tool.

10. The method of claim 1, wherein the survey tool is configured to be powered using one or more batteries.

11. The method of claim 1, wherein the survey tool is configured to acquire the continuous survey data using one or more gyroscopic sensors and one or more accelerometers.

12. The method of claim 1, wherein the continuous survey data comprises depth data acquired during an inrun data acquisition.

13. The method of claim 1, wherein the survey tool has a length equal to less than ten feet.

14. An apparatus, comprising:
at least one directional reference system configured to provide data indicative of an orientation of the at least one directional reference system with respect to a reference direction; and a mounting portion mechanically coupled to the at least one directional reference system, wherein:

the mounting portion is configured to be mechanically coupled to a survey tool while the survey tool is outside of a wellbore such that the survey tool has a predetermined orientation with respect to the at least one directional reference system while the survey tool is outside of the wellbore; and the mounting portion is configured to be mechanically decoupled from the survey tool while the survey tool is within the wellbore; and wherein the survey tool is configured to acquire continuous survey data while disposed within the wellbore, and wherein the survey tool comprises a drop survey tool, a wireline survey tool, or a slickline survey tool.

15. The apparatus of claim 14, wherein the at least one directional reference system comprises at least one signal receiver of a satellite navigation system, and wherein the at least one signal receiver comprises two or more antennae spaced apart from one another.

16. The apparatus of claim 14, wherein the survey tool is configured to receive a signal corresponding to an initial orientation of the survey tool with respect to the reference direction based on the predetermined orientation and the orientation of the at least one directional reference system.

17. A method, comprising:
positioning a drop survey tool at a predetermined orientation relative to a directional reference system, wherein the drop survey tool is configured to acquire continuous survey data while disposed within a wellbore using one or more Coriolis vibratory gyroscopic sensors;

using the directional reference system to generate a first signal indicative of an orientation of the directional reference system with respect to a reference direction;

using the first signal to determine an initial orientation of the drop survey tool with respect to the reference direction; and moving the drop survey tool after the initial orientation of the drop survey tool has been determined.

18. The method of claim 17, wherein positioning the survey tool comprises mechanically coupling the survey tool to an apparatus, and wherein the apparatus includes at least one signal receiver of the directional reference system.

19. The method of claim 17, wherein moving the survey tool comprises:

removing the drop survey tool from an apparatus, wherein the apparatus includes at least one signal receiver of the directional reference system, and wherein the apparatus is positioned away from a wellhead of the wellbore;

transporting the drop survey tool to the wellhead of the wellbore;

using the one or more Coriolis vibratory gyroscopic sensors and the initial orientation to determine an orientation of the drop survey tool while being transported; and deploying the drop survey tool within the wellbore to acquire the continuous survey data.

20. The method of claim 19, further comprising:
retrieving the survey tool from the wellbore; and
coupling the survey tool to the apparatus to determine a calibration or drift of the survey tool.

* * * * *